(12) United States Patent
Lee et al.

(10) Patent No.: US 11,700,380 B2
(45) Date of Patent: *Jul. 11, 2023

(54) APPARATUS AND METHOD FOR ENCODING IMAGE ON BASIS OF MOTION VECTOR RESOLUTION, AND DECODING APPARATUS AND METHOD

(71) Applicant: SAMSUNG ELECTRONICS CO., LTD., Suwon-si (KR)

(72) Inventors: Jin-young Lee, Suwon-si (KR); Min-woo Park, Yongin-si (KR); Anish Tamse, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/522,384

(22) Filed: Nov. 9, 2021

(65) Prior Publication Data

US 2022/0086452 A1 Mar. 17, 2022

Related U.S. Application Data

(63) Continuation of application No. 16/762,415, filed as application No. PCT/KR2018/003814 on Mar. 30, 2018, now Pat. No. 11,184,620.

(Continued)

(51) Int. Cl.
*H04N 19/00* (2014.01)
*H04N 19/137* (2014.01)
(Continued)

(52) U.S. Cl.
CPC ......... *H04N 19/137* (2014.11); *H04N 19/117* (2014.11); *H04N 19/159* (2014.11); *H04N 19/176* (2014.11)

(58) Field of Classification Search
CPC .. H04N 19/103; H04N 19/176; H04N 19/159; H04N 19/184; H04N 19/137; H04N 19/139; H04N 19/117
See application file for complete search history.

(56) References Cited

U.S. PATENT DOCUMENTS 9,491,480 B2 11/2016 Lim et al.
9,900,611 B2 2/2018 Itani et al.
(Continued)

FOREIGN PATENT DOCUMENTS

CN 107113442 A 8/2017
EP 3 203 743 A1 8/2017
(Continued)

OTHER PUBLICATIONS

Communication dated May 5, 2022 by the China National Intellectual Property Administration in Chinese Patent Application No. 201880084683.X.
(Continued)

*Primary Examiner* — Zhihan Zhou
(74) *Attorney, Agent, or Firm* — Sughrue Mion, PLLC

(57) ABSTRACT

An image decoding method includes obtaining, from a bitstream, first information indicating a motion vector resolution of a current unit among plural motion vector resolutions including a first motion vector resolution and a second motion vector resolution, and obtaining, from the bitstream, second information indicating whether a merge mode is applied to the current unit or not when the first information indicates the first motion vector resolution. The current unit is decoded based on the merge mode when the second information indicates that the merge mode is applied to the current unit. When the first information indicates the second motion vector resolution, the second information is not obtained from the bitstream. A picture is split into one or more largest coding units, and a largest coding unit among (Continued)

the one or more largest coding units is split into one or more coding units including the current unit.

4 Claims, 37 Drawing Sheets

Related U.S. Application Data

(60) Provisional application No. 62/583,748, filed on Nov. 9, 2017.

(51) Int. Cl.
*H04N 19/117* (2014.01)
*H04N 19/159* (2014.01)
*H04N 19/176* (2014.01)

(56) References Cited

U.S. PATENT DOCUMENTS

| | | | |
|---|---|---|---|
| 10,848,780 B2 | 11/2020 | Lee et al. | |
| 2013/0070846 A1* | 3/2013 | Lim | H04N 19/50 375/240.03 |
| 2013/0177076 A1* | 7/2013 | Itani | H04N 19/52 375/240.03 |
| 2015/0264390 A1* | 9/2015 | Laroche | H04N 19/105 375/240.16 |
| 2017/0094313 A1 | 3/2017 | Zhao et al. | |
| 2017/0339426 A1* | 11/2017 | Lee | H04N 19/176 |

FOREIGN PATENT DOCUMENTS

| | | |
|---|---|---|
| KR | 10-2011-0101443 A | 6/2011 |
| KR | 10-2014-0092423 A | 7/2014 |
| KR | 10-2014-0104064 A | 8/2014 |
| WO | 2011021915 A2 | 2/2011 |
| WO | 2012042719 A1 | 4/2012 |
| WO | 2014098368 A1 | 6/2014 |
| WO | 2016068674 A1 | 5/2016 |
| WO | 2017039117 A1 | 3/2017 |

OTHER PUBLICATIONS

Communication dated Apr. 19, 2022 by the Intellectual Property Office of India in Indian Patent Application No. 202047023261.
Communication dated Apr. 21, 2022 by the Intellectual Property Office of India in Indian Patent Application No. 202148050443.
Communication dated May 2, 2022 by the Intellectual Property Office of India in Indian Patent Application No. 20214050430.
Chen et al., "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting in Torino, Italy, Jul. 13-21, 2017, Document: JYET-G1001-v1, server date Aug. 19, 2017, Total 48 pages, XP030150980.
Communication dated Jul. 23, 2021, issued by the European Patent Office in European Application No. 18875343.8.
Communication dated Nov. 16, 2020, issued by the Korean Intellectual Property Office in corresponding Korean Application No. 10-2020-7009554.
Communication dated Sep. 9, 2020, issued by the Korean Intellectual Property Office in corresponding Korean Application No. 10-2020-7009554.
International Search Report (PCT/ISA/210), issued by International Searching Authority in corresponding International Application No. PCT/KR2018/003814, dated Jul. 27, 2018.
Written Opinion (PCT/ISA/237) issued by the International Searching Authority in corresponding International Application No. PCT/KR2018/003814, dated Jul. 27, 2018.
Communication issued by the European Patent Office dated Apr. 11, 2023 in European Patent Application No. 18875343.8.

\* cited by examiner

FIG. 13

| BLOCK SHAPE DEPTH | 0: SQUARE | 1: NS_VER | 2: NS_HOR |
|---|---|---|---|
| DEPTH D | 1300 | 1310 | 1320 |
| DEPTH D+1 | 1302 | 1312 | 1322 |
| DEPTH D+2 | 1304 | 1314 | 1324 |
| ... | ... | ... | ... |

FIG. 18

| SQUARE BLOCK | |
|---|---|
| (00)b | □ |
| (01)b | ⊞ |
| (10)b | ▭ |
| (11)b | ▯ |

| NON-SQUARE BLOCK | | |
|---|---|---|
| (0)b | ▭ | ▯ |
| (10)b | ▭▭ | ▯▯ |
| (11)b | ▭▭▭ | ▯▯▯ |

FIG. 19

| SQUARE BLOCK | |
|---|---|
| (00)b | □ |
| (10)b | ▭ |
| (11)b | ▯ |

| NON-SQUARE BLOCK | | |
|---|---|---|
| (0)b | ▭ | ▯ |
| (10)b | ▭ | ▯ |
| (11)b | ▭ | ▯ |

FIG. 30
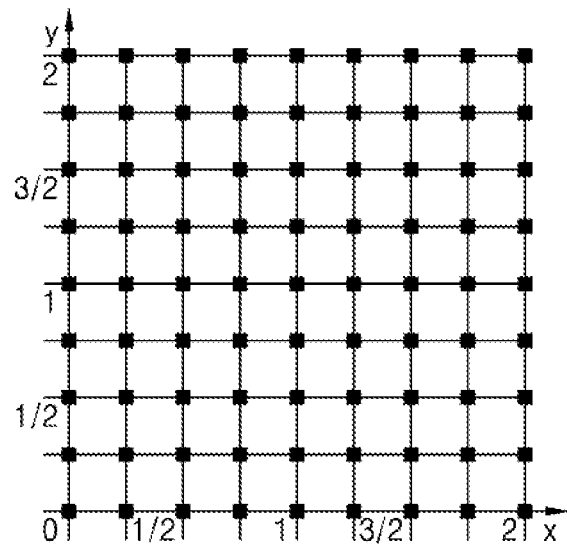
(a) 1/4-PIXEL UNIT
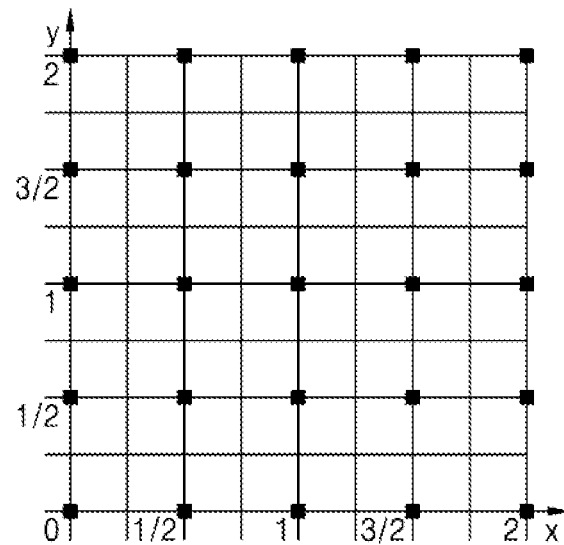
(b) 1/2-PIXEL UNIT
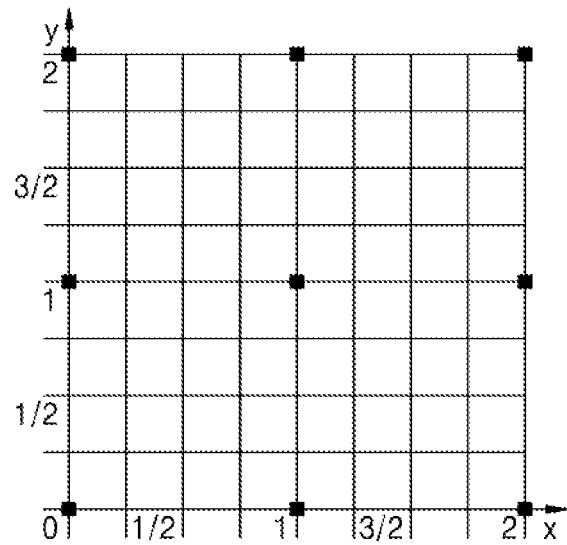
(c) 1-PIXEL UNIT
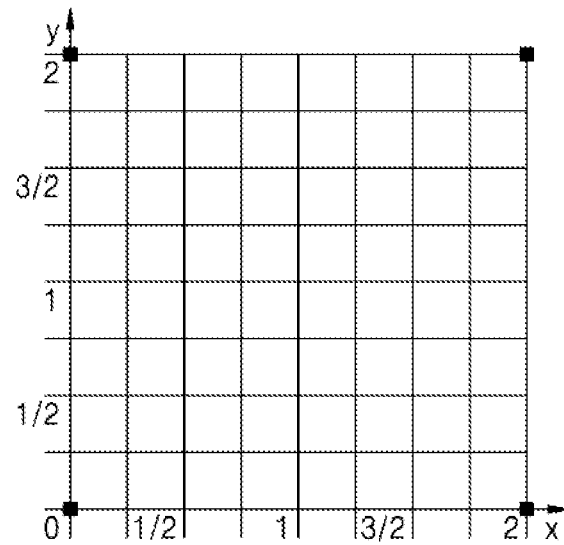
(d) 2-PIXEL UNIT

Fig. 31

```
coding_unit( x0, y0, log2width, log2height ) {
    if( slice_type != I &&                                                    ← a
        !(log2width <= LOG2_MIN_CU && log2height <= LOG2_MIN_CU) {
        cu_skip_flag[ x0 ][ y0 ]                                              ← b
        if( cu_skip_flag[ x0 ][ y0 ] ) {                                      ← c
            cu_skip_umve[ x0 ][ y0 ]
            if( cu_skip_umve[ x0 ][ y0 ] ) {
                cu_mode = SKIP_UMVE
                mvp_idx_umve( x0, y0, identical_list0_list1_flag )
            }
            else if( log2width >= 3 && log2height >= 3 ) {
                cu_skip_affine[ x0 ][ y0 ]
                if( cu_skip_affine[ x0 ][ y0 ] ) {
                    cu_mode = SKIP_AFFINE
                }
                else {
                    mvp_idx[ x0 ][ y0 ]
                    cu_mode = SKIP
                }
            }
            else {
                mvp_idx[ x0 ][ y0 ]
                cu_mode = SKIP
            }
        }
        else {                                                                ← d
            pred_mode_flag[ x0 ][ y0 ]                                        ← e
            cu_mode = pred_mode_flag[ x0 ][ y0 ]
            if( pred_mode_flag[ x0 ][ y0 ] != MODE_INTRA )                    ← f
                pred_mvr_idx[ x0 ][ y0 ]                                      ← g
        }
    }
}
```

FIG. 32

| MOTION VECTOR RESOLUTION | APPLICABLE PROCESSING MODE |
|---|---|
| 1/4 PIXEL UNIT | AFFINE PROCESSING MODE |
| 1/2 PIXEL UNIT<br>1 PIXEL UNIT<br>2 PIXEL UNIT | DMVD PROCESSING MODE |

FIG. 33

| MOTION VECTOR RESOLUTION | INAPPLICABLE PROCESSING MODE |
|---|---|
| 1/4 PIXEL UNIT | DST PROCESSING MODE |
| 1/2 PIXEL UNIT<br>1 PIXEL UNIT<br>2 PIXEL UNIT | ROT PROCESSING MODE |

FIG. 34

| MOTION VECTOR RESOLUTION | APPLICABLE PROCESSING MODE | INAPPLICABLE PROCESSING MODE |
|---|---|---|
| 1/4 PIXEL UNIT | AFFINE PROCESSING MODE, IC PROCESSING MODE | BF PROCESSING MODE |
| 1/2 PIXEL UNIT<br>1 PIXEL UNIT<br>2 PIXEL UNIT | ROT PROCESSING MODE | OBMC PROCESSING MODE, SAO PROCESSING MODE |

Fig. 35

| | | |
|---|---|---|
| A → | if( cu_mode == MODE_INTER ) { | |
| | if(slice_type == P ) { | |
| B → | if( pred_mvr_idx[ x0 ][ y0 ] == 0 ) { | |
| C → | cu_direct[ x0 ][ y0 ] | ae(v) |
| | } | |
| | if( cu_direct[ x0 ][ y0 ] ) { | |
| | affine_dir[ x0 ][ y0 ] = 0 | |
| | if( log2width >= 3 && log2height >= 3 ) { | |
| | affine_dir[ x0 ][ y0 ] | ae(v) |
| | if(affine_dir[ x0 ][ y0 ]) { | |
| | affine_flag[ x0 ][ y0 ] = 1 | |
| | cu_mode = DIR_AFFINE | |
| | } | |
| | } | |
| | if( !affine_dir[ x0 ][ y0 ]) { | |
| | mvp_idx_umve( x0, y0, identical_list0_list1_flag ) | |
| | cu_mode = DIR_UMVE | |
| | } | |
| | } | |
| | } | |
| | } | |

Fig. 36

|   |   |   |
|---|---|---|
| D → | else { // slice type == B |   |
| E → |   if( pred_mvr_idx[ x0 ][ y0 ] == 0 ){ |   |
| F → |     cu_direct[ x0 ][ y0 ] | ae(v) |
|   |   } |   |
|   |   if( cu_direct[ x0 ][ y0 ] ) { |   |
|   |     cu_direct_umve[ x0 ][ y0 ] | ae(v) |
|   |     if( cu_direct_umve[ x0 ][ y0 ] ) { |   |
|   |       cu_mode = DIR_UMVE |   |
|   |       get_skip_cand() |   |
|   |       mvp_idx_umve( x0, y0, identical_list0_list1_flag ) |   |
|   |     } |   |
|   |     else { |   |
|   |       affine_dir[ x0 ][ y0 ] = 0 |   |
|   |       if( log2width >= 3 && log2height >= 3 ) { |   |
|   |         affine_dir[ x0 ][ y0 ] | ae(v) |
|   |         if( affine_dir[ x0 ][ y0 ] ) { |   |
|   |           cu_mode = DIR_AFFINE |   |
|   |           affine_flag[ x0 ][ y0 ] = 1 |   |
|   |         } |   |
|   |       } |   |
|   |       if( !affine_dir[ x0 ][ y0 ] ) { |   |
|   |         cu_mode = DIR |   |
|   |         get_skip_cand() |   |
|   |         mvp_idx_dir[ x0 ][ y0 ][ 0 ] | ae(v) |
|   |         mvp_idx_dir[ x0 ][ y0 ][ 1 ] = mvp_idx_dir[ x0 ][ y0 ][ 0 ] |   |
|   |       } |   |
|   |     } |   |
|   |   } |   |

Fig. 37

| | | |
|---|---|---|
| | if( log2width + low2height > 5 && ipr_applicable && (pred_mvr_idx[ x0 ][ y0 ] = = 0 || pred_mvr_idx[ x0 ][ y0 ] = = 3 ) | |
| G — | | |
| H — | ipr_flag[ x0 ][ y0 ] | ae(v) |
| | if( inter_pred_dir[x0][y0] = = PRED_L0 || inter_pred_dir[x0][y0] = = PRED_BI ){ | |
| | if( inter_bi_idx = = BI_FL0 || inter_bi_idx = = BI_FL1 ) | |
| | refi[ x0 ][ y0 ][ 0 ] = get_first_refi( ) | |
| | else | |
| | refi[ x0 ][ y0 ][ 0 ] = ref_idx[ x0 ][ y0 ][ 0 ] | ae(v) |
| | if( inter_bi_idx = = BI_FL0 ) | |
| | mvd = ( 0, 0 ) | |
| | else | |
| | mvd[ x0 ][ y0 ][ 0 ] | ae(v) |
| | } | |
| | if( inter_pred_dir[ x0 ][ y0 ] = = PRED_L1 || inter_pred_dir[ x0 ][ y0 ] = = PRED_BI ) { | |
| | if( inter_bi_idx = = BI_FL0 || inter_bi_idx = = BI_FL1 ) | |
| | refi[ x0 ][ y0 ][ 1 ] = get_first_refi( ) | |
| | else | |
| | refi[ x0 ][ y0 ][ 1 ] = ref_idx[ x0 ][ y0 ][ 1 ] | ae(v) |
| | if( inter_bi_idx = = BI_FL1 ) | |
| | mvd = ( 0, 0 ) | |
| | else | |
| | mvd[ x0 ][ y0 ][ 1 ] | ae(v) |
| | } | |

APPARATUS AND METHOD FOR ENCODING IMAGE ON BASIS OF MOTION VECTOR RESOLUTION, AND DECODING APPARATUS AND METHOD

CROSS REFERENCE TO RELATED APPLICATIONS

This application is a continuation application of U.S. application Ser. No. 16/762,415, filed May 7, 2020, which is a National Stage of International Application No. PCT/KR2018/003814 filed Mar. 30, 2018, which claims priority from U.S. Provisional Application No. 62/583,748 filed on Nov. 9, 2017, the entire contents of each of which being herein incorporated by reference in their entireties.

TECHNICAL FIELD

The disclosure relates to image encoding and decoding. More particularly, the disclosure relates to a method and apparatus for encoding an image based on a motion vector resolution, and a method and apparatus for decoding the image.

BACKGROUND ART

In a method of encoding and decoding video, in order to encode an image, one picture may be split into macroblocks, and each of the macroblocks may be prediction encoded by using inter prediction or intra prediction.

Inter prediction refers to a method of compressing an image by removing temporal redundancy between pictures, and a representative example thereof is motion estimation encoding. In motion estimation encoding, blocks of a current picture are predicted by using at least one reference picture. A reference block that is most similar to a current block may be found within a preset search range by using a preset evaluation function.

A current block is predicted based on a reference block, and a residual block, which is generated by subtracting a prediction block from the current block, the prediction block being generated as a prediction result, is encoded. In this case, in order to further accurately perform prediction, pixels in a sub-pel-unit smaller than an integer-pel-unit may be generated by performing interpolation on a search range of the reference picture, and inter prediction may be performed on the generated sub-pel-units Intra prediction refers to a scheme of compressing an image by removing a spatial redundancy within a picture. The intra prediction generates a prediction block based on adjacent pixels of a current block by using at least one prediction block generation method. Then, a residual block is encoded, the residual block being generated by subtracting the prediction block from the current block.

Codec such as H.264 Advanced Video Coding (AVC) and High Efficiency Video Coding (HEVC) encodes and decodes an image by using a prediction technique including intra prediction and inter prediction, a transformation technique, and a filtering technique.

DESCRIPTION OF EMBODIMENTS

Solution to Problem

According to an embodiment, an image decoding method includes determining at least one first processing mode for decoding of a current block, based on a motion vector resolution (MVR) of the current block, the at least one first processing mode being from among a plurality of processing modes included in at least one of a prediction process, a transform process, and a filtering process; and decoding the current block, according to the at least one first processing mode.

Advantageous Effects of Disclosure

According to an embodiment, an image encoding apparatus and encoding method, and an image decoding apparatus and decoding method predetermine a processing mode that is applicable to a current block, based on a motion vector resolution of the current block, such that it is not necessary to add unnecessary information to a bitstream, and thus, a bit amount may be decreased.

BRIEF DESCRIPTION OF DRAWINGS

Brief descriptions of each drawing are provided for further understanding of the accompanying drawings.

FIG. 13 illustrates a process of determining a depth of a coding unit as a shape and size of the coding unit change, when the coding unit is recursively split such that a plurality of coding units are determined, according to an embodiment.

FIG. 18 illustrates various shapes of a coding unit determinable based on split shape information that can be represented as a binary code, according to an embodiment.

FIG. 19 illustrates other shapes of a coding unit determinable based on split shape information that can represented as a binary code, according to an embodiment.

FIG. 21 illustrates an example of filtering units included in a largest coding unit and filtering performance information of a filtering unit, according to an embodiment.

FIG. 23 illustrates an index according to a Z-scan order of a coding unit according to an embodiment.

FIG. 30 illustrates positions of pixels that may be indicated by motion vectors according to a motion vector resolution (MVR) of a ¼-pixel unit, an MVR of a ½-pixel unit, an MVR of a 1-pixel unit, and an MVR of a 2-pixel unit, when a minimum MVR is the MVR of the ¼-pixel unit.

FIG. 31 illustrates syntax for obtaining information about an MVR from a bitstream.

FIGS. 32 to 34 illustrate examples of an applicable processing mode and/or an inapplicable processing mode, which are predetermined with respect to an MVR.

FIGS. 35 to 37 illustrate examples of syntax for describing a process of applying a particular processing mode to a current block based on an MVR of the current block.

BEST MODE

Figure 1:
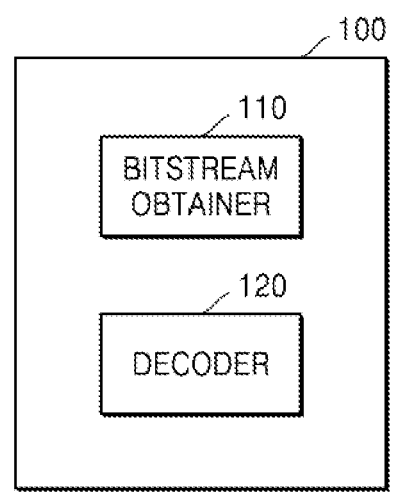
FIG. 1 illustrates a block diagram of an image decoding apparatus capable of decoding an image, based on at least one of block shape information and split shape information, according to an embodiment.

According to an embodiment, an image decoding method includes determining at least one first processing mode for decoding of a current block, based on a motion vector resolution (MVR) of the current block, the at least one first processing mode being from among a plurality of processing modes included in at least one of a prediction process, a transform process, and a filtering process; and decoding the current block, according to the at least one first processing mode.

The image decoding method may further include obtaining, from a bitstream, information about the at least one first processing mode, and the decoding may include, when it is confirmed to apply the at least one first processing mode based on the obtained information, decoding the current block, according to the at least one first processing mode.

The decoding may include, when it is confirmed not to apply the at least one first processing mode, decoding the current block, according to a second processing mode different from the at least one first processing mode.

When the MVR of the current block does not correspond to a preset MVR, obtaining of information about the at least one first processing mode from a bitstream may be skipped.

The image decoding method may further include, when the MVR of the current block does not correspond to a preset MVR, determining at least one second processing mode that corresponds to the MVR of the current block and is from among the plurality of processing modes, and the decoding may include decoding the current block, according to the at least one second processing mode.

When there is a predetermined second processing mode for which whether to apply is determined prior to the at least one first processing mode, obtaining of information about the second processing mode from a bitstream may be skipped.

The image decoding method may further include determining at least one second processing mode that corresponds to the MVR of the current block and is from among the plurality of processing modes, and obtaining of information about the at least one second processing mode from a bitstream may be skipped.

The MVR of the current block may be determined for a slice or a picture which includes the current block, and the determining of the at least one first processing mode may include, when the slice including the current block is a predictive (P)-slice or a bi-predictive (B)-slice, or the picture including the current block is a P-picture or a B-picture, determining that an inter prediction processing mode is to be applied to all blocks included in the slice or the picture.

The determining of the at least one first processing mode may include determining, based on the MVR of the current block, a prediction block generation mode with respect to a block that is encoded according to an intra prediction processing mode and is included in a same slice or a same picture as the current block.

The image decoding method may further include determining, based on the MVR of the current block, particular settings related to the at least one first processing mode, and the decoding of the current block may include decoding the current block according to the particular settings of the at least one first processing mode.

The prediction process may include at least one of a skip processing mode, a direct processing mode, an adaptive motion vector prediction (AMVP) processing mode, an affine processing mode, a bi-optical flow (BIO) processing mode, a decoder-side motion vector derivation (DMVD) processing mode, an illumination compensation (IC) processing mode, a prediction block generation mode, an inter prediction refinement (IPR) processing mode, and an overlapped block motion compensation (OBMC) processing mode, the transform process may include at least one of a multiple transform (MT) processing mode, a non-separable secondary transform (NSST) processing mode, a rotational transform (ROT) processing mode, a discrete sine transform (DST) processing mode, and a discrete cosine transform (DCT) processing mode, and the filtering process may include at least one of a sample adaptive offset (SAO) processing mode, a bilateral filter (BF) processing mode, and an adaptive loop filter (ALF) processing mode.

According to an embodiment, an image decoding method includes determining, based on a motion vector resolution (MVR) of a current block, whether information about at least one first processing mode is included in a bitstream, the at least one first processing mode being from among a plurality of processing modes included in at least one of a prediction process, a transform process, and a filtering process that are for decoding of the current block; and decoding the current block, according to the at least one first processing mode, when the information about the at least one first processing mode is included in the bitstream.

According to an embodiment, an image decoding apparatus includes a decoder configured to determine at least one first processing mode for decoding of a current block, based on a motion vector resolution (MVR) of the current block, the at least one first processing mode being from among a plurality of processing modes included in at least one of a prediction process, a transform process, and a filtering process; and a bitstream obtainer configured to obtain, from a bitstream, information about the at least one first processing mode, wherein the decoder is further configured to decode the current block, based on the obtained information, according to the at least one first processing mode.

According to an embodiment, an image encoding method includes determining at least one first processing mode for encoding of a current block, based on a motion vector resolution (MVR) of the current block, the at least one first processing mode being from among a plurality of processing modes included in at least one of a prediction process, a transform process, and a filtering process; and encoding the current block, according to the at least one first processing mode.

According to an embodiment, an image encoding apparatus includes an encoder configured to determine at least one first processing mode for encoding of a current block, based on a motion vector resolution (MVR) of the current block, the at least one first processing mode being from among a plurality of processing modes included in at least one of a prediction process, a transform process, and a filtering process, and encode the current block, according to the at least one first processing mode; and a bitstream generator configured to generate a bitstream including information about the at least one first processing mode.

MODE OF DISCLOSURE

As the disclosure allows for various changes and numerous embodiments, particular embodiments will be illustrated in the drawings and described in detail in the written descriptions. However, this is not intended to limit the disclosure to particular modes of practice, and it is to be appreciated that all changes, equivalents, and substitutes that do not depart from the spirit and technical scope of various embodiments are encompassed in the disclosure.

In the descriptions of the embodiments, detailed explanations of related art are omitted when it is deemed that they may unnecessarily obscure the essence of the disclosure. Also, numbers (e.g., first and second) used in the descriptions of the embodiments are intended to merely distinguish one component from another.

Throughout the specification, it will also be understood that when an element is referred to as being "connected to" or "coupled with" another element, it can be directly connected to or coupled with the other element, or it can be electrically connected to or coupled with the other element by having an intervening element interposed therebetween, unless there is a particular description contrary thereto.

Throughout the specification, with respect to an element with a suffix such as 'unit' or 'module', two or more elements may be combined into one element or one element may be divided into two or more elements according to particular functions. In addition, each of elements to be described below may additionally perform some or all functions among functions which other elements take charge of, in addition to a primary function which each element takes charge of, and some functions among primary functions which the elements take charge of may be exclusively performed by other elements.

Throughout the specification, an "image" or a "picture" may refer to a still image of a video or a moving picture that is the video itself.

Throughout the specification, a "sample" refers to data that is allocated to a sampling position of an image and is a processing target. For example, pixel values in an image of a spatial domain or transform coefficients on a transformation domain may be samples. A unit including one or more samples may be defined as a block.

Throughout the specification, a "current block" may refer to a block of a largest coding unit, a coding unit, a prediction unit, or a transform unit of a current image to be encoded or decoded.

Throughout the specification, a "motion vector resolution (MVR)" may refer to the precision of a position of a pixel that may be indicated by a motion vector that is determined through inter prediction and is from among pixels included in a reference image (or an interpolated reference image). When the MVR has an N pixel unit (where N is a rational number), it means that a motion vector may have the precision of the N pixel unit. For example, an MVR of ¼-pixel unit may mean that a motion vector may indicate a pixel position of a ¼-pixel unit (i.e., a sub-pixel unit) in an interpolated reference image, and an MVR of 1-pixel unit may mean that a motion vector may indicate a pixel position corresponding to a 1-pixel unit (i.e., an integer pixel unit) in the interpolated reference image.

Throughout the specification, a "candidate MVR" refers to one or more MVRs that may be selected as an MVR of a block.

Throughout the specification, a "pixel unit" may be interchangeably used with "pixel precision", "pixel accuracy", and the like.

Throughout the specification, a "processing mode" may refer to a technology that is applicable to a block so as to encode and decode the block in an image.

Hereinafter, with reference to FIGS. 1 to 24, an image encoding method and apparatus therefor and an image decoding method and apparatus therefor based on transform units and coding units having a tree structure according to an embodiment will be described. An image encoding apparatus 200 and an image decoding apparatus 100 to be described with reference to FIGS. 1 to 24 may respectively include an image encoding apparatus 2700 and an image decoding apparatus 2500 to be described with reference to FIGS. 25 to 37.

FIG. 1 illustrates a block diagram of the image decoding apparatus 100 capable of decoding an image, based on at least one of block shape information and split shape information, according to an embodiment.

Referring to FIG. 1, according to an embodiment, the image decoding apparatus 100 may include a bitstream obtainer 110 for obtaining preset information such as split shape information, block shape information, or the like from a bitstream, and a decoder 120 for decoding an image by using the obtained information. According to an embodiment, when the bitstream obtainer 110 of the image decoding apparatus 100 obtains at least one of the block shape information and the split shape information, the decoder 120 of the image decoding apparatus 100 may determine at least one coding unit for splitting an image based on the at least one of the block shape information and the split shape information.

According to an embodiment, the decoder 120 of the image decoding apparatus 100 may determine a shape of the coding unit based on the block shape information. For example, the block shape information may include information indicating whether the coding unit has a square shape or a non-square shape. The decoder 120 may determine a shape of the coding unit by using the block shape information.

According to an embodiment, the decoder 120 may determine a shape into which a coding unit is to be split based on the split shape information. For example, the split shape information may indicate information about a shape of at least one coding unit included in the coding unit.

According to an embodiment, the decoder 120 may determine whether the coding unit is to be split or not to be split according to the split shape information. The split shape information may include information about the at least one coding unit included in the coding unit, and when the split shape information indicates that only one coding unit is included in the coding unit or is not to be split, the decoder 120 may determine that the coding unit including the split shape information is not to be split. When the split shape information indicates that the coding unit is to be split into a plurality of coding units, the decoder 120 may split the coding unit into the plurality of coding units included in the coding unit, based on the split shape information.

According to an embodiment, the split shape information may indicate the number of coding units into which the coding unit is to be split or a direction in which the coding unit is to be split. For example, the split shape information may indicate that the coding unit is to be split in at least one direction from among a vertical direction and a horizontal direction, or is not to be split.

Figure 3:
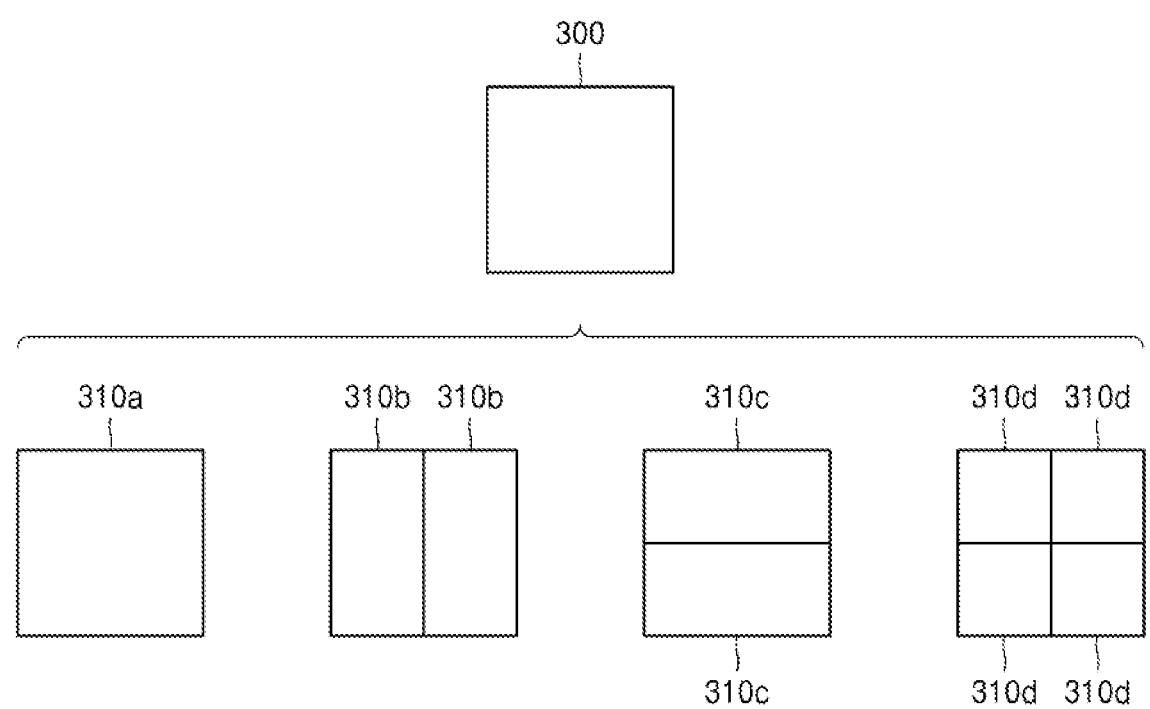
FIG. 3 illustrates a process in which a current coding unit is split to determine at least one coding unit, according to an embodiment.

FIG. 3 illustrates a process in which the image decoding apparatus 100 determines at least one coding unit by splitting a current coding unit according to an embodiment.

A block shape may include 4N×4N, 4N×2N, 2N×4N, 4N×N, or N×4N. In this regard, N may be a positive integer. Block shape information is information indicating at least one of a shape, a direction, a ratio of a width to a height, or a size, which are of a coding unit.

The shape of the coding unit may include a square shape and a non-square shape. When lengths of the width and the height of the coding unit are same (4N×4N), the image decoding apparatus 100 may determine the block shape information of the coding unit as a square shape. The image decoding apparatus 100 may determine the shape of the coding unit to be a non-square shape.

When lengths of the width and the height of the coding unit are different from each other (4N×2N, 2N×4N, 4N×N, or N×4N), the image decoding apparatus 100 may determine the block shape information of the coding unit as the non-square shape. When the shape of the coding unit is the non-square shape, the image decoding apparatus 100 may determine the ratio of the width to the height in the block shape information of the coding unit as at least one of 1:2, 2:1, 1:4, 4:1, 1:8, or 8:1. Also, the image decoding apparatus 100 may determine whether the coding unit is in a horizontal direction or vertical direction, based on the length of the width and the length of the height of the coding unit. Also, the image decoding apparatus 100 may determine the size of the coding unit, based on at least one of the length of the width, the length of the height, and an area of the coding unit.

According to an embodiment, the image decoding apparatus 100 may determine the shape of the coding unit by using the block shape information, and may determine which shape the coding unit is to be split into by using information about a split shape mode. That is, a coding unit splitting method indicated by the information about the split shape mode may be determined according to which block shape is indicated by the block shape information used by the image decoding apparatus 100.

The image decoding apparatus 100 may obtain the information about the split shape mode from a bitstream. However, the disclosure is not limited thereto, and the image decoding apparatus 100 and the image encoding apparatus 200 may obtain the information about the split shape mode that is predetermined, based on the block shape information. The image decoding apparatus 100 may obtain the information about the split shape mode that is predetermined for a largest coding unit or a smallest coding unit. For example, the image decoding apparatus 100 may determine a size of the largest coding unit to be 256×256. The image decoding apparatus 100 may determine the information about the predetermined split shape mode to be quad split. The quad split is a split shape mode in which the width and the height of the coding unit are halved. The image decoding apparatus 100 may obtain a coding unit having a size of 128×128 from a largest coding unit having a size of 256×256, based on the information about the split shape mode. Also, the image decoding apparatus 100 may determine a size of the smallest coding unit to be 4×4. The image decoding apparatus 100 may obtain the information about the split shape mode indicating "not to perform splitting" for the smallest coding unit.

According to an embodiment, the image decoding apparatus 100 may use the block shape information indicating that the current coding unit has a square shape. For example, the image decoding apparatus 100 may determine whether not to split a square coding unit, whether to vertically split the square coding unit, whether to horizontally split the square coding unit, or whether to split the square coding unit into four coding units, based on the information about the split shape mode. Referring to FIG. 3, when the block shape information of a current coding unit 300 indicates a square shape, the decoder 120 may determine that a coding unit 310a having the same size as the current coding unit 300 is not to be split, based on the information about the split shape mode indicating not to perform splitting, or may determine coding units 310b, 310c, or 310d split based on the information about the split shape mode indicating a preset splitting method.

Referring to FIG. 3, according to an embodiment, the image decoding apparatus 100 may determine two coding units 310b obtained by vertically splitting the current coding unit 300, based on the information about the split shape mode indicating to vertically perform splitting. The image decoding apparatus 100 may determine two coding units 310c obtained by horizontally splitting the current coding unit 300, based on the information about the split shape mode indicating to horizontally perform splitting. The image decoding apparatus 100 may determine four coding units 310d obtained by vertically and horizontally splitting the current coding unit 300, based on the information about the split shape mode indicating to vertically and horizontally perform splitting. However, split shapes of the square coding unit are not limited to the above-described shapes, and the information about the split shape mode may indicate various shapes. Preset split shapes by which the square coding unit is to be split will now be described below in various embodiments.

Figure 4:
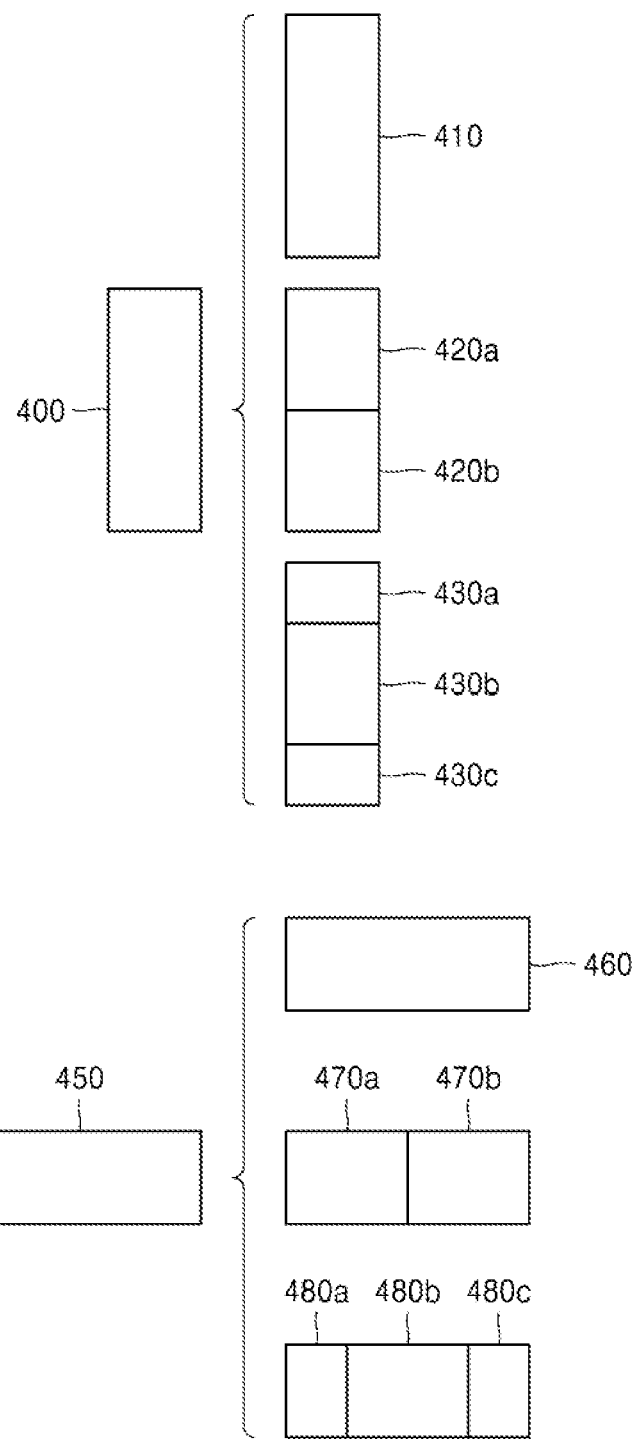
FIG. 4 illustrates a process of determining at least one coding unit by splitting a non-square coding unit, according to an embodiment.

FIG. 4 illustrates a process, performed by the image decoding apparatus 100, of determining at least one coding unit by splitting a non-square coding unit, according to an embodiment.

According to an embodiment, the image decoding apparatus 100 may use block shape information indicating that a current coding unit has a non-square shape. The image decoding apparatus 100 may determine, based on information about a split shape mode, whether not to split the non-square current coding unit or whether to split the non-square current coding unit by using a preset splitting method. Referring to FIG. 4, when the block shape information of a current coding unit 400 or 450 indicates a non-square shape, the image decoding apparatus 100 may determine that a coding unit 410 or 460 having the same size as the current coding unit 400 or 450 is not to be split, based on the information about the split shape mode indicating not to perform splitting, or may determine coding units 420a and 420b, 430a to 430c, 470a and 470b, or 480a to 480c split based on the information about the split shape mode indicating a preset splitting method. Preset splitting methods of splitting a non-square coding unit will now be described below in various embodiments.

According to an embodiment, the image decoding apparatus 100 may determine a split shape by which a coding unit is to be split, by using the information about the split shape mode and, in this case, the information about the split shape mode may indicate the number of one or more coding units generated by splitting the coding unit. Referring to FIG. 4, when the information about the split shape mode indicates to split the current coding unit 400 or 450 into two coding units, the image decoding apparatus 100 may determine two coding units 420a and 420b, or 470a and 470b included in the current coding unit 400 or 450, by splitting the current coding unit 400 or 450 based on the information about the split shape mode.

According to an embodiment, when the image decoding apparatus 100 splits the non-square current coding unit 400 or 450 based on the information about the split shape mode, the image decoding apparatus 100 may split a current coding unit, in consideration of a position of a long side of the non-square current coding unit 400 or 450. For example, the image decoding apparatus 100 may determine a plurality of coding units by splitting the current coding unit 400 in a manner that the long side of the current coding unit 400 or 450 is split, in consideration of the shape of the current coding unit 400 or 450.

According to an embodiment, when the information about the split shape mode indicates to split a coding unit into an odd number (tri split) of blocks, the image decoding apparatus 100 may determine an odd number of coding units included in the current coding unit 400 or 450. For example, when the information about the split shape mode indicates to split the current coding unit 400 or 450 into three coding units, the image decoding apparatus 100 may split the current coding unit 400 or 450 into three coding units 430a, 430b, and 430c, or 480a, 480b, and 480c.

According to an embodiment, a ratio of a width to a height of the current coding unit 400 or 450 may be 4:1 or 1:4. When the ratio of the width to the height is 4:1, a length of the width is greater than a length of the height, and thus block shape information may indicate a horizontal direction. When the ratio of the width to the height is 1:4, a length of the width is smaller than a length of the height, and thus the block shape information may indicate a vertical direction. The image decoding apparatus 100 may determine to split the current coding unit into an odd number of blocks, based on the information about the split shape mode. Also, the image decoding apparatus 100 may determine a split direction of the current coding unit 400 or 450, based on the block shape information of the current coding unit 400 or 450. For example, when the current coding unit 400 is in a vertical direction, the image decoding apparatus 100 may horizontally split the current coding unit 400 and thus may determine the coding units 430a, 430b, and 430c. Also, when the current coding unit 450 is in a horizontal direction, the image decoding apparatus 100 may vertically split the current coding unit 450 and thus may determine the coding units 480a, 480b, and 480c.

According to an embodiment, the image decoding apparatus 100 may determine an odd number of coding units included in the current coding unit 400 or 450, and sizes of all of the determined coding units may not be equal. For example, a preset coding unit 430b or 480b from among the determined odd number of coding units 430a, 430b, and 430c, or 480a, 480b, and 480c may have a size different from the size of the other coding units 430a and 430c, or 480a and 480c. That is, coding units which may be determined by splitting the current coding unit 400 or 450 may have multiple sizes and, in some cases, all of the odd number of coding units 430a, 430b, and 430c, or 480a, 480b, and 480c may have different sizes.

According to an embodiment, when the information about the split shape mode indicates to split a coding unit into an odd number of blocks, the image decoding apparatus 100 may determine an odd number of coding units included in the current coding unit 400 or 450, and may put a preset restriction on at least one coding unit from among the odd number of coding units obtained by splitting the current coding unit 400 or 450. Referring to FIG. 4, the image decoding apparatus 100 may allow a decoding method for the coding unit 430b or 480b to be different from that of the other coding units 430a and 430c, or 480a and 480c, wherein the coding unit 430b or 480b is at a center position from among the three coding units 430a, 430b, and 430c, or 480a, 480b, and 480c obtained by splitting the current coding unit 400 or 450. For example, the image decoding apparatus 100 may restrict the coding unit 430b or 480b at the center position to be no longer split or to be split only a preset number of times, unlike the other coding units 430a and 430c, or 480a and 480c.

Figure 5:
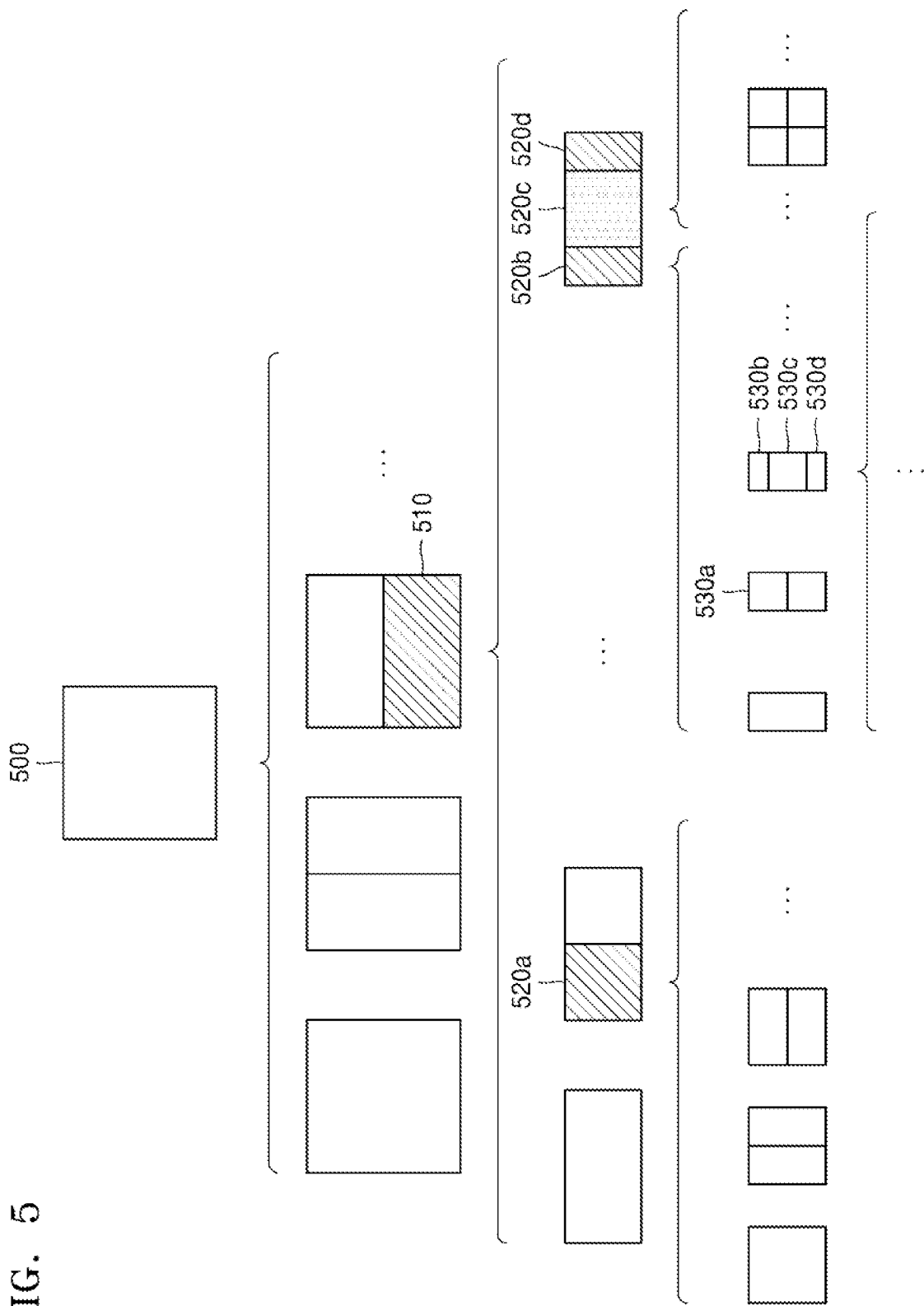
FIG. 5 illustrates a process of splitting a coding unit based on at least one of block shape information and split shape information, according to an embodiment.

FIG. 5 illustrates a process, performed by the image decoding apparatus 100, of splitting a coding unit based on at least one of block shape information and information about a split shape mode, according to an embodiment.

According to an embodiment, the image decoding apparatus 100 may determine to split or not to split a square first coding unit 500 into coding units, based on at least one of the block shape information and the information about the split shape mode. According to an embodiment, when the information about the split shape mode indicates to split a first coding unit 500 in a horizontal direction, the image decoding apparatus 100 may determine a second coding unit 510 by splitting the first coding unit 500 in a horizontal direction. A first coding unit, a second coding unit, and a third coding unit used according to an embodiment are terms used to understand a relation before and after splitting a coding unit. For example, the second coding unit may be determined by splitting the first coding unit, and the third coding unit may be determined by splitting the second coding unit. Hereinafter, it will be understood that a relation among the first coding unit, the second coding unit, and the third coding unit follows the above descriptions.

According to an embodiment, the image decoding apparatus 100 may determine not to split or to split the determined second coding unit 510 into coding units, based on at least one of the block shape information and the information about the split shape mode. Referring to FIG. 5, the image decoding apparatus 100 may not split the non-square second coding unit 510 or may split the non-square second coding unit 510, which is determined by splitting the first coding unit 500, into one or more third coding units 520a, or 520b, 520c, and 520d based on at least one of the block shape information and the information about the split shape mode. The image decoding apparatus 100 may obtain at least one of the block shape information and the information about the split shape mode, and may split a plurality of various-shape second coding units (e.g., 510) by splitting the first coding unit 500, based on at least one of the obtained block shape information and the obtained information about the split shape mode, and the second coding unit 510 may be split by using the splitting method of the first coding unit 500, based on at least one of the block shape information and the information about the split shape mode. According to an embodiment, when the first coding unit 500 is split into the second coding units 510 based on at least one of the block shape information and the information about the split shape mode of the first coding unit 500, the second coding unit 510 may also be split into the third coding units 520a, or 520b, 520c, and 520d, based on at least one of the block shape information and the information about the split shape mode of the second coding unit 510. That is, a coding unit may be recursively split based on at least one of the block shape information and the information about the split shape mode of each coding unit. Therefore, a square coding unit may be determined by splitting a non-square coding unit, and a non-square coding unit may be determined by recursively splitting the square coding unit.

Referring to FIG. 5, a preset coding unit (e.g., a coding unit at a center position or a square coding unit) from among an odd number of third coding units 520b, 520c, and 520d determined by splitting the non-square second coding unit 510 may be recursively split. According to an embodiment, the square third coding unit 520b from among the odd number of third coding units 520b, 520c, and 520d may be split in a horizontal direction into a plurality of fourth coding units. A non-square fourth coding unit 530b or 530d from among the plurality of fourth coding units 530a, 530b, 530c, and 530d may be split into a plurality of coding units. For example, the non-square fourth coding unit 530b or 530d may be split into an odd number of coding units again. A method that may be used to recursively split a coding unit will be described below in various embodiments.

According to an embodiment, the image decoding apparatus 100 may split each of the third coding units 520a, or 520b, 520c, and 520d into coding units, based on at least one of the block shape information and the information about the split shape mode. Also, the image decoding apparatus 100 may determine not to split the second coding unit 510 based on at least one of the block shape information and the information about the split shape mode. According to an embodiment, the image decoding apparatus 100 may split the non-square second coding unit 510 into the odd number of third coding units 520b, 520c, and 520d. The image decoding apparatus 100 may put a preset restriction on a preset third coding unit from among the odd number of third coding units 520b, 520c, and 520d. For example, the image decoding apparatus 100 may restrict the third coding unit 520c at a center position from among the odd number of third coding units 520b, 520c, and 520d to be no longer split or to be split a settable number of times.

Referring to FIG. 5, the image decoding apparatus 100 may restrict the third coding unit 520c, which is at the center position from among the odd number of third coding units 520b, 520c, and 520d included in the non-square second coding unit 510, to be no longer split, to be split by using a preset splitting method (e.g., split into only four coding units or split by using a splitting method of the second coding unit 510), or to be split only a preset number of times (e.g., split only n times (where n>0)). However, the restrictions on the third coding unit 520c at the center position are not limited to the above-described examples, and may include various restrictions for decoding the third coding unit 520c at the center position differently from the other third coding units 520b and 520d.

According to an embodiment, the image decoding apparatus 100 may obtain at least one of the block shape information and the information about the split shape mode, which is used to split a current coding unit, from a preset position in the current coding unit.

Figure 6:
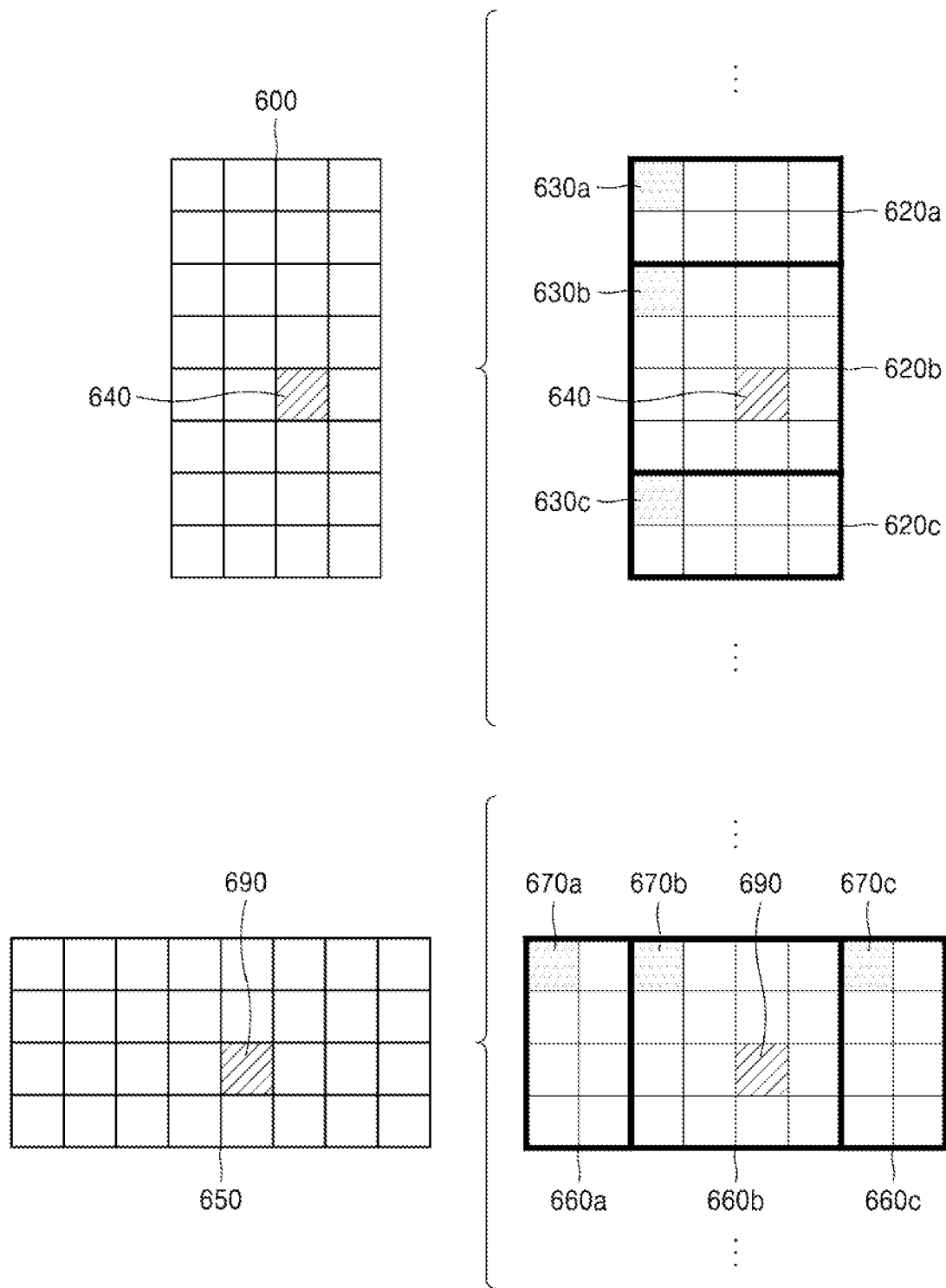
FIG. 6 illustrates a method of determining a preset coding unit from among an odd number of coding units, according to an embodiment.

FIG. 6 illustrates a method, performed by the image decoding apparatus 100, of determining a preset coding unit from among an odd number of coding units, according to an embodiment.

Referring to FIG. 6, at least one of block shape information and information about a split shape mode of a current coding unit 600 or 650 may be obtained from a sample of a preset position from among a plurality of samples included in the current coding unit 600 or 650 (e.g., a sample 640 or 690 of a center position). However, the preset position in the current coding unit 600, from which at least one of the block shape information and the information about the split shape mode may be obtained, is not limited to the center position in FIG. 6, and may include various positions included in the current coding unit 600 (e.g., top, bottom, left, right, upper-left, lower-left, upper-right, lower-right positions). The image decoding apparatus 100 may obtain at least one of the block shape information and the information about the split shape mode from the preset position and may determine not to split or to split the current coding unit into various-shaped and various-sized coding units.

According to an embodiment, when the current coding unit is split into a preset number of coding units, the image decoding apparatus 100 may select one of the coding units. Various methods may be used to select one of a plurality of coding units, and descriptions about the various methods will be provided below in various embodiments.

According to an embodiment, the image decoding apparatus 100 may split the current coding unit into a plurality of coding units, and may determine a coding unit at a preset position.

According to an embodiment, the image decoding apparatus 100 may use information indicating respective positions of an odd number of coding units so as to determine a coding unit at a center position from among the odd number of coding units. Referring to FIG. 6, the image decoding apparatus 100 may determine an odd number of coding units 620a, 620b, and 620c or an odd number of coding units 660a, 660b, and 660c by splitting the current coding unit 600 or the current coding unit 650. The image decoding apparatus 100 may determine the coding unit 620b at a center position or the coding unit 660b at a center position by using information about positions of the odd number of coding units 620a, 620b, and 620c or the odd number of coding units 660a, 660b, and 660c. For example, the image decoding apparatus 100 may determine the coding unit 620b of the center position by determining the positions of the coding units 620a, 620b, and 620c, based on information indicating positions of preset samples included in the coding units 620a, 620b, and 620c. In detail, the image decoding apparatus 100 may determine the coding unit 620b at the center position by determining the positions of the coding units 620a, 620b, and 620c, based on information indicating positions of top-left samples 630a, 630b, and 630c of the coding units 620a, 620b, and 620c.

According to an embodiment, the information indicating the positions of the top-left samples 630a, 630b, and 630c, which are included in the coding units 620a, 620b, and 620c, respectively, may include information about positions or coordinates of the coding units 620a, 620b, and 620c in a picture. According to an embodiment, the information indicating the positions of the top-left samples 630a, 630b, and 630c, which are included in the coding units 620a, 620b, and 620c, respectively, may include information indicating widths or heights of the coding units 620a, 620b, and 620c included in the current coding unit 600, and the widths or heights may correspond to information indicating differences between the coordinates of the coding units 620a, 620b, and 620c in the picture. That is, the image decoding apparatus 100 may determine the coding unit 620b at the center position by directly using the information about the positions or coordinates of the coding units 620a, 620b, and 620c in the picture, or by using the information about the widths or heights of the coding units, which correspond to the difference values between the coordinates.

According to an embodiment, information indicating the position of the top-left sample 630a of the upper coding unit 620a may include coordinates (xa, ya), information indicating the position of the top-left sample 630b of the middle coding unit 620b may include coordinates (xb, yb), and information indicating the position of the top-left sample 630c of the lower coding unit 620c may include coordinates (xc, yc). The image decoding apparatus 100 may determine the middle coding unit 620b by using the coordinates of the top-left samples 630a, 630b, and 630c which are included in the coding units 620a, 620b, and 620c, respectively. For example, when the coordinates of the top-left samples 630a, 630b, and 630c are sorted in an ascending or descending order, the coding unit 620b including the coordinates (xb, yb) of the sample 630b at a center position may be determined as a coding unit at a center position from among the coding units 620a, 620b, and 620c determined by splitting the current coding unit 600. However, the coordinates indicating the positions of the top-left samples 630a, 630b, and 630c may include coordinates indicating absolute positions in the picture, or may use coordinates (dxb, dyb) indicating a relative position of the top-left sample 630b of the middle coding unit 620b and coordinates (dxc, dyc) indicating a relative position of the top-left sample 630c of the lower coding unit 620c with reference to the position of the top-left sample 630a of the upper coding unit 620a. Also, a method of determining a coding unit at a preset position by using coordinates of a sample included in the coding unit as information indicating a position of the sample is not limited to the above-described method, and may include various arithmetic methods capable of using the coordinates of the sample.

According to an embodiment, the image decoding apparatus 100 may split the current coding unit 600 into the plurality of coding units 620a, 620b, and 620c, and may select one of the coding units 620a, 620b, and 620c based on a preset criterion. For example, the image decoding apparatus 100 may select the coding unit 620b, which has a size different from that of the others, from among the coding units 620a, 620b, and 620c.

According to an embodiment, the image decoding apparatus 100 may determine the widths or heights of the coding units 620a, 620b, and 620c by using the coordinates (xa, ya) indicating the position of the top-left sample 630a of the upper coding unit 620a, the coordinates (xb, yb) indicating the position of the top-left sample 630b of the middle coding unit 620b, and the coordinates (xc, yc) indicating the position of the top-left sample 630c of the lower coding unit 620c. The image decoding apparatus 100 may determine the respective sizes of the coding units 620a, 620b, and 620c by using the coordinates (xa, ya), (xb, yb), and (xc, yc) indicating the positions of the coding units 620a, 620b, and 620c. According to an embodiment, the image decoding apparatus 100 may determine the width of the upper coding unit 620a to be a width of the current coding unit 600. The image decoding apparatus 100 may determine the height of the upper coding unit 620a to be yb-ya. According to an embodiment, the image decoding apparatus 100 may determine the width of the middle coding unit 620b to be a width of the current coding unit 600. The image decoding apparatus 100 may determine the height of the middle coding unit 620b to be yc-yb. According to an embodiment, the image decoding apparatus 100 may determine the width or height of the lower coding unit 620c by using the width or height of the current coding unit 600 or the widths or heights of the upper and middle coding units 620a and 620b. The image decoding apparatus 100 may determine a coding unit, which has a size different from that of the others, based on the determined widths and heights of the coding units 620a to 620c. Referring to FIG. 6, the image decoding apparatus 100 may determine the middle coding unit 620b, which has a size different from the size of the upper and lower coding units 620a and 620c, as the coding unit of the preset position. However, the above-described method, performed by the image decoding apparatus 100, of determining a coding unit having a size different from the size of the other coding units merely corresponds to an example of determining a coding unit at a preset position by using the sizes of coding units, which are determined based on coordinates of samples, and thus various methods of determining a coding unit at a preset position by comparing the sizes of coding units, which are determined based on coordinates of preset samples, may be used.

The image decoding apparatus 100 may determine a width or a height of each of the coding units 660a, 660b, and 660c by using coordinates (xd, yd) that are information indicating a position of a top-left sample 670a of the left coding unit 660a, coordinates (xe, ye) that are information indicating a position of a top-left sample 670b of the middle coding unit 660b, and coordinates (xf, yf) that are information indicating a position of a top-left sample 670c of the right coding unit 660c. The image decoding apparatus 100 may determine sizes of the coding units 660a, 660b, and 660c by using the coordinates (xd, yd), (xe, ye), and (xf, yf) indicating positions of the coding units 660a, 660b, and 660c.

According to an embodiment, the image decoding apparatus 100 may determine the width of the left coding unit 660a to be xe-xd. The image decoding apparatus 100 may determine the height of the left coding unit 660a as the height of the current coding unit 650. According to an embodiment, the image decoding apparatus 100 may determine the width of the middle coding unit 660b to be xf-xe. The image decoding apparatus 100 may determine the height of the middle coding unit 660b to be the height of the current coding unit 600. According to an embodiment, the image decoding apparatus 100 may determine the width or the height of the right coding unit 660c by using the width or the height of the current coding unit 650 and the width and the height of the left coding unit 660a and the middle coding unit 660b. The image decoding apparatus 100 may determine a coding unit, which has a size different from that of the others, based on the determined widths and heights of the coding units 660a, 660b, and 660c. Referring to FIG. 6, the image decoding apparatus 100 may determine the middle coding unit 660b, which has a size different from the size of the left coding unit 660a and the right coding unit 660c, as the coding unit of the preset position. However, the above-described method, performed by the image decoding apparatus 100, of determining a coding unit having a size different from the size of the other coding units merely corresponds to an example of determining a coding unit at a preset position by using the sizes of coding units, which are determined based on coordinates of samples, and thus various methods of determining a coding unit at a preset position by comparing the sizes of coding units, which are determined based on coordinates of preset samples, may be used.

However, positions of samples considered to determine positions of coding units are not limited to the above-described top-left positions, and information about arbitrary positions of samples included in the coding units may be used.

According to an embodiment, the image decoding apparatus 100 may select a coding unit at a preset position from among an odd number of coding units determined by splitting the current coding unit, in consideration of the shape of the current coding unit. For example, when the current coding unit has a non-square shape, a width of which is longer than a height, the image decoding apparatus 100 may determine the coding unit at the preset position in a horizontal direction. That is, the image decoding apparatus 100 may determine one of coding units at different positions in a horizontal direction and may put a restriction on the coding unit. When the current coding unit has a non-square shape, a height of which is longer than a width, the image decoding apparatus 100 may determine the coding unit at the preset position in a vertical direction. That is, the image decoding apparatus 100 may determine one of coding units at different positions in a vertical direction and may put a restriction on the coding unit.

According to an embodiment, the image decoding apparatus 100 may use information indicating respective positions of an even number of coding units, to determine the coding unit at the preset position from among the even number of coding units. The image decoding apparatus 100 may determine an even number of coding units by splitting the current coding unit, and may determine the coding unit at the preset position by using the information about the positions of the even number of coding units. An operation related thereto may correspond to the operation of determining a coding unit at a preset position (e.g., a center position) from among an odd number of coding units, which has been described in detail above in relation to FIG. 6, and thus detailed descriptions thereof are not provided here.

According to an embodiment, when a non-square current coding unit is split into a plurality of coding units, preset information about a coding unit at a preset position may be used in a splitting operation to determine the coding unit at the preset position from among the plurality of coding units. For example, the image decoding apparatus 100 may use at least one of block shape information and information about a split shape mode, which is stored in a sample included in a coding unit at a center position, in a splitting operation to determine the coding unit at the center position from among the plurality of coding units determined by splitting the current coding unit.

Referring to FIG. 6, the image decoding apparatus 100 may split the current coding unit 600 into the plurality of coding units 620a, 620b, and 620c based on at least one of the block shape information and the information about the split shape mode, and may determine the coding unit 620b at a center position from among the plurality of the coding units 620a, 620b, and 620c. Furthermore, the image decoding apparatus 100 may determine the coding unit 620b at the center position, in consideration of a position from which at least one of the block shape information and the information about the split shape mode is obtained. That is, at least one of the block shape information and the information about the split shape mode of the current coding unit 600 may be obtained from the sample 640 at a center position of the current coding unit 600 and, when the current coding unit 600 is split into the plurality of coding units 620a, 620b, and 620c based on at least one of the block shape information and the information about the split shape mode, the coding unit 620b including the sample 640 may be determined as the coding unit at the center position. However, information used to determine the coding unit at the center position should not be construed as being limited to at least one of the block shape information and the information about the split shape mode, and various kinds of information may be used to determine the coding unit at the center position.

According to an embodiment, preset information for identifying the coding unit at the preset position may be obtained from a preset sample included in a coding unit to be determined. Referring to FIG. 6, the image decoding apparatus 100 may use at least one of the block shape information and the information about the split shape mode, which is obtained from a sample at a preset position in the current coding unit 600 (e.g., a sample at a center position of the current coding unit 600) to determine a coding unit at a preset position from among the plurality of the coding units 620a, 620b, and 620c determined by splitting the current coding unit 600 (e.g., a coding unit at a center position from among a plurality of split coding units). That is, the image decoding apparatus 100 may determine the sample at the preset position by considering a block shape of the current coding unit 600, determine the coding unit 620b including a sample, from which preset information (e.g., at least one of the block shape information and the information about the split shape mode) may be obtained, from among the plurality of coding units 620a, 620b, and 620c determined by splitting the current coding unit 600, and may put a preset restriction on the coding unit 620b. Referring to FIG. 6, according to an embodiment, the image decoding apparatus 100 may determine the sample 640 at the center position of the current coding unit 600 as the sample from which the preset information may be obtained, and may put a preset restriction on the coding unit 620*b* including the sample 640, in a decoding operation. However, the position of the sample from which the preset information may be obtained is not limited to the above-described position, and may include arbitrary positions of samples included in the coding unit 620*b* to be determined for a restriction.

According to an embodiment, the position of the sample from which the preset information may be obtained may be determined based on the shape of the current coding unit 600. According to an embodiment, the block shape information may indicate whether the current coding unit has a square or non-square shape, and the position of the sample from which the preset information may be obtained may be determined based on the shape. For example, the image decoding apparatus 100 may determine a sample located on a boundary for dividing at least one of a width and height of the current coding unit in half, as the sample from which the preset information may be obtained, by using at least one of information about the width of the current coding unit and information about the height of the current coding unit. As another example, when the block shape information of the current coding unit indicates a non-square shape, the image decoding apparatus 100 may determine one of samples adjacent to a boundary for dividing a long side of the current coding unit in half, as the sample from which the preset information may be obtained.

According to an embodiment, when the current coding unit is split into a plurality of coding units, the image decoding apparatus 100 may use at least one of the block shape information and the information about the split shape mode to determine a coding unit at a preset position from among the plurality of coding units. According to an embodiment, the image decoding apparatus 100 may obtain at least one of the block shape information and the information about the split shape mode from a sample at a preset position in a coding unit, and may split the plurality of coding units, which are generated by splitting the current coding unit, by using at least one of the block shape information and the information about the split shape mode, which is obtained from the sample of the preset position in each of the plurality of coding units. That is, a coding unit may be recursively split based on at least one of the block shape information and the information about the split shape mode, which is obtained from the sample at the preset position in each coding unit. An operation of recursively splitting a coding unit has been described above in relation to FIG. 5, and thus detailed descriptions thereof are not provided here.

According to an embodiment, the image decoding apparatus 100 may determine one or more coding units by splitting the current coding unit, and may determine an order of decoding the one or more coding units, based on a preset block (e.g., the current coding unit).

Figure 7:
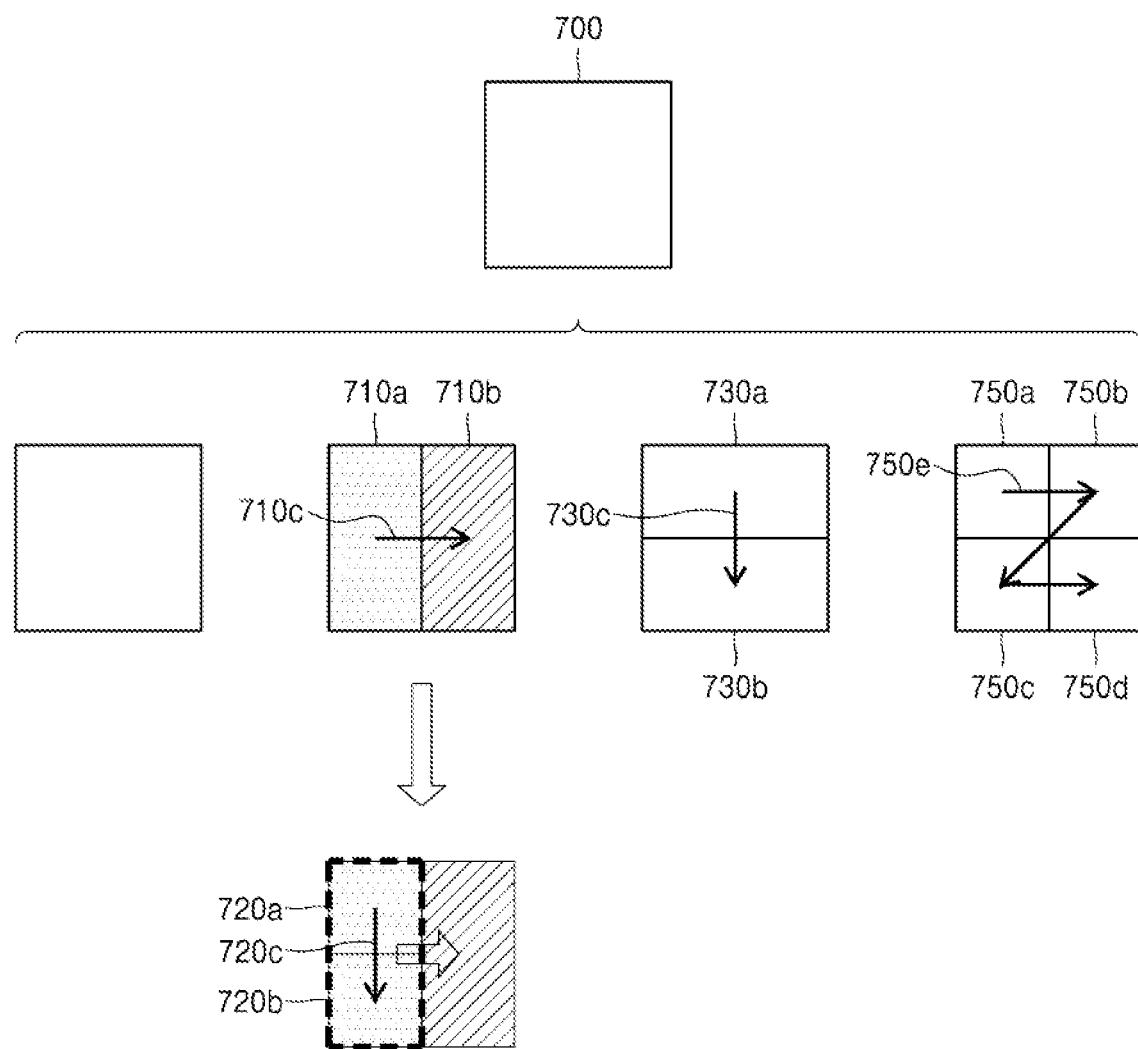
FIG. 7 illustrates an order of processing a plurality of coding units when the plurality of coding units are determined by splitting a current coding unit, according to an embodiment.

FIG. 7 illustrates an order of processing a plurality of coding units when the image decoding apparatus 100 determines the plurality of coding units by splitting a current coding unit, according to an embodiment.

According to an embodiment, the image decoding apparatus 100 may determine second coding units 710*a* and 710*b* by splitting a first coding unit 700 in a vertical direction, may determine second coding units 730*a* and 730*b* by splitting the first coding unit 700 in a horizontal direction, or may determine second coding units 750*a* to 750*d* by splitting the first coding unit 700 in vertical and horizontal directions, based on block shape information and information about a split shape mode.

Referring to FIG. 7, the image decoding apparatus 100 may determine to process the second coding units 710*a* and 710*b*, which are determined by splitting the first coding unit 700 in a vertical direction, in a horizontal direction order 710*c*. The image decoding apparatus 100 may determine to process the second coding units 730*a* and 730*b*, which are determined by splitting the first coding unit 1400 in a horizontal direction, in a vertical direction order 730*c*. The image decoding apparatus 100 may determine to process the second coding units 750*a* to 750*d*, which are determined by splitting the first coding unit 700 in vertical and horizontal directions, according to a preset order (e.g., a raster scan order or Z-scan order 750*e*) by which coding units in a row are processed and then coding units in a next row are processed.

According to an embodiment, the image decoding apparatus 100 may recursively split coding units. Referring to FIG. 7, the image decoding apparatus 100 may determine the plurality of coding units 710*a*, 710*b*, 730*a*, 730*b*, 750*a*, 750*b*, 750*c*, and 750*d* by splitting the first coding unit 700, and may recursively split each of the determined plurality of coding units 710*a*, 710*b*, 730*a*, 730*b*, 750*a*, 750*b*, 750*c*, and 750*d*. A splitting method of the plurality of coding units 710*a*, 710*b*, 730*a*, 730*b*, 750*a*, 750*b*, 750*c*, and 750*d* may correspond to a splitting method of the first coding unit 700. As such, each of the plurality of coding units 710*a*, 710*b*, 730*a*, 730*b*, 750*a*, 750*b*, 750*c*, and 750*d* may be independently split into a plurality of coding units. Referring to FIG. 7, the image decoding apparatus 100 may determine the second coding units 710*a* and 710*b* by splitting the first coding unit 700 in a vertical direction, and may determine to independently split or not to split each of the second coding units 710*a* and 710*b*.

According to an embodiment, the image decoding apparatus 100 may determine third coding units 720*a* and 720*b* by splitting the left second coding unit 710*a* in a horizontal direction, and may not split the right second coding unit 710*b*.

According to an embodiment, a processing order of coding units may be determined based on an operation of splitting a coding unit. In other words, a processing order of split coding units may be determined based on a processing order of coding units immediately before being split. The image decoding apparatus 100 may determine a processing order of the third coding units 720*a* and 720*b* determined by splitting the left second coding unit 710*a*, independently of the right second coding unit 710*b*. Because the third coding units 720*a* and 720*b* are determined by splitting the left second coding unit 710*a* in a horizontal direction, the third coding units 720*a* and 720*b* may be processed in a vertical direction order 720*c*. Because the left and right second coding units 710*a* and 710*b* are processed in the horizontal direction order 710*c*, the right second coding unit 710*b* may be processed after the third coding units 720*a* and 720*b* included in the left second coding unit 710*a* are processed in the vertical direction order 720*c*. An operation of determining a processing order of coding units based on a coding unit before being split is not limited to the above-described example, and various methods may be used to independently process coding units, which are split and determined to various shapes, in a preset order.

Figure 8:
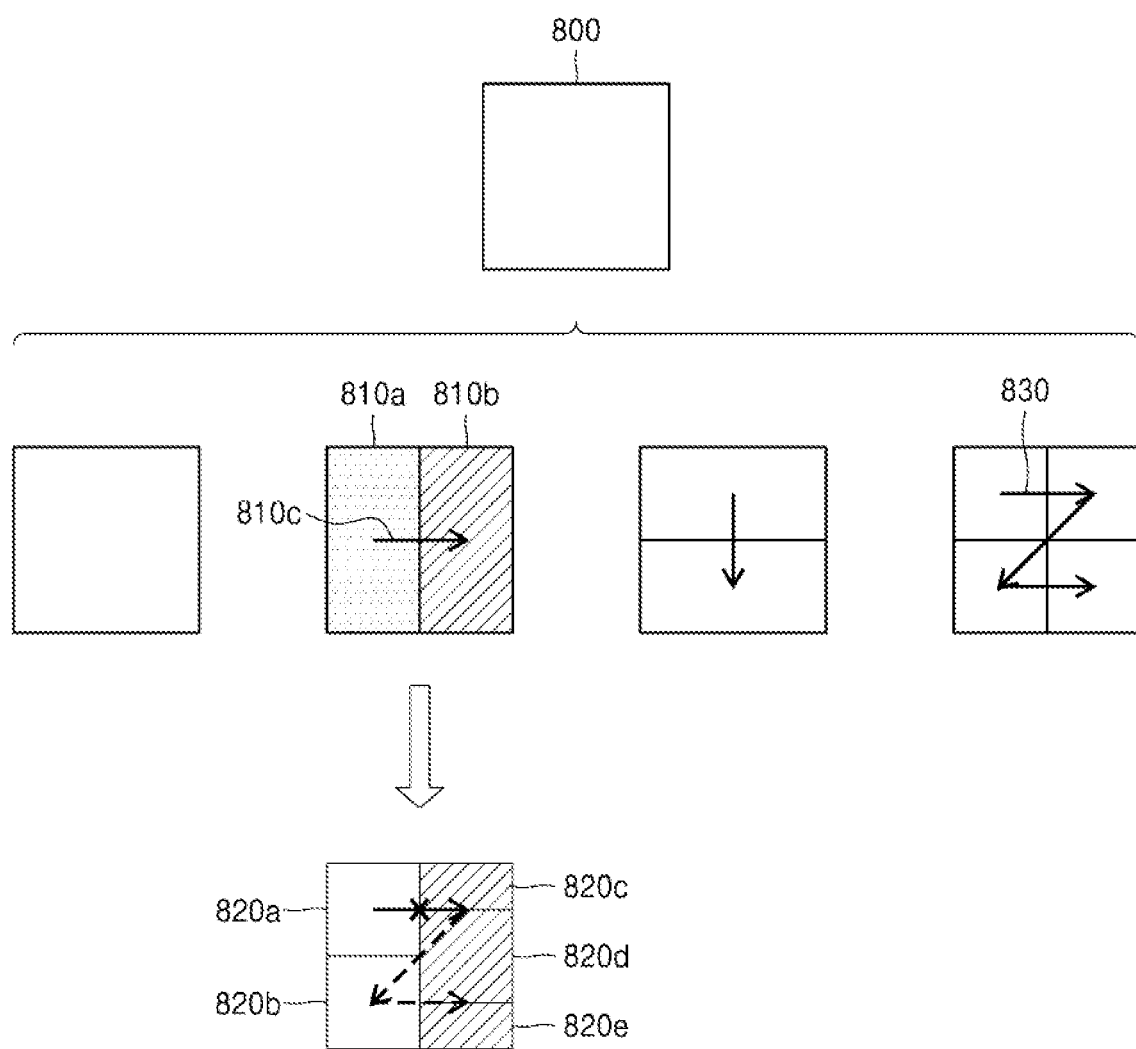
FIG. 8 illustrates a process of determining that a current coding unit is to be split into an odd number of coding units, when coding units are not processable in a preset order, according to an embodiment.

FIG. 8 illustrates a process, performed by the image decoding apparatus 100, of determining that a current coding unit is to be split into an odd number of coding units, when the coding units are not processable in a preset order, according to an embodiment.

According to an embodiment, the image decoding apparatus 100 may determine whether the current coding unit is split into an odd number of coding units, based on obtained block shape information and information about a split shape mode. Referring to FIG. 8, a square first coding unit 800 may be split into non-square second coding units 810a and 810b, and the second coding units 810a and 810b may be independently split into third coding units 820a and 820b, and 820c, 820d and 820e. According to an embodiment, the image decoding apparatus 100 may determine the plurality of third coding units 820a and 820b by splitting the left second coding unit 810a in a horizontal direction, and may split the right second coding unit 810b into an odd number of third coding units 820c to 820e.

According to an embodiment, the image decoding apparatus 100 may determine whether any coding unit is split into an odd number of coding units, by determining whether the third coding units 820a and 820b, and 820c to 820e are processable in a preset order. Referring to FIG. 8, the image decoding apparatus 100 may determine the third coding units 820a and 820b, and 820c to 820e by recursively splitting the first coding unit 800. The image decoding apparatus 100 may determine whether any of the first coding unit 800, the second coding units 810a and 810b, and the third coding units 820a and 820b, and 820c, 820d, and 820e are split into an odd number of coding units, based on at least one of the block shape information and the information about the split shape mode. For example, a second coding unit 810b positioned in the right from among the second coding units 810a and 810b may be split into an odd number of third coding units 820c, 820d, and 820e. A processing order of a plurality of coding units included in the first coding unit 800 may be a preset order (e.g., a Z-scan order 830), and the image decoding apparatus 100 may decide whether the third coding units 820c, 820d, and 820e, which are determined by splitting the right second coding unit 810b into an odd number of coding units, satisfy a condition for processing in the preset order.

According to an embodiment, the image decoding apparatus 100 may determine whether the third coding units 820a and 820b, and 820c, 820d, and 820e included in the first coding unit 800 satisfy the condition for processing in the preset order, and the condition relates to whether at least one of a width and height of the second coding units 810a and 810b is to be divided in half along a boundary of the third coding units 820a and 820b, and 820c, 820d, and 820e. For example, the third coding units 820a and 820b determined by dividing the height of the non-square left second coding unit 810a in half satisfy the condition. However, because boundaries of the third coding units 820c, 820d, and 820e determined by splitting the right second coding unit 810b into three coding units do not divide the width or height of the right second coding unit 810b in half, it may be determined that the third coding units 820c, 820d, and 820e do not satisfy the condition. When the condition is not satisfied as described above, the image decoding apparatus 100 may decide disconnection of a scan order, and determine that the right second coding unit 810b is to be split into an odd number of coding units, based on a result of the decision. According to an embodiment, when a coding unit is split into an odd number of coding units, the image decoding apparatus 100 may put a preset restriction on a coding unit at a preset position among the split coding units, and the restriction or the preset position has been described above in various embodiments and thus detailed descriptions thereof are not provided here.

Figure 9:
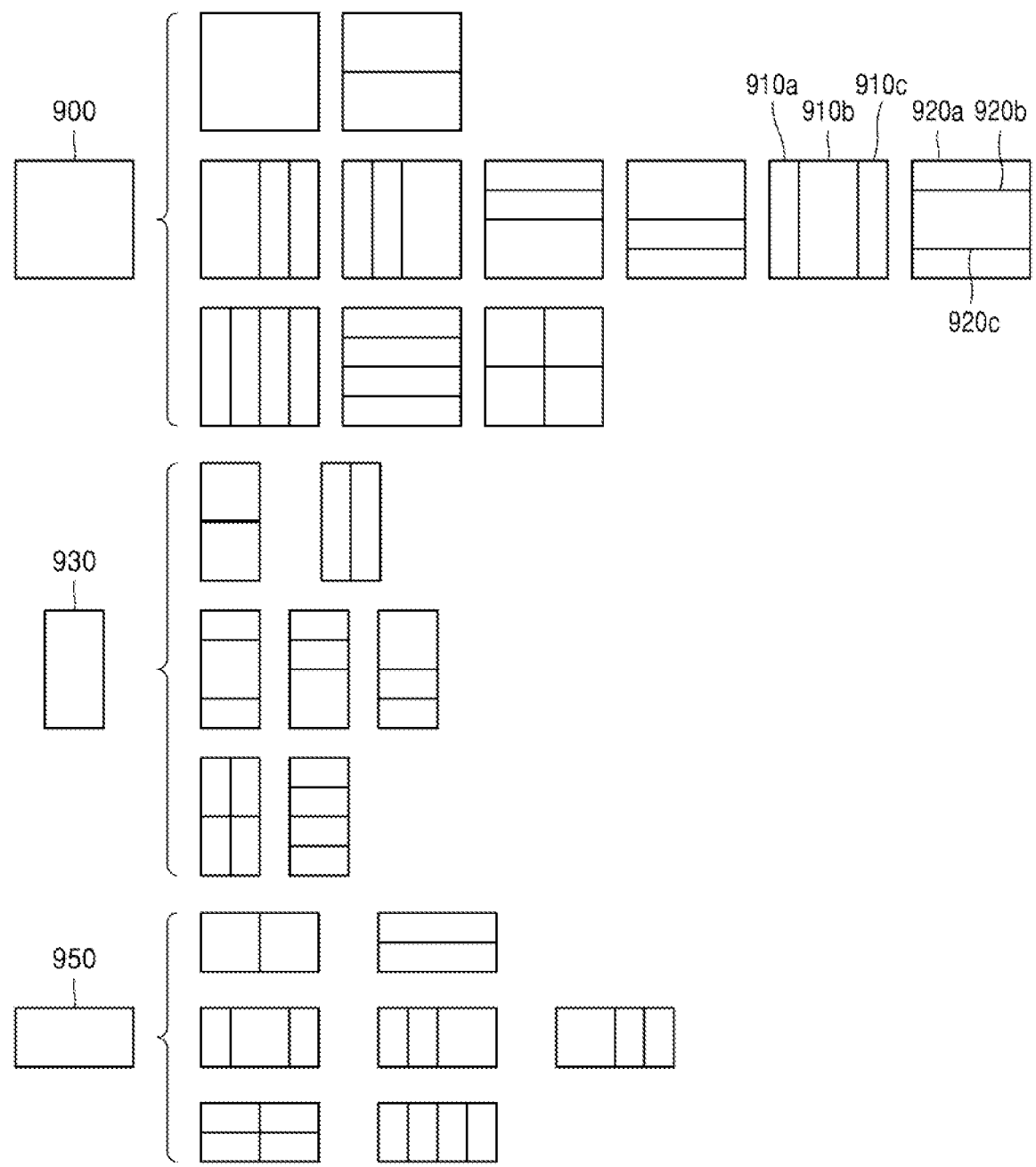
FIG. 9 illustrates a process of determining at least one coding unit by splitting a first coding unit, according to an embodiment.

FIG. 9 illustrates a process, performed by the image decoding apparatus 100, of determining at least one coding unit by splitting a first coding unit 900, according to an embodiment.

According to an embodiment, the image decoding apparatus 100 may split the first coding unit 900, based on at least one of block shape information and information about a split shape mode, which is obtained by the bitstream obtainer 110. The square first coding unit 900 may be split into four square coding units, or may be split into a plurality of non-square coding units. For example, referring to FIG. 9, when the block shape information indicates that the first coding unit 900 has a square shape and the information about the split shape mode indicates to split the first coding unit 900 into non-square coding units, the image decoding apparatus 100 may split the first coding unit 900 into a plurality of non-square coding units. In detail, when the information about the split shape mode indicates to determine an odd number of coding units by splitting the first coding unit 900 in a horizontal direction or a vertical direction, the image decoding apparatus 100 may split the square first coding unit 900 into an odd number of coding units, e.g., second coding units 910a, 910b, and 910c determined by splitting the square first coding unit 900 in a vertical direction or second coding units 920a, 920b, and 920c determined by splitting the square first coding unit 900 in a horizontal direction.

According to an embodiment, the image decoding apparatus 100 may determine whether the second coding units 910a, 910b, 910c, 920a, 920b, and 920c included in the first coding unit 900 satisfy a condition for processing in a preset order, and the condition relates to whether at least one of a width and height of the first coding unit 900 is to be divided in half along a boundary of the second coding units 910a, 910b, 910c, 920a, 920b, and 920c. Referring to FIG. 9, because boundaries of the second coding units 910a, 910b, and 910c determined by splitting the square first coding unit 900 in a vertical direction do not divide the width of the first coding unit 900 in half, it may be determined that the first coding unit 900 does not satisfy the condition for processing in the preset order. In addition, because boundaries of the second coding units 920a, 920b, and 920c determined by splitting the square first coding unit 900 in a horizontal direction do not divide the width of the first coding unit 900 in half, it may be determined that the first coding unit 900 does not satisfy the condition for processing in the preset order. When the condition is not satisfied as described above, the image decoding apparatus 100 may decide disconnection of a scan order, and may determine that the first coding unit 900 is to be split into an odd number of coding units, based on a result of the decision. According to an embodiment, when a coding unit is split into an odd number of coding units, the image decoding apparatus 100 may put a preset restriction on a coding unit at a preset position from among the split coding units, and the restriction or the preset position has been described above in relation to various embodiments and thus detailed descriptions thereof are not provided here.

According to an embodiment, the image decoding apparatus 100 may determine various-shaped coding units by splitting a first coding unit.

Referring to FIG. 9, the image decoding apparatus 100 may split the square first coding unit 900 or a non-square first coding unit 930 or 950 into various-shaped coding units.

Figure 10:
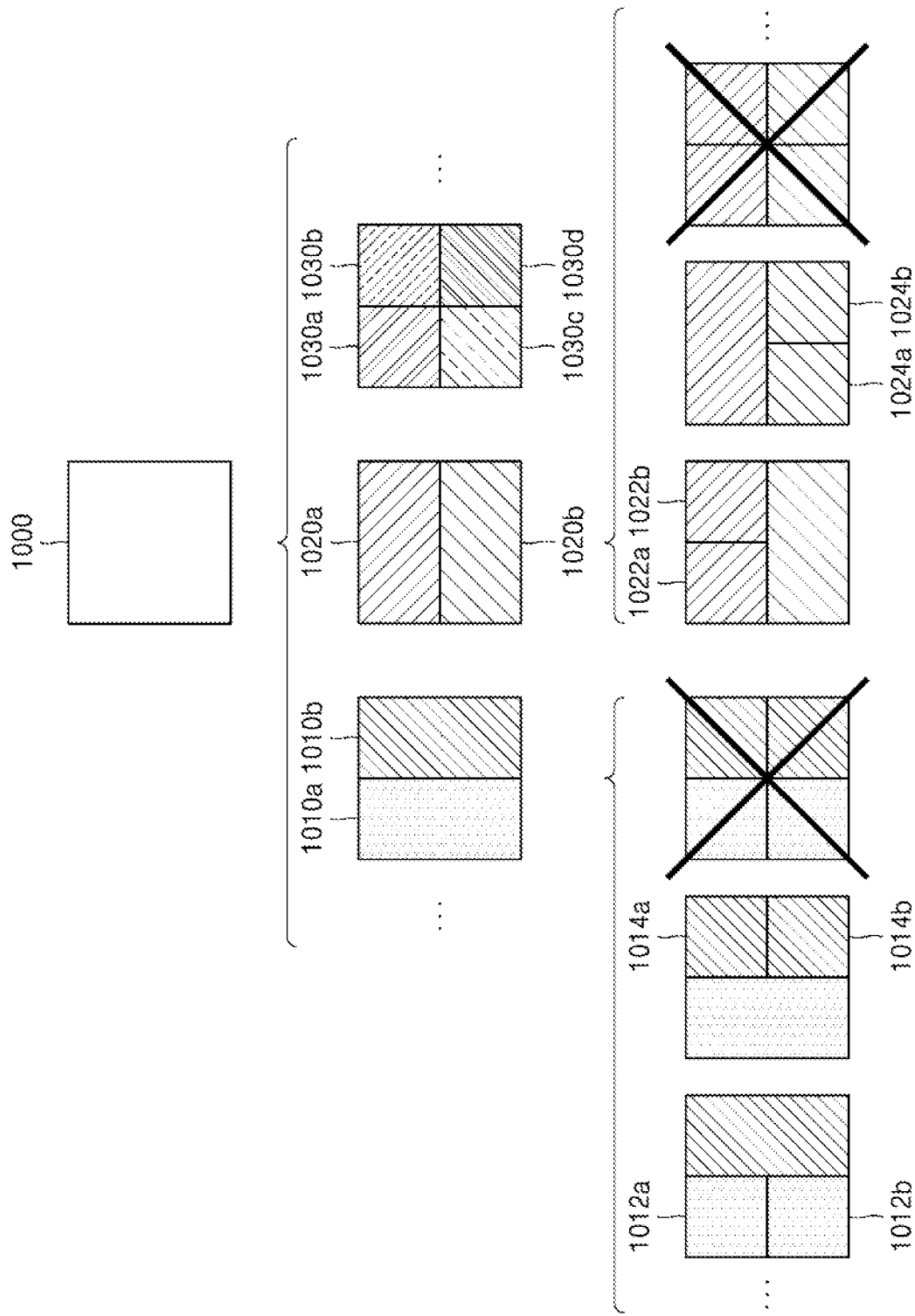
FIG. 10 illustrates that a shape into which a second coding unit is splittable is restricted when the second coding unit having a non-square shape, which is determined by splitting a first coding unit, satisfies a preset condition, according to an embodiment.

FIG. 10 illustrates that a shape into which a second coding unit is splittable by the image decoding apparatus 100 is restricted when the second coding unit having a non-square shape, which is determined by splitting a first coding unit 1000, satisfies a preset condition, according to an embodiment.

According to an embodiment, the image decoding apparatus 100 may determine to split the square first coding unit 1000 into non-square second coding units 1010a, 1010b, 1020a, and 1020b, based on at least one of block shape information and information about a split shape mode, which is obtained by the bitstream obtainer 110. The second coding units 1010a, 1010b, 1020a, and 1020b may be independently split. As such, the image decoding apparatus 100 may determine to split or not to split the first coding unit 1000 into a plurality of coding units, based on at least one of the block shape information and the information about the split shape mode of each of the second coding units 1010a, 1010b, 1020a, and 1020b. According to an embodiment, the image decoding apparatus 100 may determine third coding units 1012a and 1012b by splitting the non-square left second coding unit 1010a, which is determined by splitting the first coding unit 1000 in a vertical direction, in a horizontal direction. However, when the left second coding unit 1010a is split in a horizontal direction, the image decoding apparatus 100 may restrict the right second coding unit 1010b to not be split in a horizontal direction in which the left second coding unit 1010a is split. When third coding units 1014a and 1014b are determined by splitting the right second coding unit 1010b in a same direction, because the left and right second coding units 1010a and 1010b are independently split in a horizontal direction, the third coding units 1012a, 1012b, 1014a, and 1014b may be determined. However, this case serves equally as a case in which the image decoding apparatus 100 splits the first coding unit 1000 into four square second coding units 1030a, 1030b, 1030c, and 1030d, based on at least one of the block shape information and the information about the split shape mode, and may be inefficient in terms of image decoding.

According to an embodiment, the image decoding apparatus 100 may determine third coding units 1022a, 1022b, 1024a, and 1024b by splitting the non-square second coding unit 1020a or 1020b, which is determined by splitting the first coding unit 1000 in a horizontal direction, in a vertical direction. However, when a second coding unit (e.g., the upper second coding unit 1020a) is split in a vertical direction, for the above-described reason, the image decoding apparatus 100 may restrict the other second coding unit (e.g., the lower second coding unit 1020b) to not be split in a vertical direction in which the upper second coding unit 1020a is split.

Figure 11:
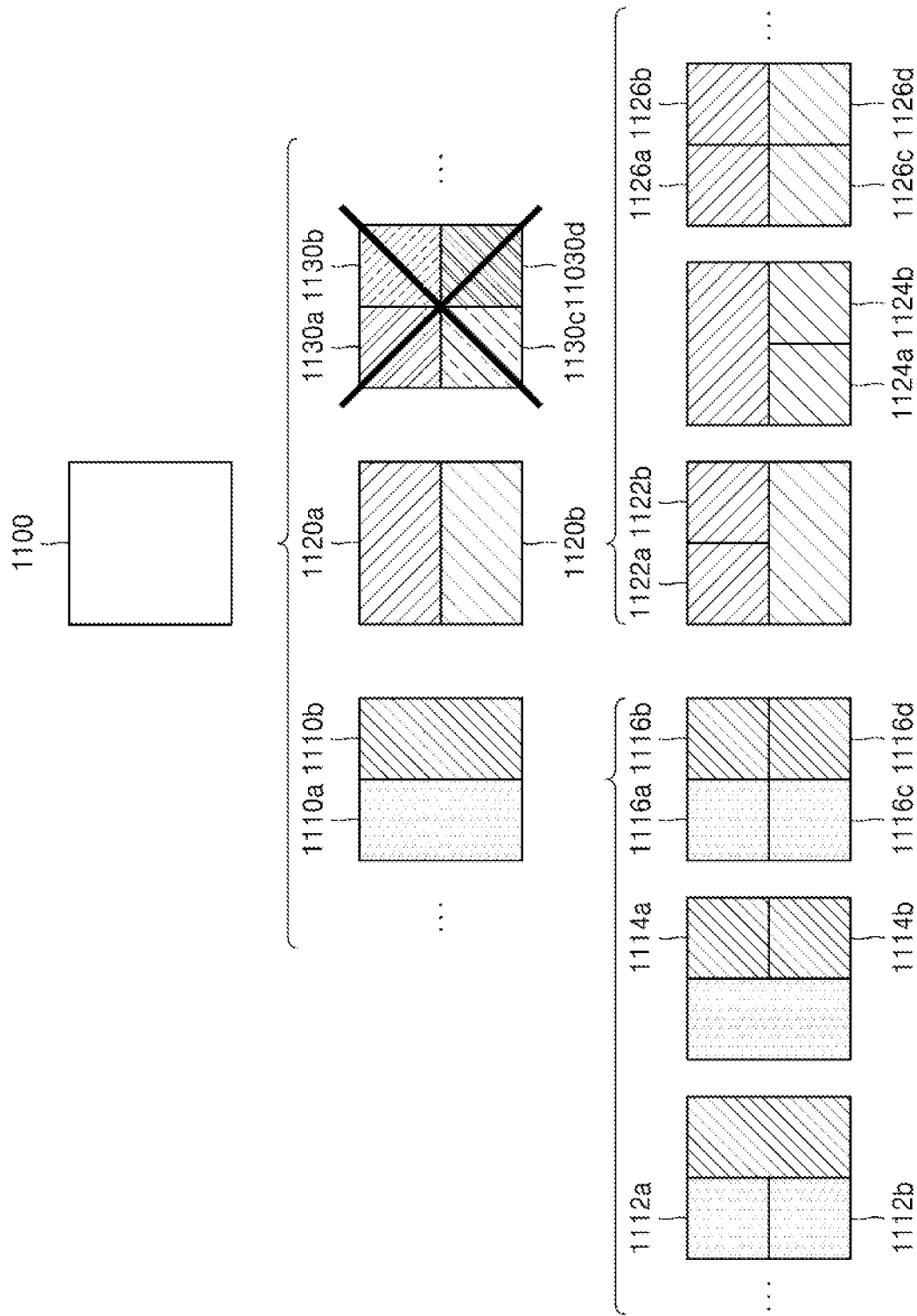
FIG. 11 illustrates a process of splitting a square coding unit when split shape information indicates that the square coding unit is not to be split into four square coding units, according to an embodiment.

FIG. 11 illustrates a process, performed by the image decoding apparatus 100, of splitting a square coding unit when information about a split shape mode indicates that the square coding unit is not to be split into four square coding units, according to an embodiment.

According to an embodiment, the image decoding apparatus 100 may determine second coding units 1110a, 1110b, 1120a, 1120b, etc. by splitting a first coding unit 1100, based on at least one of block shape information and information about a split shape mode. The information about the split shape mode may include information about various methods of splitting a coding unit but, the information about various splitting methods may not include information for splitting a coding unit into four square coding units. According to such information about a split shape mode, the image decoding apparatus 100 may not split the first square coding unit 1100 into four square second coding units 1130a, 1130b, 1130c, and 1130d. The image decoding apparatus 100 may determine the non-square second coding units 1110a, 1110b, 1120a, 1120b, etc., based on the information about the split shape mode.

According to an embodiment, the image decoding apparatus 100 may independently split the non-square second coding units 1110a, 1110b, 1120a, 1120b, etc. Each of the second coding units 1110a, 1110b, 1120a, 1120b, etc. may be recursively split in a preset order, and this splitting method may correspond to a method of splitting the first coding unit 1100, based on at least one of the block shape information and the information about the split shape mode.

For example, the image decoding apparatus 100 may determine square third coding units 1112a and 1112b by splitting the left second coding unit 1110a in a horizontal direction, and may determine square third coding units 1114a and 1114b by splitting the right second coding unit 1110b in a horizontal direction. Furthermore, the image decoding apparatus 100 may determine square third coding units 1116a, 1116b, 1116c, and 1116d by splitting both of the left and right second coding units 1110a and 1110b in a horizontal direction. In this case, coding units having the same shape as the four square second coding units 1130a, 1130b, 1130c, and 1130d split from the first coding unit 1100 may be determined.

As another example, the image decoding apparatus 100 may determine square third coding units 1122a and 1122b by splitting the upper second coding unit 1120a in a vertical direction, and may determine square third coding units 1124a and 1124b by splitting the lower second coding unit 1120b in a vertical direction. Furthermore, the image decoding apparatus 100 may determine square third coding units 1126a, 1126b, 1126c, and 1126d by splitting both of the upper and lower second coding units 1120a and 1120b in a vertical direction. In this case, coding units having the same shape as the four square second coding units 1130a, 1130b, 1130c, and 1130d split from the first coding unit 1100 may be determined.

Figure 12:
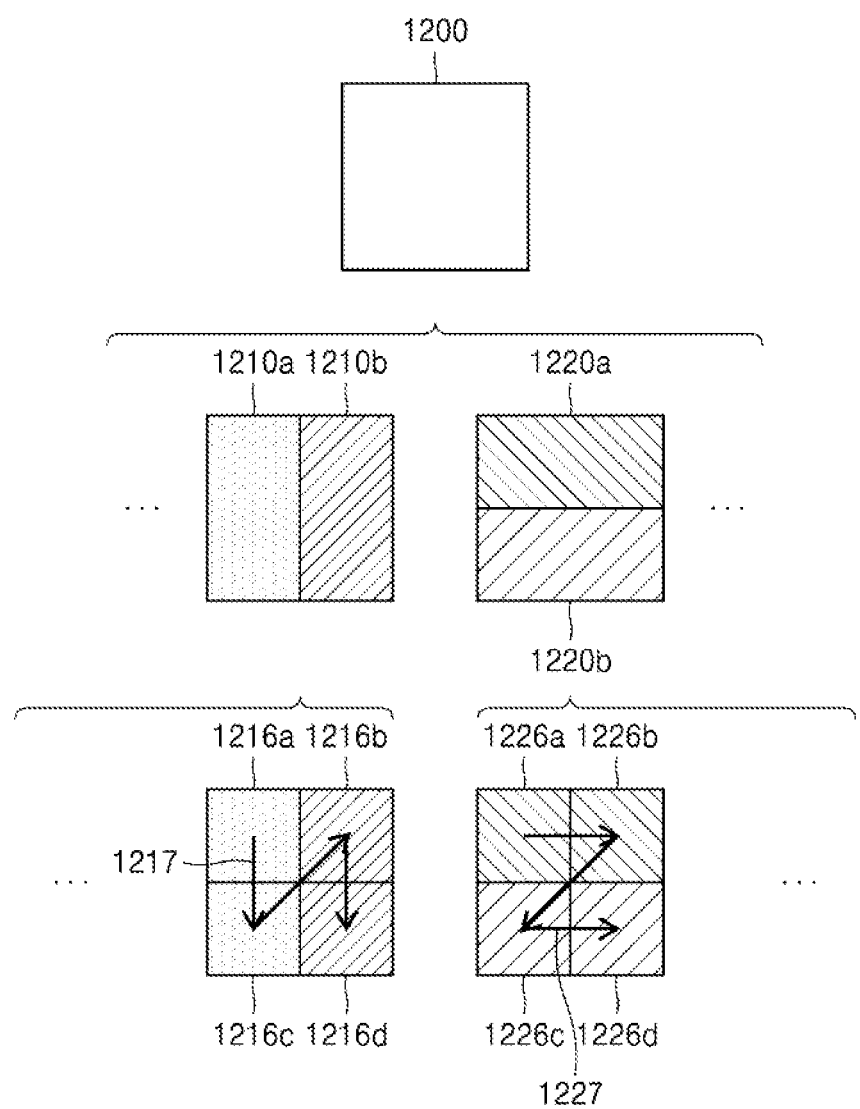
FIG. 12 illustrates that a processing order between a plurality of coding units may be changed depending on a process of splitting a coding unit, according to an embodiment.

FIG. 12 illustrates that a processing order between a plurality of coding units may be changed depending on a process of splitting a coding unit, according to an embodiment.

According to an embodiment, the image decoding apparatus 100 may split a first coding unit 1200, based on block shape information and information about a split shape mode. When the block shape information indicates a square shape and the information about the split shape mode indicates to split the first coding unit 1200 in at least one of horizontal and vertical directions, the image decoding apparatus 100 may determine second coding units 1210a, 1210b, 1220a, and 1220b, by splitting the first coding unit 1200. Referring to FIG. 12, the non-square second coding units 1210a, 1210b, 1220a, and 1220b determined by splitting the first coding unit 1200 in only a horizontal direction or vertical direction may be independently split based on the block shape information and the information about the split shape mode of each coding unit. For example, the image decoding apparatus 100 may determine third coding units 1216a, 1216b, 1216c, and 1216d by splitting the second coding units 1210a and 1210b, which are generated by splitting the first coding unit 1200 in a vertical direction, in a horizontal direction, and may determine third coding units 1226a, 1226b, 1226c, and 1226d by splitting the second coding units 1220a and 1220b, which are generated by splitting the first coding unit 1200 in a horizontal direction, in a horizontal direction. An operation of splitting the second coding units 1210a, 1210b, 1220a, and 1220b has been described above in relation to FIG. 11, and thus detailed descriptions thereof are not provided here.

According to an embodiment, the image decoding apparatus 100 may process coding units in a preset order. An operation of processing coding units in a preset order has been described above with reference to FIG. 7, and thus detailed descriptions thereof are not provided here. Referring to FIG. 12, the image decoding apparatus 100 may determine four square third coding units 1216a, 1216b, 1216c, and 1216d, and 1226a, 1226b, 1226c, and 1226d by splitting the square first coding unit 1200. According to an embodiment, the image decoding apparatus 100 may determine processing orders of the third coding units 1216a, 1216b, 1216c, and 1216d, and 1226a, 1226b, 1226c, and 1226d based on a splitting method of the first coding unit 1200.

According to an embodiment, the image decoding apparatus 100 may determine the third coding units 1216a, 1216b, 1216c, and 1216d by splitting the second coding units 1210a and 1210b generated by splitting the first coding unit 1200 in a vertical direction, in a horizontal direction, and may process the third coding units 1216a, 1216b, 1216c, and 1216d in a processing order 1217 for initially processing the third coding units 1216a and 1216c, which are included in the left second coding unit 1210a, in a vertical direction and then processing the third coding unit 1216b and 1216d, which are included in the right second coding unit 1210b, in a vertical direction.

According to an embodiment, the image decoding apparatus 100 may determine the third coding units 1226a, 1226b, 1226c, and 1226d by splitting the second coding units 1220a and 1220b generated by splitting the first coding unit 1200 in a horizontal direction, in a vertical direction, and may process the third coding units 1226a, 1226b, 1226c, and 1226d in a processing order 1227 for initially processing the third coding units 1226a and 1226b, which are included in the upper second coding unit 1220a, in a horizontal direction and then processing the third coding unit 1226c and 1226d, which are included in the lower second coding unit 1220b, in a horizontal direction.

Referring to FIG. 12, the square third coding units 1216a, 1216b, 1216c, and 1216d, and 1226a, 1226b, 1226c, and 1226d may be determined by splitting the second coding units 1210a, 1210b, 1220a, and 1220b, respectively. Although the second coding units 1210a and 1210b are determined by splitting the first coding unit 1200 in a vertical direction differently from the second coding units 1220a and 1220b which are determined by splitting the first coding unit 1200 in a horizontal direction, the third coding units 1216a, 1216b, 1216c, and 1216d, and 1226a, 1226b, 1226c, and 1226d split therefrom eventually show same-shaped coding units split from the first coding unit 1200. As such, by recursively splitting a coding unit in different manners based on at least one of the block shape information the information about the split shape mode, the image decoding apparatus 100 may process a plurality of coding units in different orders even when the coding units are eventually determined to be the same shape.

FIG. 13 illustrates a process of determining a depth of a coding unit as a shape and size of the coding unit change, when the coding unit is recursively split such that a plurality of coding units are determined, according to an embodiment.

According to an embodiment, the image decoding apparatus 100 may determine the depth of the coding unit, based on a preset criterion. For example, the preset criterion may be the length of a long side of the coding unit. When the length of a long side of a coding unit before being split is 2n times (n>0) the length of a long side of a split current coding unit, the image decoding apparatus 100 may determine that a depth of the current coding unit is increased from a depth of the coding unit before being split, by n. In the following descriptions, a coding unit having an increased depth is expressed as a coding unit of a deeper depth.

Referring to FIG. 13, according to an embodiment, the image decoding apparatus 100 may determine a second coding unit 1302 and a third coding unit 1304 of deeper depths by splitting a square first coding unit 1300 based on block shape information indicating a square shape (for example, the block shape information may be expressed as '0: SQUARE'). Assuming that the size of the square first coding unit 1300 is 2N×2N, the second coding unit 1302 determined by dividing a width and height of the first coding unit 1300 to ½ may have a size of N×N. Furthermore, the third coding unit 1304 determined by dividing a width and height of the second coding unit 1302 to ½ may have a size of N/2×N/2. In this case, a width and height of the third coding unit 1304 are ¼ times those of the first coding unit 1300. When a depth of the first coding unit 1300 is D, a depth of the second coding unit 1302, the width and height of which are ½ times those of the first coding unit 1300, may be D+1, and a depth of the third coding unit 1304, the width and height of which are ¼ times those of the first coding unit 1300, may be D+2.

According to an embodiment, the image decoding apparatus 100 may determine a second coding unit 1312 or 1322 and a third coding unit 1314 or 1324 of deeper depths by splitting a non-square first coding unit 1310 or 1320 based on block shape information indicating a non-square shape (for example, the block shape information may be expressed as '1: NS_VER' indicating a non-square shape, a height of which is longer than a width, or as '2: NS_HOR' indicating a non-square shape, a width of which is longer than a height).

The image decoding apparatus 100 may determine the second coding unit 1302, 1312, or 1322 by dividing at least one of a width and height of the first coding unit 1310 having a size of N×2N. That is, the image decoding apparatus 100 may determine the second coding unit 1302 having a size of N×N or the second coding unit 1322 having a size of N×N/2 by splitting the first coding unit 1310 in a horizontal direction, or may determine the second coding unit 1312 having a size of N/2×N by splitting the first coding unit 1310 in horizontal and vertical directions.

According to an embodiment, the image decoding apparatus 100 may determine the second coding unit 1302, 1312, or 1322 by dividing at least one of a width and height of the first coding unit 1320 having a size of 2N×N. That is, the image decoding apparatus 100 may determine the second coding unit 1302 having a size of N×N or the second coding unit 1312 having a size of N/2×N by splitting the first coding unit 1320 in a vertical direction, or may determine the second coding unit 1322 having a size of N×N/2 by splitting the first coding unit 1320 in horizontal and vertical directions.

According to an embodiment, the image decoding apparatus 100 may determine the third coding unit 1304, 1314, or 1324 by dividing at least one of a width and height of the second coding unit 1302 having a size of N×N. That is, the image decoding apparatus 100 may determine the third coding unit 1304 having a size of N/2×N/2, the third coding unit 1314 having a size of N/4×N/2, or the third coding unit 1324 having a size of N/2×N/4 by splitting the second coding unit 1302 in vertical and horizontal directions.

According to an embodiment, the image decoding apparatus 100 may determine the third coding unit 1304, 1314, or 1324 by dividing at least one of a width and height of the second coding unit 1312 having a size of N/2×N. That is, the image decoding apparatus 100 may determine the third coding unit 1304 having a size of N/2×N/2 or the third coding unit 1324 having a size of N/2×N/4 by splitting the second coding unit 1312 in a horizontal direction, or may determine the third coding unit 1314 having a size of N/4×N/2 by splitting the second coding unit 1312 in vertical and horizontal directions.

According to an embodiment, the image decoding apparatus 100 may determine the third coding unit 1304, 1314, or 1324 by dividing at least one of a width and height of the second coding unit 1322 having a size of N×N/2. That is, the image decoding apparatus 100 may determine the third coding unit 1304 having a size of N/2×N/2 or the third coding unit 1314 having a size of N/4×N/2 by splitting the second coding unit 1322 in a vertical direction, or may determine the third coding unit 1324 having a size of N/2×N/4 by splitting the second coding unit 1322 in vertical and horizontal directions.

According to an embodiment, the image decoding apparatus 100 may split the square coding unit 1300, 1302, or 1304 in a horizontal or vertical direction. For example, the image decoding apparatus 100 may determine the first coding unit 1310 having a size of N×2N by splitting the first coding unit 1300 having a size of 2N×2N in a vertical direction, or may determine the first coding unit 1320 having a size of 2N×N by splitting the first coding unit 1300 in a horizontal direction. According to an embodiment, when a depth is determined based on the length of the longest side of a coding unit, a depth of a coding unit determined by splitting the first coding unit 1300 having a size of 2N×2N in a horizontal or vertical direction may be the same as the depth of the first coding unit 1300.

According to an embodiment, a width and height of the third coding unit 1314 or 1324 may be ¼ times those of the first coding unit 1310 or 1320. When a depth of the first coding unit 1310 or 1320 is D, a depth of the second coding unit 1312 or 1322, the width and height of which are ½ times those of the first coding unit 1310 or 1320, may be D+1, and a depth of the third coding unit 1314 or 1324, the width and height of which are ¼ times those of the first coding unit 1310 or 1320, may be D+2.

Figure 14:
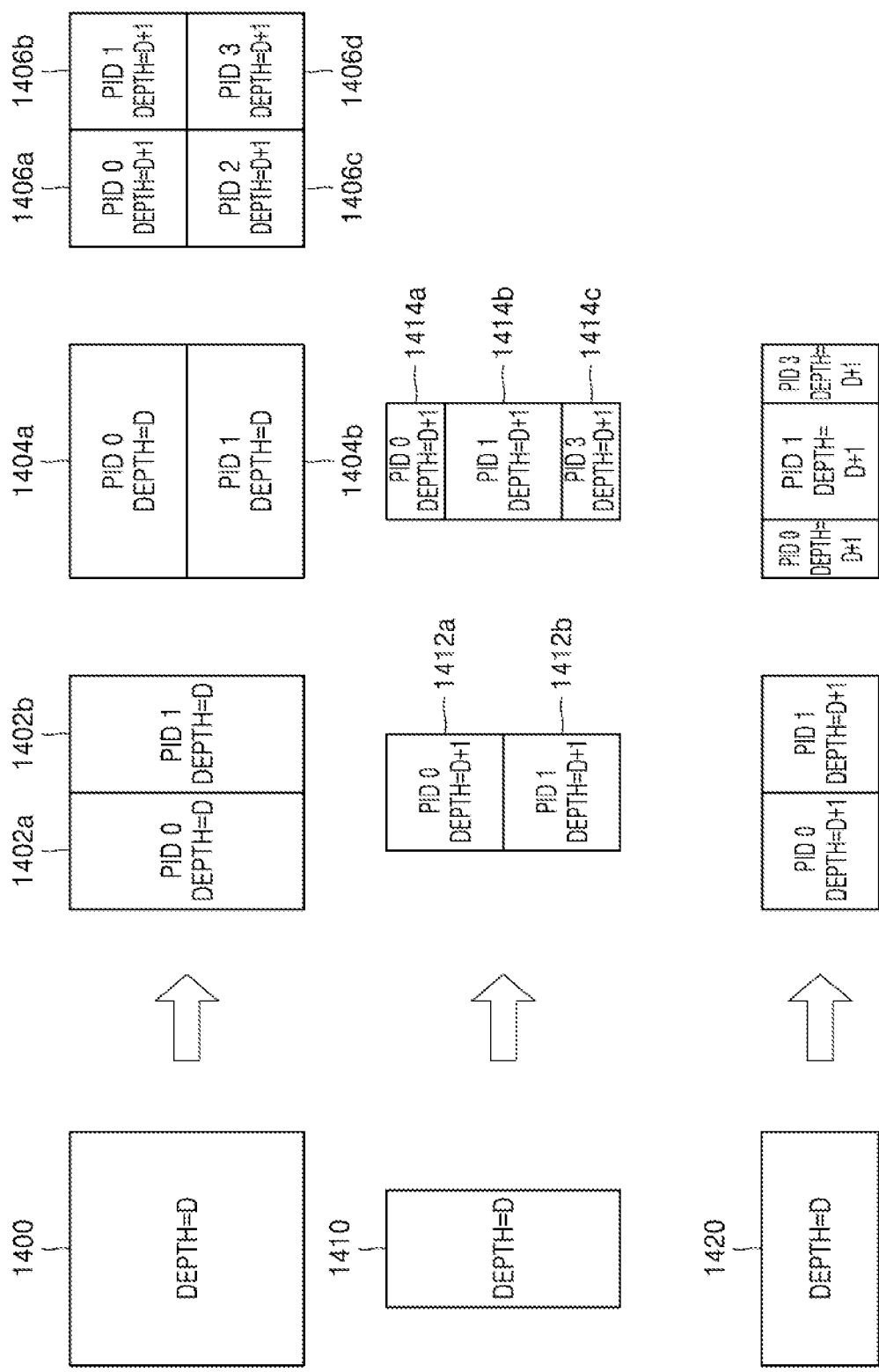
FIG. 14 illustrates depths that are determinable based on shapes and sizes of coding units, and part indexes (PIDs) that are for distinguishing between the coding units, according to an embodiment.

FIG. 14 illustrates depths that are determinable based on shapes and sizes of coding units, and part indexes (PIDs) that are for distinguishing between the coding units, according to an embodiment.

According to an embodiment, the image decoding apparatus 100 may determine various-shape second coding units by splitting a square first coding unit 1400. Referring to FIG. 14, the image decoding apparatus 100 may determine second coding units 1402a and 1402b, 1404a and 1404b, and 1406a, 1406b, 1406c, and 1406d by splitting the first coding unit 1400 in at least one of vertical and horizontal directions based on information about a split shape mode. That is, the image decoding apparatus 100 may determine the second coding units 1402a and 1402b, 1404a and 1404b, and 1406a, 1406b, 1406c, and 1406d, based on the information about the split shape mode of the first coding unit 1400.

According to an embodiment, a depth of the second coding units 1402a and 1402b, 1404a and 1404b, and 1406a, 1406b, 1406c, and 1406d, which are determined based on the information about the split shape mode of the square first coding unit 1400, may be determined based on the length of a long side thereof. For example, because the length of a side of the square first coding unit 1400 equals the length of a long side of the non-square second coding units 1402a and 1402b, and 1404a and 1404b, the first coding unit 1400 and the non-square second coding units 1402a and 1402b, and 1404a and 1404b may have the same depth, e.g., D. However, when the image decoding apparatus 100 splits the first coding unit 1400 into the four square second coding units 1406a, 1406b, 1406c, and 1406d based on the information about the split shape mode, because the length of a side of the square second coding units 1406a, 1406b, 1406c, and 1406d is ½ times the length of a side of the first coding unit 1400, a depth of the second coding units 1406a, 1406b, 1406c, and 1406d may be D+1 which is deeper than the depth D of the first coding unit 1400 by 1.

According to an embodiment, the image decoding apparatus 100 may determine a plurality of second coding units 1412a and 1412b, and 1414a, 1414b, and 1414c by splitting a first coding unit 1410, a height of which is longer than a width, in a horizontal direction based on the information about the split shape mode. According to an embodiment, the image decoding apparatus 100 may determine a plurality of second coding units 1422a and 1422b, and 1424a, 1424b, and 1424c by splitting a first coding unit 1420, a width of which is longer than a height, in a vertical direction based on the information about the split shape mode.

According to an embodiment, a depth of the second coding units 1412a and 1412b, 1414a, 1414b, and 1414c, 1422a and 1422b, and 1424a, 1424b, and 1424c, which are determined based on the information about the split shape mode of the non-square first coding unit 1410 or 1420, may be determined based on the length of a long side thereof. For example, because the length of a side of the square second coding units 1412a and 1412b is ½ times the length of a long side of the first coding unit 1410 having a non-square shape, a height of which is longer than a width, a depth of the square second coding units 1412a and 1412b is D+1 which is deeper than the depth D of the non-square first coding unit 1410 by 1.

Furthermore, the image decoding apparatus 100 may split the non-square first coding unit 1410 into an odd number of second coding units 1414a, 1414b, and 1414c based on the information about the split shape mode. The odd number of second coding units 1414a, 1414b, and 1414c may include the non-square second coding units 1414a and 1414c and the square second coding unit 1414b. In this case, because the length of a long side of the non-square second coding units 1414a and 1414c and the length of a side of the square second coding unit 1414b are ½ times the length of a long side of the first coding unit 1410, a depth of the second coding units 1414a, 1414b, and 1414c may be D+1 which is deeper than the depth D of the non-square first coding unit 1410 by 1. The image decoding apparatus 100 may determine depths of coding units split from the first coding unit 1420 having a non-square shape, a width of which is longer than a height, by using the above-described method of determining depths of coding units split from the first coding unit 1410.

According to an embodiment, the image decoding apparatus 100 may determine PIDs for identifying split coding units, based on a size ratio between the coding units when an odd number of split coding units do not have equal sizes. Referring to FIG. 14, a coding unit 1414b of a center position from among an odd number of split coding units 1414a, 1414b, and 1414c may have a width equal to that of the other coding units 1414a and 1414c and a height which is two times that of the other coding units 1414a and 1414c. That is, in this case, the coding unit 1414b at the center position may include two of the other coding unit 1414a or 1414c. Therefore, when a PID of the coding unit 1414b at the center position is 1 based on a scan order, a PID of the coding unit 1414c positioned next to the coding unit 1414b may be increased by 2 and thus may be 3. That is, discontinuity in PID values may be present. According to an embodiment, the image decoding apparatus 100 may determine whether an odd number of split coding units do not have equal sizes, based on whether discontinuity is present in PIDs for identifying the split coding units.

According to an embodiment, the image decoding apparatus 100 may determine whether to use a specific splitting method, based on PID values for identifying a plurality of coding units determined by splitting a current coding unit. Referring to FIG. 14, the image decoding apparatus 100 may determine an even number of coding units 1412a and 1412b or an odd number of coding units 1414a, 1414b, and 1414c by splitting the first coding unit 1410 having a rectangular shape, a height of which is longer than a width. The image decoding apparatus 100 may use PIDs to identify a plurality of coding units, the PIDs indicating the respective coding units. According to an embodiment, the PID may be obtained from a sample of a preset position of each coding unit (e.g., a top-left sample).

According to an embodiment, the image decoding apparatus 100 may determine a coding unit at a preset position from among the split coding units, by using the PIDs for distinguishing between the coding units. According to an embodiment, when the information about the split shape mode of the first coding unit 1410 having a rectangular shape, a height of which is longer than a width, indicates to split a coding unit into three coding units, the image decoding apparatus 100 may split the first coding unit 1410 into three coding units 1414a, 1414b, and 1414c. The image decoding apparatus 100 may assign a PID to each of the three coding units 1414a, 1414b, and 1414c. The image decoding apparatus 100 may compare PIDs of an odd number of split coding units to determine a coding unit at a center position from among the coding units. The image decoding apparatus 100 may determine the coding unit 1414b having a PID corresponding to a middle value among the PIDs of the coding units, as the coding unit at the center position from among the coding units determined by splitting the first coding unit 1410. According to an embodiment, the image decoding apparatus 100 may determine PIDs for distinguishing between split coding units, based on a size ratio between the coding units when the split coding units do not have equal sizes. Referring to FIG. 14, the coding unit 1414b generated by splitting the first coding unit 1410 may have a width equal to that of the other coding units 1414a and 1414c and a height which is two times that of the other coding units 1414a and 1414c. In this case, when the PID of the coding unit 1414b at the center position is 1, the PID of the coding unit 1414c positioned next to the coding unit 1414b may be increased by 2 and thus may be 3. When the PID is not uniformly increased as described above, the image decoding apparatus 100 may determine that a coding unit is split into a plurality of coding units including a coding unit having a size different from that of the other coding units. According to an embodiment, when the information about the split shape mode indicates to split a coding unit into an odd number of coding units, the image decoding apparatus 100 may split a current coding unit in such a manner that a coding unit of a preset position from among an odd number of coding units (e.g., a coding unit of a center position) has a size different from that of the other coding units. In this case, the image decoding apparatus 100 may determine the coding unit of the center position, which has a different size, by using PIDs of the coding units. However, the PIDs and the size or position of the coding unit of the preset position are not limited to the above-described examples, and various PIDs and various positions and sizes of coding units may be used.

According to an embodiment, the image decoding apparatus 100 may use a preset data unit where a coding unit starts to be recursively split.

Figure 15:
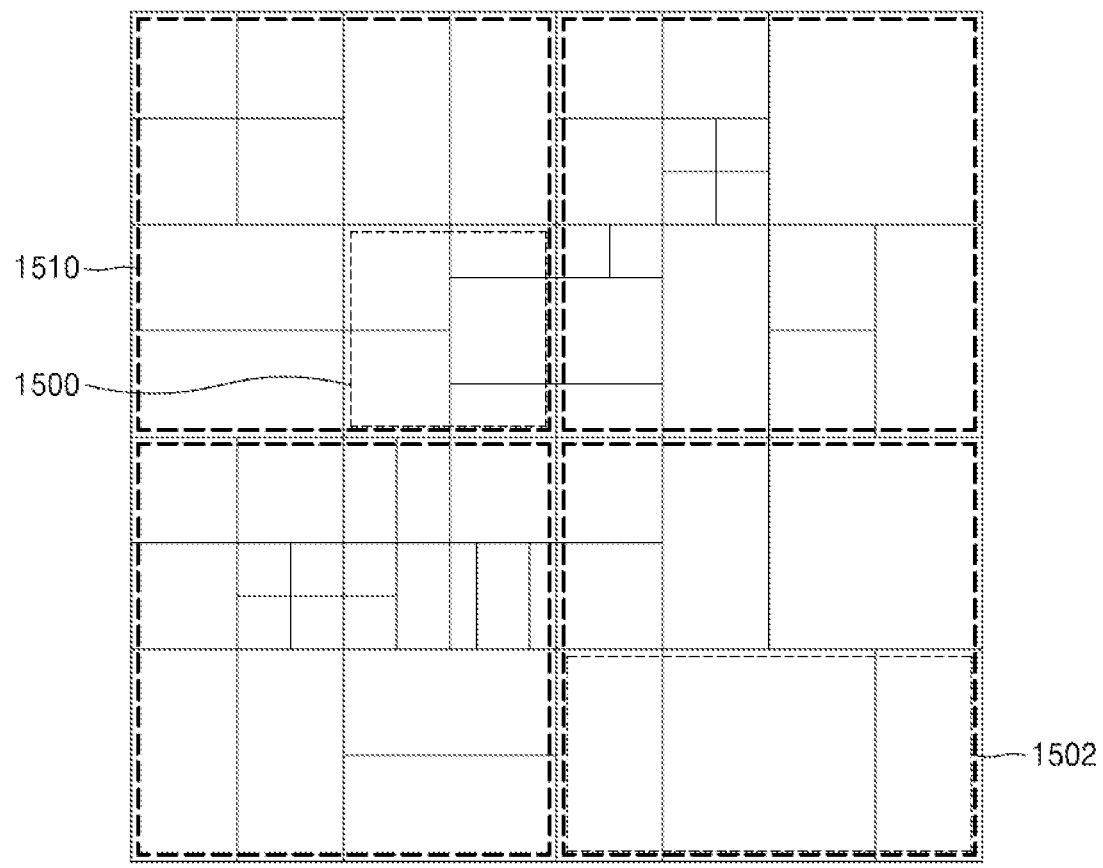
FIG. 15 illustrates that a plurality of coding units are determined based on a plurality of preset data units included in a picture, according to an embodiment.

FIG. 15 illustrates that a plurality of coding units are determined based on a plurality of preset data units included in a picture, according to an embodiment.

According to an embodiment, a preset data unit may be defined as a data unit where a coding unit starts to be recursively split by using at least one of block shape information and information about a split shape mode. That is, the preset data unit may correspond to a coding unit of an uppermost depth, which is used to determine a plurality of coding units split from a current picture. Hereinafter, for convenience of descriptions, the preset data unit is referred to as a reference data unit.

According to an embodiment, the reference data unit may have a preset size and a preset shape. According to an embodiment, the reference data unit may include M×N samples. Herein, M and N may be equal to each other, and may be integers expressed as powers of 2. That is, the reference data unit may have a square or non-square shape, and may be split into an integer number of coding units.

According to an embodiment, the image decoding apparatus 100 may split the current picture into a plurality of reference data units. According to an embodiment, the image decoding apparatus 100 may split the plurality of reference data units, which are split from the current picture, by using information about a split shape mode for each reference data unit. The operation of splitting the reference data unit may correspond to a splitting operation using a quad-tree structure.

According to an embodiment, the image decoding apparatus 100 may previously determine the minimum size allowed for the reference data units included in the current picture. Accordingly, the image decoding apparatus 100 may determine various reference data units having sizes equal to or greater than the minimum size, and may determine one or more coding units by using the block shape information and the information about the split shape mode with reference to the determined reference data unit.

Referring to FIG. 15, the image decoding apparatus 100 may use a square reference coding unit 1500 or a non-square reference coding unit 1502. According to an embodiment, the shape and size of reference coding units may be determined based on various data units capable of including one or more reference coding units (e.g., sequences, pictures, slices, slice segments, largest coding units, or the like).

According to an embodiment, the bitstream obtainer 110 of the image decoding apparatus 100 may obtain, from a bitstream, at least one of reference coding unit shape information and reference coding unit size information with respect to each of the various data units. An operation of splitting the square reference coding unit 1500 into one or more coding units has been described above in relation to the operation of splitting the current coding unit 300 of FIG. 3, and an operation of splitting the non-square reference coding unit 1502 into one or more coding units has been described above in relation to the operation of splitting the current coding unit 400 or 450 of FIG. 4, and thus, detailed descriptions thereof are not provided here.

According to an embodiment, the image decoding apparatus 100 may use a PID for identifying the size and shape of reference coding units, to determine the size and shape of reference coding units according to some data units previously determined based on a preset condition. That is, the bitstream obtainer 110 may obtain, from the bitstream, only the PID for identifying the size and shape of reference coding units with respect to each slice, slice segment, or largest coding unit which is a data unit satisfying a preset condition (e.g., a data unit having a size equal to or smaller than a slice) from among the various data units (e.g., sequences, pictures, slices, slice segments, largest coding units, or the like). The image decoding apparatus 100 may determine the size and shape of reference data units with respect to each data unit, which satisfies the preset condition, by using the PID. When the reference coding unit shape information and the reference coding unit size information are obtained and used from the bitstream according to each data unit having a relatively small size, efficiency of using the bitstream may not be high, and therefore, only the PID may be obtained and used instead of directly obtaining the reference coding unit shape information and the reference coding unit size information. In this case, at least one of the size and shape of reference coding units corresponding to the PID for identifying the size and shape of reference coding units may be previously determined. That is, the image decoding apparatus 100 may determine at least one of the size and shape of reference coding units included in a data unit serving as a unit for obtaining the PID, by selecting the previously determined at least one of the size and shape of reference coding units based on the PI D.

According to an embodiment, the image decoding apparatus 100 may use one or more reference coding units included in a largest coding unit. That is, a largest coding unit split from a picture may include one or more reference coding units, and coding units may be determined by recursively splitting each reference coding unit. According to an embodiment, at least one of a width and height of the largest coding unit may be integer times at least one of the width and height of the reference coding units. According to an embodiment, the size of reference coding units may be obtained by splitting the largest coding unit n times based on a quad-tree structure. That is, the image decoding apparatus 100 may determine the reference coding units by splitting the largest coding unit n times based on a quad-tree structure, and may split the reference coding unit based on at least one of the block shape information and the information about the split shape mode according to various embodiments.

Figure 16:
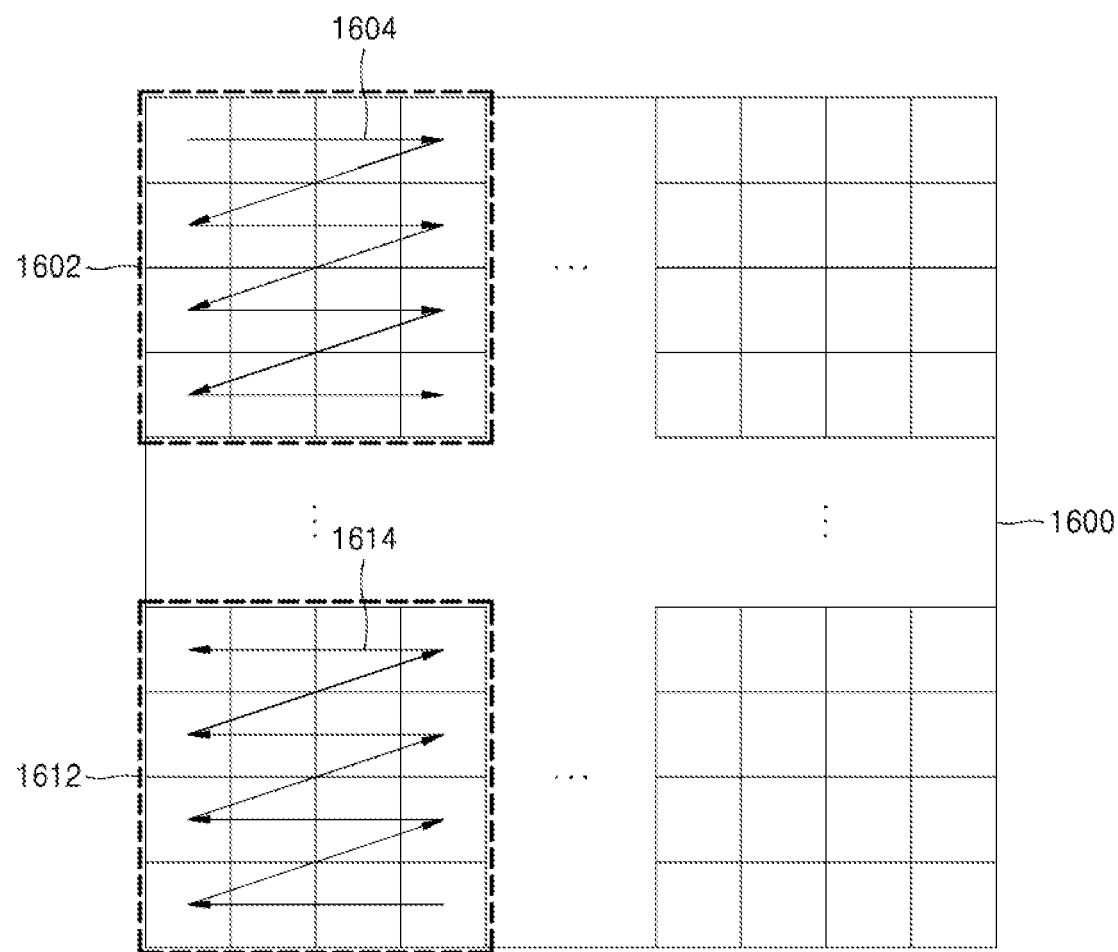
FIG. 16 illustrates a processing block serving as a unit for determining a determination order of reference coding units included in a picture, according to an embodiment.

FIG. 16 illustrates a processing block serving as a unit for determining a determination order of reference coding units included in a picture 1600, according to an embodiment.

According to an embodiment, the image decoding apparatus 100 may determine one or more processing blocks split from a picture. The processing block is a data unit including one or more reference coding units split from a picture, and the one or more reference coding units included in the processing block may be determined according to a specific order. That is, a determination order of one or more reference coding units determined in each processing block may correspond to one of various types of orders for determining reference coding units, and may vary depending on the processing block. The determination order of reference coding units, which is determined with respect to each processing block, may be one of various orders, e.g., raster scan order, Z-scan, N-scan, up-right diagonal scan, horizontal scan, and vertical scan, but is not limited to the scan orders.

According to an embodiment, the image decoding apparatus 100 may obtain processing block size information and may determine the size of one or more processing blocks included in the picture. The image decoding apparatus 100 may obtain the processing block size information from a bitstream and may determine the size of one or more processing blocks included in the picture. The size of processing blocks may be a preset size of data units, which is indicated by the processing block size information.

According to an embodiment, the bitstream obtainer 110 of the image decoding apparatus 100 may obtain the processing block size information from the bitstream according to each specific data unit. For example, the processing block size information may be obtained from the bitstream in a data unit such as an image, sequence, picture, slice, or slice segment. That is, the bitstream obtainer 110 may obtain the processing block size information from the bitstream according to each of the various data units, the image decoding apparatus 100 may determine the size of one or more processing blocks, which are split from the picture, by using the obtained processing block size information, and the size of the processing blocks may be integer times that of the reference coding units.

According to an embodiment, the image decoding apparatus 100 may determine the size of processing blocks 1602 and 1612 included in the picture 1600. For example, the image decoding apparatus 100 may determine the size of processing blocks based on the processing block size information obtained from the bitstream. Referring to FIG. 16, according to an embodiment, the image decoding apparatus 100 may determine a width of the processing blocks 1602 and 1612 to be four times the width of the reference coding units, and may determine a height of the processing blocks 1602 and 1612 to be four times the height of the reference coding units. The image decoding apparatus 100 may determine a determination order of one or more reference coding units in one or more processing blocks.

According to an embodiment, the image decoding apparatus 100 may determine the processing blocks 1602 and 1612, which are included in the picture 1600, based on the size of processing blocks, and may determine a determination order of one or more reference coding units included in the processing blocks 1602 and 1612. According to an embodiment, determination of reference coding units may include determination of the size of the reference coding units.

According to an embodiment, the image decoding apparatus 100 may obtain, from the bitstream, determination order information of one or more reference coding units included in one or more processing blocks, and may determine a determination order with respect to one or more reference coding units based on the obtained determination order information. The determination order information may be defined as an order or direction for determining the reference coding units in the processing block. That is, the determination order of reference coding units may be independently determined with respect to each processing block.

According to an embodiment, the image decoding apparatus 100 may obtain, from the bitstream, the determination order information of reference coding units according to each specific data unit. For example, the bitstream obtainer 110 may obtain the determination order information of reference coding units from the bitstream according to each data unit such as an image, sequence, picture, slice, slice segment, or processing block. Because the determination order information of reference coding units indicates an order for determining reference coding units in a processing block, the determination order information may be obtained with respect to each specific data unit including an integer number of processing blocks.

According to an embodiment, the image decoding apparatus 100 may determine one or more reference coding units based on the determined determination order.

According to an embodiment, the bitstream obtainer 110 may obtain the determination order information of reference coding units from the bitstream as information related to the processing blocks 1602 and 1612, and the image decoding apparatus 100 may determine a determination order of one or more reference coding units included in the processing blocks 1602 and 1612 and determine one or more reference coding units, which are included in the picture 1600, based on the determination order. Referring to FIG. 16, the image decoding apparatus 100 may determine determination orders 1604 and 1614 of one or more reference coding units in the processing blocks 1602 and 1612, respectively. For example, when the determination order information of reference coding units is obtained with respect to each processing block, different kinds of the determination order information of reference coding units may be obtained for the processing blocks 1602 and 1612. When the determination order 1604 of reference coding units in the processing block 1602 is a raster scan order, reference coding units included in the processing block 1602 may be determined according to a raster scan order. On the contrary, when the determination order 1614 of reference coding units in the other processing block 1612 is a backward raster scan order, reference coding units included in the processing block 1612 may be determined according to the backward raster scan order.

According to an embodiment, the image decoding apparatus 100 may decode the determined one or more reference coding units. The image decoding apparatus 100 may decode an image, based on the reference coding units determined as described above. A method of decoding the reference coding units may include various image decoding methods.

According to an embodiment, the image decoding apparatus 100 may obtain block shape information indicating the shape of a current coding unit or information about a split shape mode indicating a splitting method of the current coding unit, from the bitstream, and may use the obtained information. The block shape information or the information about the split shape mode may be included in the bitstream related to various data units. For example, the image decoding apparatus 100 may use the block shape information or the information about the split shape mode included in a sequence parameter set, a picture parameter set, a video parameter set, a slice header, or a slice segment header. Furthermore, the image decoding apparatus 100 may obtain, from the bitstream, a syntax element corresponding to the block shape information or the information about the split shape mode according to each largest coding unit, each reference coding unit, or each processing block, and may use the obtained syntax element.

Figure 17:
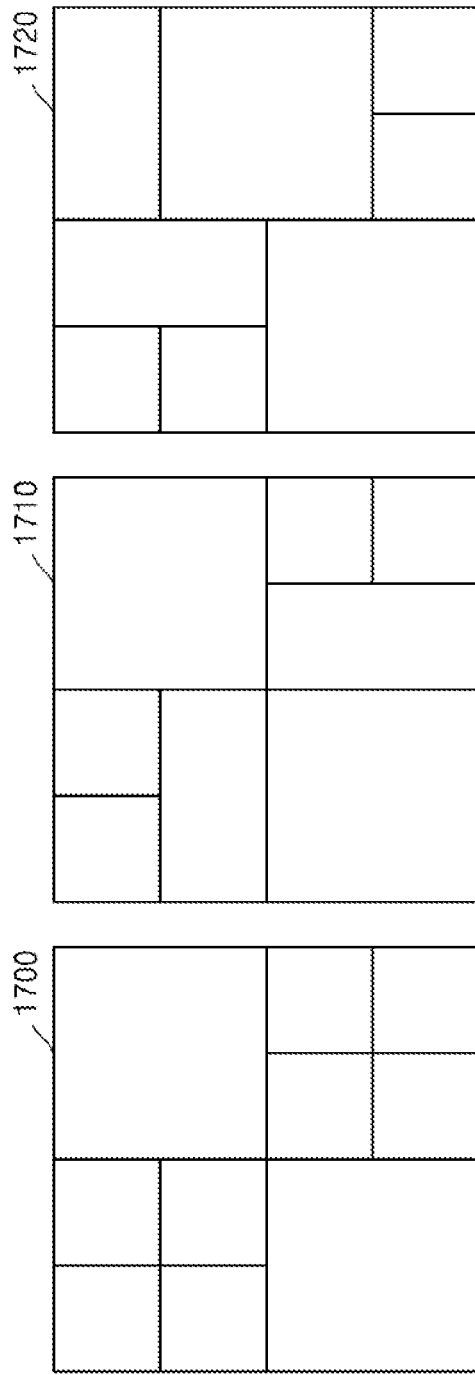
FIG. 17 illustrates coding units determinable per picture when a combination of shapes into which a coding unit is splittable is different per picture, according to an embodiment.

FIG. 17 illustrates coding units determinable per picture when a combination of shapes into which a coding unit is splittable is different per picture, according to an embodiment.

Referring to FIG. 17, the image decoding apparatus 100 may differently determine, per picture, a combination of shapes into which a coding unit is splittable. For example, the image decoding apparatus 100 may decode an image by using a picture that is splittable into 4 coding units, a picture 1710 that is splittable into 2 or 4 coding units, and a picture 1720 that is splittable into 2, 3, or 4 coding units, from among at least one picture included in the image. In order to split the picture 1700 into a plurality of coding units, the image decoding apparatus 100 may use only split shape information indicating that the picture 1700 is split into 4 square coding units. In order to split the picture 1710, the image decoding apparatus 100 may use only split shape information indicating that the picture 1710 is split into 2 or 4 coding units. In order to split the picture 1720, the image decoding apparatus 100 may use only split shape information indicating that the picture 1720 is divided into 2, 3, or 4 coding units. Because such a combination of split shapes is only an embodiment for describing operations of the image decoding apparatus 100, the combination of split shapes should not be interpreted as being limited to the embodiment and various combinations of split shapes may be used according to preset data units.

According to an embodiment, the bitstream obtainer 110 of the image decoding apparatus 100 may obtain a bitstream including an index indicating a combination of split shape information according to preset data unit units (e.g., sequences, pictures, or slices). For example, the bitstream obtainer 110 may obtain an index indicating a combination of split shape information from a sequence parameter set, a picture parameter set, or a slice header. The image decoding apparatus 100 may determine a combination of split shapes into which a coding unit is splittable according to predetermined data units by using the obtained index, and thus different combinations of split shapes may be used according to preset data units.

FIG. 18 illustrates various shapes of a coding unit determinable based on split shape information that can be represented as a binary code, according to an embodiment.

According to an embodiment, the image decoding apparatus 100 may split a coding unit into various shapes by using block shape information and split shape information obtained by the bitstream obtainer 110. Shapes into which a coding unit is splittable may correspond to various shapes including the shapes described through the above embodiments.

Referring to FIG. 18, the image decoding apparatus 100 may split a coding unit having a square shape into at least one direction from among a horizontal direction and a vertical direction and may split a coding unit having a non-square shape in a horizontal direction or a vertical direction, based on split shape information.

According to an embodiment, when the image decoding apparatus 100 is able to split a coding unit having a square shape in a horizontal direction and a vertical direction to obtain four square coding units, the number of split shapes that may be indicated by split shape information about the coding unit having the square shape may be 4. According to an embodiment, split shape information may be represented as a two-digit binary code, and a binary code may be allocated to each split shape. For example, when a coding unit is not split, split shape information may be represented as (00)b; when a coding unit is split in a horizontal direction and a vertical direction, split shape information may be represented as (01)b, when a coding unit is split in a horizontal direction, split shape information may be represented as (10)b; and when a coding unit is spilt in a vertical direction, split shape information may be represented as (11)b.

According to an embodiment, when the image decoding apparatus 100 splits a coding unit having a non-square shape in a horizontal direction or a vertical direction, types of split shapes that may be indicated by split shape information may be determined according to the number of coding units into which a coding unit is split. Referring to FIG. 18, the image decoding apparatus 100 may split a coding unit having a non-square shape into 3 coding units according to an embodiment. The image decoding apparatus 100 may split a coding unit into two coding units, and in this case, split shape information may be represented as (10)b. The image decoding apparatus 100 may split a coding unit into three coding units, and in this case, split shape information may be represented as (11)b. The image decoding apparatus 100 may determine not to split a coding unit, and in this case, split shape information may be represented as (0)b. That is, in order to use a binary code indicating split shape information, the image decoding apparatus 100 may use variable length coding (VLC), instead of fixed length coding (FLC).

According to an embodiment, referring to FIG. 18, a binary code of split shape information indicating that a coding unit is not split may be represented as (0)b. When a binary code of split shape information indicating that a coding unit is not split is set to (00)b, all 2-bit binary codes of split shape information have to be used despite that there is no split shape information set to (01)b. However, as shown in FIG. 18, when 3 split shapes are used for a coding unit having a non-square shape, the image decoding apparatus 100 may determine not to split a coding unit even by using a 1-bit binary code (0)b as split shape information, and thus may efficiently use a bitstream. However, split shapes of a coding unit having a non-square shape, which are indicated by split shape information, should not be interpreted as being limited to 3 shapes shown in FIG. 18 and should be interpreted as being various shapes including the above embodiments.

FIG. 19 illustrates other shapes of a coding unit determinable based on split shape information that can represented as a binary code, according to an embodiment.

Referring to FIG. 19, the image decoding apparatus 100 may split a coding unit having a square shape in a horizontal direction or a vertical direction and may split a coding unit having a non-square shape in a horizontal direction or a vertical direction, based on split shape information. That is, split shape information may indicate that a coding unit having a square shape is to be split in one direction. In this case, a binary code of split shape information indicating that a coding unit having a square shape is not to be split may be represented as (0)b. When a binary code of split shape information indicating that a coding unit is not to be split is set to (00)b, all 2-bit binary codes of split shape information have to be used despite that there is no split shape information set to (01)b. However, as shown in FIG. 19, when 3 split shapes are used for a coding unit having a square shape, the image decoding apparatus 100 may determine not to split a coding unit even by using a 1-bit binary code (0)b as split shape information, and thus may efficiently use a bitstream. However, split shapes of a coding unit having a square shape, which are indicated by split shape information, should not be interpreted as being limited to 3 shapes shown in FIG. 19 and should be interpreted as being various shapes including the above embodiments.

According to an embodiment, block shape information or split shape information may be represented by using a binary code, and such information may be immediately generated as a bitstream. Alternatively, block shape information or split shape information that can be represented as a binary code may not be immediately generated in a bitstream and may be used as a binary code input during context adaptive binary arithmetic coding (CABAC).

According to an embodiment, a process, performed by the image decoding apparatus 100, of obtaining syntax about block shape information or split shape information through CABAC will now be described. A bitstream including a binary code for the syntax may be obtained by the bitstream obtainer 110. The image decoding apparatus 100 may detect a syntax element indicating the block shape information or the split shape information by de-binarizing a bin string included in the obtained bitstream. According to an embodiment, the image decoding apparatus 100 may obtain a set of binary bin strings corresponding to the syntax element to be decoded and may decode each bin by using probability information, and the image decoding apparatus 100 may repeatedly perform this process until a bin string including such decoded bins is the same as one of pre-obtained bin strings. The image decoding apparatus 100 may determine the syntax element by de-binarizing the bin string.

According to an embodiment, the image decoding apparatus 100 may determine syntax about a bin string by performing a decoding process of adaptive binary arithmetic coding, and may update a probability model for bins obtained by the bitstream obtainer 110. Referring to FIG. 18, the bitstream obtainer 110 of the image decoding apparatus 100 may obtain a bitstream indicating a binary code indicating split shape information according to an embodiment. The image decoding apparatus 100 may determine syntax about the split shape information by using the obtained binary code having a size of 1 bit or 2 bits. In order to determine the syntax about the split shape information, the image decoding apparatus 100 may update a probability of each bit from among the 2 bits of the binary code. That is, the image decoding apparatus 100 may update a probability that may have a value of 0 or 1 when decoding a next bin according to whether a value of a first bin in the 2-bits of the binary code is 0 or 1.

According to an embodiment, while determining the syntax, the image decoding apparatus 100 may update a probability of the bins used in a process of decoding the bins of the bin string for the syntax, and the image decoding apparatus 100 may determine that a specific bit in the bin string has the same probability without updating the probability.

Referring to FIG. 18, while determining syntax by using a bin string indicating split shape information about a coding unit having a non-square shape, the image decoding apparatus 100 may determine the syntax about the split shape information by using one bin having a value of 0 when the coding unit having a non-square shape is not split. That is, when block shape information indicates that a current coding unit has a non-square shape, a first bin of a bin string for the split shape information may be 0 when the coding unit having a non-square shape is not split and may be 1 when the coding unit having a non-square shape is split into two or three coding units. Accordingly, a probability that a first bin of a bin string of split shape information about a coding unit having a non-square shape is 0 may be ⅓, and a probability that the first bin of the bin string of the split shape information about the coding unit having a non-square shape is 1 may be ⅔. As described above, because split shape information indicating that a coding unit having a non-square shape is not split may represent only a bin string of 1 bit having a value of 0, the image decoding apparatus 100 may determine syntax about the split shape information by determining whether a second bin is 0 or 1 only when the first bin of the split shape information is 1. According to an embodiment, when the first bin for the split shape information is 1, the image decoding apparatus 100 may decode a bin by determining that probabilities that the second bin is 0 and 1 are the same.

According to an embodiment, the image decoding apparatus 100 may use various probabilities for each bin while determining a bin of a bin string for split shape information. According to an embodiment, the image decoding apparatus 100 may differently determine probabilities of bins for split shape information according to a direction of a non-square block. According to an embodiment, the image decoding apparatus 100 may differently determine probabilities of bins for split shape information according to an area or a length of a long side of a current coding unit. According to an embodiment, the image decoding apparatus 100 may differently determine probabilities of bins for split shape information according to at least one from among a shape and a length of a long side of a current coding unit.

According to an embodiment, the image decoding apparatus 100 may determine that probabilities of bins for split shape information are the same with respect to coding units having a predetermined size or more. For example, the image decoding apparatus 100 may determine that probabilities of bins for split shape information are the same with respect to coding units having a size equal to or greater than 64 samples based on a length of a long side of each coding unit.

According to an embodiment, the image decoding apparatus 100 may determine an initial probability of bins constituting a bin string of split shape information based on a slice type (e.g., an I-slice, a P-slice, a B-slice, or the like).

Figure 20:
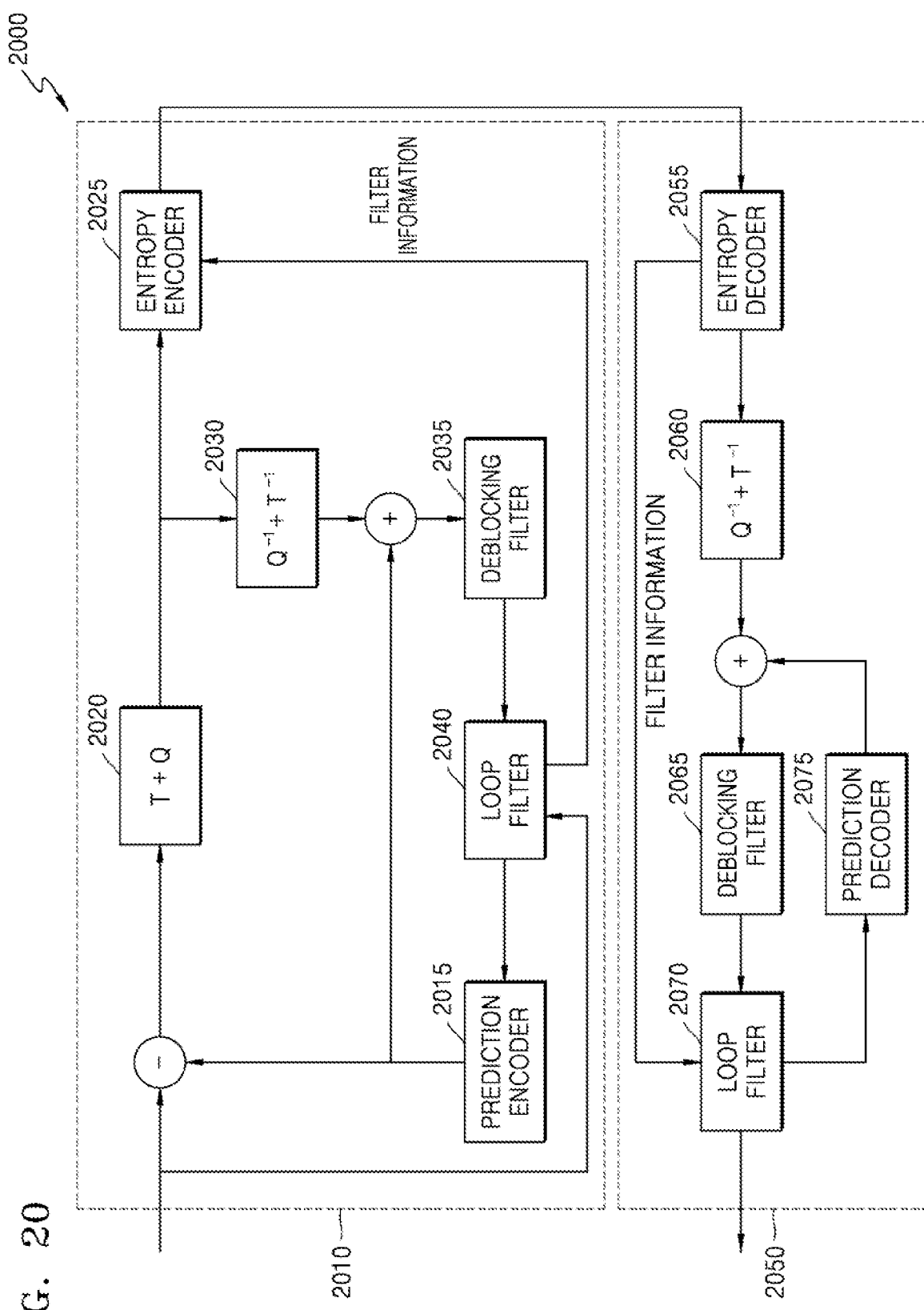
FIG. 20 is a block diagram of an image encoding and decoding system for performing loop filtering.
Figure 22:
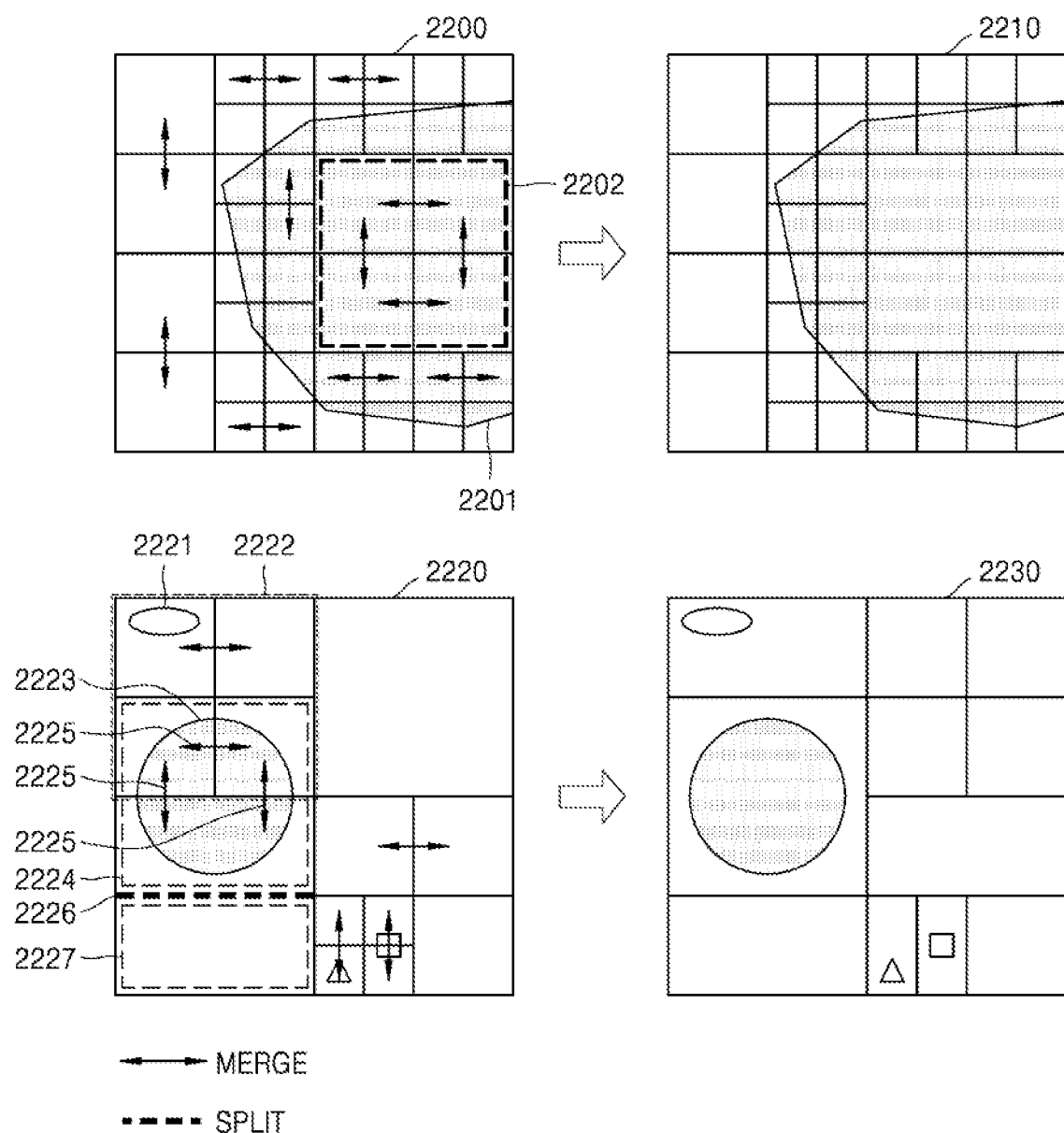
FIG. 22 illustrates a process of performing merging or splitting between coding units determined according to a preset encoding method, according to an embodiment.

FIG. 20 is a block diagram of an image encoding and decoding system for performing loop filtering.

An encoding end 2010 of an image encoding and decoding system 2000 transmits an encoded bitstream of an image, and a decoding end 2050 receives and decodes the bitstream and outputs a reconstruction image. The encoding end 2010 may have a configuration similar to that of an image encoding apparatus 200 which will be described below, and the decoding end 2050 may have a configuration similar to that of the image decoding apparatus 100.

In the encoding end 2010, a prediction encoder 2015 outputs a reference image through inter prediction and intra prediction, and a transformer and quantizer 2020 quantizes residual data between the reference image and a current input image into a quantized transform coefficient and outputs the quantized transform coefficient. An entropy encoder 2025 encodes and transforms the quantized transform coefficient into a bitstream and outputs the bitstream. The quantized transform coefficient is reconstructed as data in a spatial domain by a de-quantizer and inverse converter 2030, and the reconstructed data in the spatial domain is output as a reconstruction image through a deblocking filter 2035 and a loop filter 2040. The reconstruction image may be used as a reference image of a next input image through the prediction encoder 2015.

Encoded image data from among the bitstream received by the decoding end 2050 is reconstructed as residual data in a spatial domain through an entropy decoder 2055 and a de-quantizer and inverse converter 2060. Image data in a spatial domain is formed as the residual data and a reference image output from a prediction decoder 2075 are combined, and a deblocking filter 2065 and a loop filter 2070 may filter the image data in the spatial domain and may output a reconstruction image for a current original image. The reconstruction image may be used as a reference image for a next original image by the prediction decoder 2075.

The loop filter 2040 of the encoding end 2010 performs loop filtering by using filter information input according to a user input or a system setting. The filter information used by the loop filter 2040 is output to the entropy encoder 2025, and is transmitted along with the encoded image data to the decoding end 2050. The loop filter 2070 of the decoding end 2050 may perform loop filtering based on the filter information input from the decoding end 2050.

Figure 21:
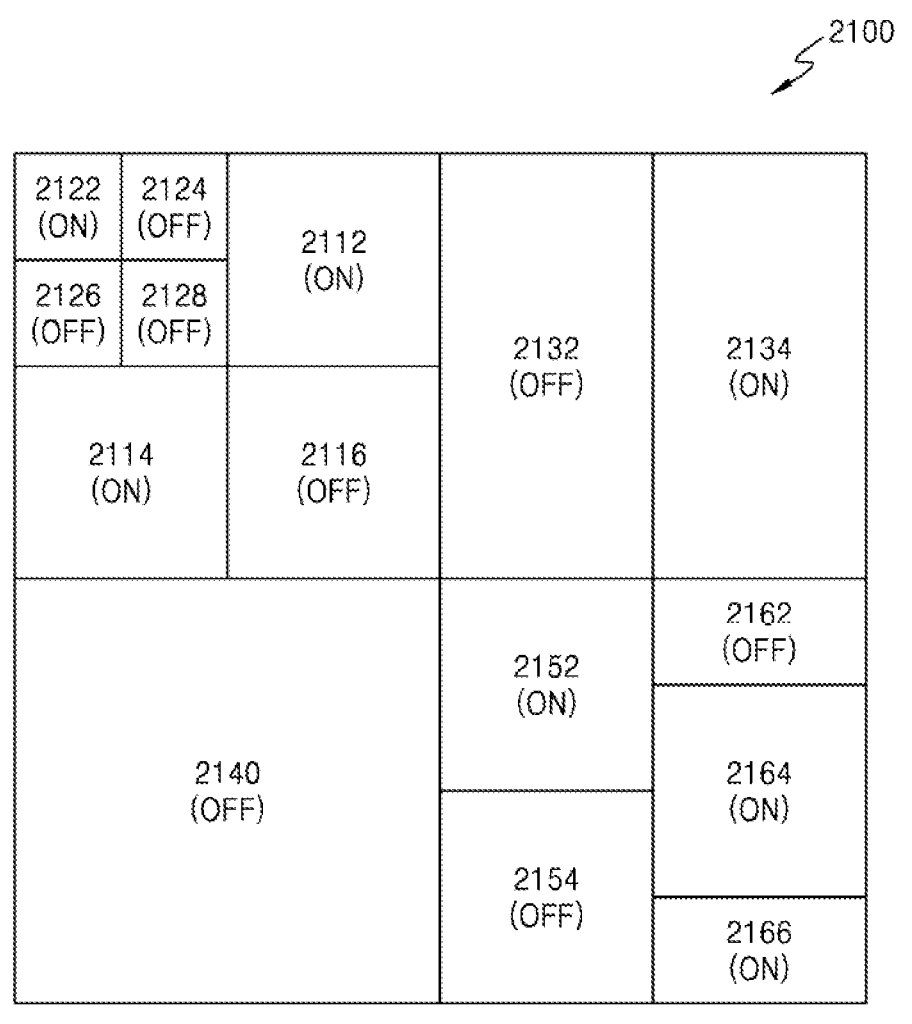

FIG. 21 illustrates an example of filtering units included in a largest coding unit and filtering performance information of a filtering unit, according to an embodiment.

When filtering units of the loop filter 2040 of the encoding end 2010 and the loop filter 2070 of the decoding end 2050 include data units similar to coding units according to an embodiment described with reference to FIGS. 3 to 5, filter information may include block shape information and split shape information of a data unit for indicating a filtering unit, and loop filtering performance information indicating whether loop filtering is performed on the filtering unit.

Filtering units included in a largest coding unit 2100 according to an embodiment may have the same block shape and split shape as coding units included in the largest coding unit 2100. Also, according to an embodiment, the filtering units included in the largest coding unit 2100 may be split based on sizes of the coding units included in the maximum coding units 2100. Referring to FIG. 21, for example, the filtering units may include a filtering unit 2140 having a square shape and a depth of D, filtering units 2132 and 2134 having a non-square shape and a depth of D, filtering units 2112, 2114, 2116, 2152, 2154, and 2164 having a square shape and a depth of D+1, filtering units 2162 and 2166 having a non-square shape and a depth of D+1, and filtering units 2122, 2124, 2126, and 2128 having a square shape and a depth of D+2.

The block shape information, the split shape information (depth), and the loop filtering performance information of the filtering units included in the largest coding unit 2100 may be encoded as shown in Table 1.

TABLE 1

| Depth | Block Shape information | Loop Filtering Performance Information |
|---|---|---|
| D | 0: SQUARE | 0(2140) |
|   | 1: NS_VER | 0(2132), 1(2134) |
|   | 2: NS_HOR |  |
| D + 1 | 0: SQUARE | 1(2112), 1(2114), 0(2116), 1(2152), 0(2154), 1(2164) |
|   | 1: NS_VER |  |
|   | 2: NS_HOR | 0(2162), 1(2166) |
| D + 2 | 0: SQUARE | 1(2122), 0(2124), 0(2126), 0(2128) |
|   | 1: NS_VER |  |
|   | 2: NS_HOR |  |

A process of determining a plurality of coding units by recursively splitting a coding unit according to block shape information and block split information according to an embodiment is the same as that described with reference to FIG. 13. Loop filtering performance information of filtering units according to an embodiment indicates that loop filtering is performed on the filtering units when a flag value is 1, and indicates that loop filtering is not performed on the filtering units when a flag value is 0. Referring to Table 1, information of data units for determining filtering units to be filtered by the loop filters 2040 and 2070 may all be encoded and transmitted as filter information.

Because coding units configured according to an embodiment are coding units configured to minimize an error with an original image, it is expected to have a high spatial correlation in the coding units. Accordingly, because a filtering unit is determined based on a coding unit according to an embodiment, an operation of determining a filtering unit, separate from determining of a coding unit, may be omitted. Also, accordingly, because a filtering unit is determined based on a coding unit according to an embodiment and thus information for determining a split shape of the filtering unit may be omitted, a transmission bit rate of filter information may be saved.

Although it is described in the above embodiments that a filtering unit is determined based on a coding unit according to an embodiment, a filtering unit may be split based on a coding unit until an arbitrary depth, and thus a shape of the filtering unit may be determined up to only the arbitrary depth.

The determining of a filtering unit described in the above embodiments may be applied not only to loop filtering but also to various embodiments such as deblocking filtering and adaptive loop filtering.

According to an embodiment, the image decoding apparatus 100 may split a current coding unit by using at least one of block shape information and split shape information, and the block shape information may be predetermined to indicate using only a square shape and the split shape information may be predetermined to indicate that the current coding unit is not split or split into 4 square coding units. That is, coding units of the current coding unit may always have a square shape according to the block shape information and the current coding unit may not be split or split into 4 square coding units based on the split shape information. The image decoding apparatus 100 may obtain, by using the bitstream obtainer 110, a bitstream generated by using a predetermined encoding method that is predetermined to only use such block shapes and split shapes, and the image decoding apparatus 100 may use only the predetermined block shapes and split shapes. In this case, because the image decoding apparatus 100 may solve a compatibility problem with the predetermined encoding method by using a predetermined decoding method similar to the predetermined encoding method. According to an embodiment, when the image decoding apparatus 100 uses the predetermined decoding method using only the predetermined block shapes and split shapes from among various shapes that may be indicated by the block shape information and the split shape information, the block shape information only indicates a square shape, and thus the image decoding apparatus 100 may not perform a process of obtaining the block shape information from the bitstream. Syntax indicating whether to use the predetermined decoding method may be used, and such syntax may be obtained from the bitstream according to data units having various shapes that may include a plurality of coding units such as sequences, pictures, slice units, and largest coding units. That is, the bitstream obtainer 110 may determine whether syntax indicating the block shape information is to be obtained from the bitstream based on syntax indicating whether the predetermined decoding method is used.

Figure 23:
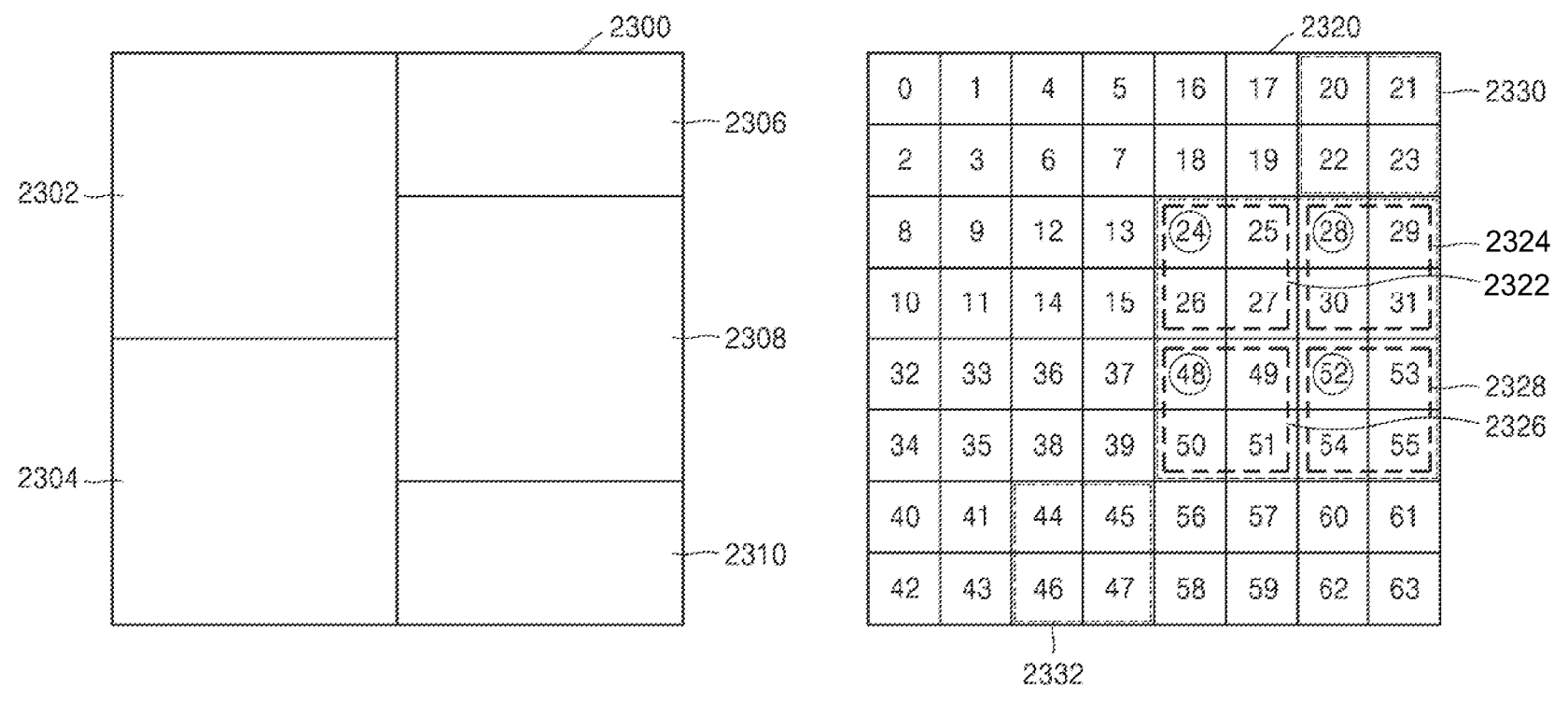

FIG. 23 illustrates an index according to a Z-scan order of a coding unit according to an embodiment.

The image decoding apparatus 100 according to an embodiment may scan lower data units included in an upper data unit according to a Z-scan order. Also, the image decoding apparatus 100 according to an embodiment may sequentially access data according to a Z-scan index in a coding unit included in a processing block or a largest coding unit.

The image decoding apparatus 100 according to an embodiment may split a reference coding unit into at least one coding unit as described with reference to FIGS. 3 and 4. In this case, coding units having a square shape and coding units having a non-square shape may co-exist in the reference coding unit. According to an embodiment, the image decoding apparatus 100 may access data according to a Z-scan index included in each coding unit in the reference coding unit. In this case, a method of applying a Z-scan index may vary according to whether a coding unit having a non-square shape exists in the reference coding unit.

According to an embodiment, when a coding unit having a non-square shape does not exist in the reference coding unit, coding units of a lower depth in the reference coding unit may have continuous Z-scan indices. For example, according to an embodiment, a coding unit of an upper depth may include four coding units of a lower depth. Boundaries of the four coding units of the lower depth may be continuous, and the coding units of the lower depth may be scanned in a Z-scan order according to indices indicating the Z-scan order. The indices indicating the Z-scan order according to an embodiment may be set to numbers that increase according to the Z-scan order for the coding units. In this case, deeper coding units of the same depth may be scanned according to the Z-scan order.

According to an embodiment, when at least one coding unit having a non-square shape exists in the reference coding unit, the image decoding apparatus 100 may split each of the coding units in the reference coding unit into sub-blocks, and may scan the split sub-blocks according to the Z-scan order. For example, when a coding unit having a non-square shape in a vertical direction or a horizontal direction exists in the reference coding unit, Z-scan may be performed by using split sub-blocks. Also, for example, when the reference coding unit is split into an odd number of coding units, Z-scan may be performed by using sub-blocks. A sub-block is a coding unit that is no longer split or a coding unit obtained by splitting an arbitrary coding unit, and may have a square shape. For example, four sub-blocks having a square shape may be split from a coding unit having a square shape. Also, for example, two sub-blocks having a square shape may be split from a coding unit having a non-square shape.

Referring to FIG. 23, for example, the image decoding apparatus 100 according to an embodiment may scan coding units 2302, 2304, 2306, 2308, and 2310 of a lower depth in a coding unit 2300 according to a Z-scan order. The coding unit 2300 and the coding units 2302, 2304, 2306, 2308, and 2310 are respectively an upper coding unit and lower coding units. The coding unit 2300 includes the coding units 2306 and 2310 having a non-square shape in a horizontal direction. The coding units 2306 and 2310 having a non-square shape have discontinuous boundaries with the coding units 2302 and 2304 that are adjacent to each other and have a square shape. Also, the coding unit 2308 has a square shape, and is a coding unit at the center when a coding unit having a non-square shape is split into an odd number of coding units. Like the coding units 2306 and 2310 having a non-square shape, the coding unit 2308 has discontinuous boundaries with the coding units 2302 and 2304 that are adjacent to each other and have a square shape. When the coding unit 2300 includes the coding units 2306 and 2310 having a non-square shape or the coding unit 2308 located at the center when a coding unit having a non-square shape is split into an odd number of coding units, because adjacent boundaries between coding units are discontinuous, continuous Z-scan indices may not be set. Accordingly, the image decoding apparatus 100 may continuously set Z-scan indices by splitting coding units into sub-blocks. Also, the image decoding apparatus 100 may perform continuous Z-scan on the coding units 2306 and 2310 having a non-square shape or the coding unit 2308 located at the center of an odd number of coding units having a non-square shape.

A coding unit 2320 of FIG. 23 is obtained by splitting the coding units 2302, 2304, 2306, 2308, and 2310 in the coding unit 2300 into sub-blocks. Because a Z-scan index may be set for each of the sub-blocks and adjacent boundaries between the sub-blocks are continuous, the sub-blocks may be scanned according to a Z-scan order. For example, in a decoding apparatus according to an embodiment, the coding unit 2308 may be split into sub-blocks 2322, 2324, 2326 and 2328. In this case, the sub-blocks 2322 and 2324 may be scanned after data processing is performed on a sub-block 2330, and the sub-blocks 2326 and 2328 may be scanned after data processing is performed on a sub-block 2332. Also, the sub-blocks may be scanned according to the Z-scan order.

In the above embodiments, data units are scanned according to a Z-scan order for data storage, data loading, and data accessing.

Also, in the above embodiments, although data units may be scanned according to a Z-scan order, a scan order of data units may be one of various orders such as a raster scan order, an N-scan order, an up-right diagonal scan order, a horizontal scan order, and a vertical scan order, and should not be limited to the Z-scan order.

Also, in the above embodiments, although coding units in a reference coding unit are scanned, the present disclosure is not limited thereto and a target to be scanned may be an arbitrary block in a processing block or a largest coding unit.

Also, in the above embodiments, although a block is split into sub-blocks and scanning is performed according to a Z-scan order only when at least one block having a non-square shape exists, a block may be split into sub-blocks and scanning may be performed according to a Z-scan order even when a block having a non-square shape does not exist for a simplified embodiment.

The image decoding apparatus 100 according to an embodiment may generate prediction data by performing inter prediction or intra prediction on a coding unit, may generate residual data by performing inverse transformation on a transform unit included in a current coding unit, and may reconstruct the current coding unit by using the generated prediction data and the residual data.

A prediction mode of a coding unit according to an embodiment may be at least one of an intra mode, an inter mode, and a skip mode. According to an embodiment, a prediction mode may be independently selected according to coding units.

When a coding unit having a 2N×2N shape is split into two coding units having a 2N×N shape or a N×2N shape according to an embodiment, inter mode prediction and intra mode prediction may be separately performed on each coding unit. Also, a skip mode may be applied to the coding units having the 2N×N or N×2N shape according to an embodiment.

The image decoding apparatus 100 according to an embodiment may allow performing bi-prediction in a skip mode of a coding unit having a 8×4 or 4×8 shape. Because only skip mode information about a coding unit is received in a skip mode, the use of residual data for the coding unit is omitted. Accordingly, in this case, an overhead of de-quantization and inverse transformation may be reduced. Instead, the image decoding apparatus 100 according to an embodiment may allow performing bi-prediction on a coding unit to which a skip mode is applied, and thus may improve decoding efficiency. Also, according to an embodiment, the image decoding apparatus 100 may set an interpolation tap number to a relatively small value during motion compensation while allowing performing bi-prediction on a coding unit having a 8×4 or 4×8 shape, and thus may efficiently use a memory bandwidth. For example, an interpolation filter having a tap number less than 8 (e.g., a 2-tap interpolation filter), instead of an 8-tap interpolation filter, may be used.

Also, the image decoding apparatus 100 according to an embodiment may signal intra or inter prediction information about each region included in a current coding unit by splitting the region into a pre-set shape (e.g., diagonal-based split).

The image decoding apparatus 100 according to an embodiment may obtain a prediction sample of a current coding unit using an intra mode by using adjacent samples of the current coding unit. In this case, intra prediction is performed by using adjacent samples that are pre-reconstructed, and the samples are referred to as reference samples.

Figure 24:
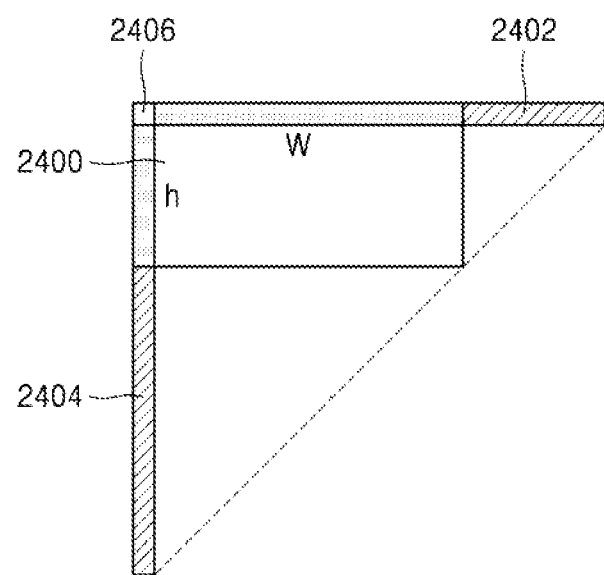
FIG. 24 is a diagram of a reference sample for intra prediction of a coding unit, according to an embodiment.

FIG. 24 is a diagram of a reference sample for intra prediction of a coding unit, according to an embodiment. Referring to FIG. 24, for a coding unit 2400 where a block shape is a non-square shape, a length in a horizontal direction is w, and a length in a vertical length is h, w+h upper reference samples 2402, w+h left reference samples 2404, and one upper left reference sample 2406 are required, that is, the total number of 2(w+h)+1 reference samples are required. In order to prepare a reference sample, padding may be performed on a part where the reference sample does not exist, and a reference sample filtering process may be performed for each prediction mode to reduce a quantization error included in a reconstructed reference sample.

Although the number of reference samples when a block shape of a current coding unit is a non-square shape has been described in the above embodiments, the number of reference samples is equally applied even when a current coding unit is a rectangular shape.

The above various embodiments describe an operation related to an image decoding method performed by the image decoding apparatus 100. An operation of the image encoding apparatus 200 for performing an image encoding method corresponding to a reverse order process of the image decoding method will be described through various embodiments.

Figure 2:
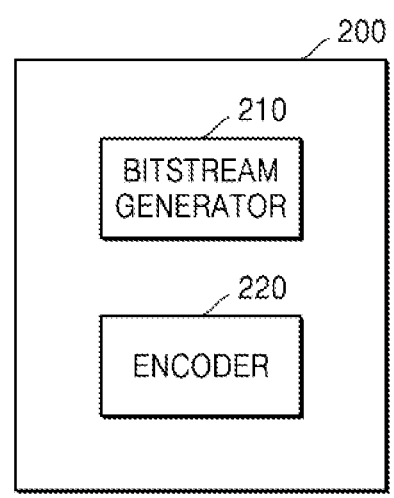
FIG. 2 is a block diagram of an image encoding apparatus for encoding an image based on at least one from among block shape information and split shape information, according to an embodiment.

FIG. 2 is a block diagram of the image encoding apparatus 200 for encoding an image based on at least one from among block shape information and split shape information, according to an embodiment.

The image encoding apparatus 200 may include an encoder 220 and a bitstream generator 210. The encoder 220 may receive an input image and may encode the input image. The encoder 220 may encode the input image and thus may obtain at least one syntax element. The syntax element may include at least one of skip flag, prediction mode, motion vector difference, motion vector prediction method (or index), transform quantized coefficient, coded block pattern, coded block flag, intra prediction mode, direct flag, merge flag, delta QP, reference index, prediction direction, and transform index. The encoder 220 may determine a context model based on block shape information including at least one of a shape, a direction, a ratio of a width to a height, or a size, which are of a coding unit The bitstream generator 210 may generate a bitstream based on the encoded input image. For example, the bitstream generator 210 may generate the bitstream by entropy encoding the syntax element based on the context model. Also, the image encoding apparatus 200 may transmit the bitstream to the image decoding apparatus 100.

According to an embodiment, the encoder 220 of the image encoding apparatus 200 may determine a shape of a coding unit. For example, the coding unit may have a square shape or a non-square shape, and information indicating the shape may be included in the block shape information.

According to an embodiment, the encoder 220 may determine which shape the coding unit is to be split into. The encoder 220 may determine a shape of at least one coding unit included in the coding unit, and the bitstream generator 210 may generate the bitstream including split shape information including information about the shape of the coding unit.

According to an embodiment, the encoder 220 may determine whether the coding unit is split or not split. When the encoder 220 determines that only one coding unit is included in the coding unit or the coding unit is not split, the bitstream generator 210 may generate the bitstream including the split shape information indicating that the coding unit is not split. Also, the encoder 220 may split the coding unit into a plurality of coding units, and the bitstream generator 210 may generate the bitstream including the split shape information indicating that the coding unit is split into the plurality of coding units.

According to an embodiment, information indicating the number of coding units into which the coding unit is to be split or a direction in which the coding unit is to be split may be included in the split shape information. For example, the split shape information may indicate that the coding unit is split in at least one direction from among a vertical direction and a horizontal direction or is not split.

The image encoding apparatus 200 determines information about a split shape mode based on the split shape mode of the coding unit. The image encoding apparatus 200 determines the context model based on at least one of the shape, the direction, the ratio of a width to a height, or the size, which are of the coding unit. The image encoding apparatus 200 generates the information about the split shape mode for splitting the coding unit based on the context model as the bitstream.

In order to determine the context model, the image encoding apparatus 200 may obtain an arrangement for corresponding at least one of the shape, the direction, the ratio of a width to a height, or the size, which are of the coding unit, to an index for the context model. The image encoding apparatus 200 may obtain the index for the context model based on at least one of the shape, the direction, the ratio of a width to a height, or the size, which are of the coding unit, in the arrangement. The image encoding apparatus 200 may determine the context model based on the index for the context model.

In order to determine the context model, the image encoding apparatus 200 may determine the context model further based on block shape information including at least one of a shape, a direction, a ratio of a width to a height, or a size, which are of a neighboring coding unit adjacent to the coding unit. Also, the neighboring coding unit may include at least one of coding units located at a left-lower side, a left side, a left-upper side, an upper side, a right-upper side, a right side, or a right-lower side of the coding unit.

Also, in order to determine the context model, the image encoding apparatus 200 may compare a length of a width of an upper neighboring coding unit with a length of the width of the coding unit. Also, the image encoding apparatus 200 may compare a length of a height of left and right neighboring coding units with a length of the height of the coding unit. Also, the image encoding apparatus 200 may determine the context model based on comparison results.

An operation of the image encoding apparatus 200 is similar to an operation of the image decoding apparatus 100 described with reference to FIGS. 3 through 24, and thus detailed descriptions thereof are not provided here.

Hereinafter, with reference to FIGS. 25 to 37, an image decoding apparatus 2500 and a method thereof, and an image encoding apparatus 2700 and a method thereof, according to an embodiment, will now be described.

Figure 25:
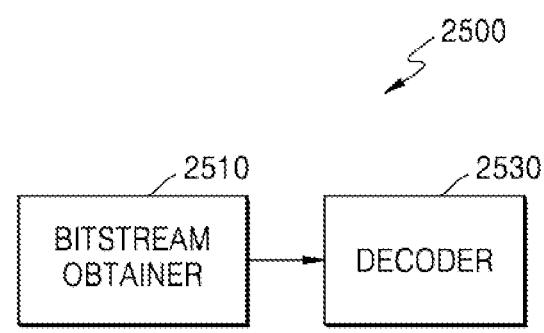
FIG. 25 is a block diagram illustrating a configuration of an image decoding apparatus, according to an embodiment.

FIG. 25 is a block diagram illustrating a configuration of the image decoding apparatus 2500, according to an embodiment.

The image decoding apparatus 2500 obtains a bitstream and then performs decoding, thereby outputting a reconstructed image.

Encoded Image data among the bitstream obtained by the image decoding apparatus 2500 is reconstructed to residual data in a spatial domain through entropy decoding, inverse-quantization, and inverse-transform.

The image decoding apparatus 2500 generates a prediction sample based on a previously-decoded reference image or a previously-decoded adjacent sample, and reconstructs image data in the spatial domain by combining the residual data with the prediction sample. Then, the image decoding apparatus 2500 may perform a filtering process on the image data in the spatial domain and thus may output the reconstructed image. The reconstructed image may be used as a reference image for a next original image.

Processing performed by the image decoding apparatus 2500 so as to decode an image may include a prediction process, a transform process, and a filtering process. The prediction process refers to a process of generating a prediction block with respect to a current block, and the transform process refers to a process of transforming or inverse-transforming residual data of the current block in a frequency domain to residual data in a spatial domain. The filtering process refers to a process of changing a pixel value of image data generated by combining the prediction block with the residual data.

According to an embodiment, each of the prediction process, the transform process, and the filtering process may include at least one processing mode.

The image decoding apparatus 2500 may determine a processing mode applicable to a current block, based on a motion vector resolution (hereinafter, referred to as the MVR) of the current block, and may decode the current block based on the determined processing mode.

Figure 29:
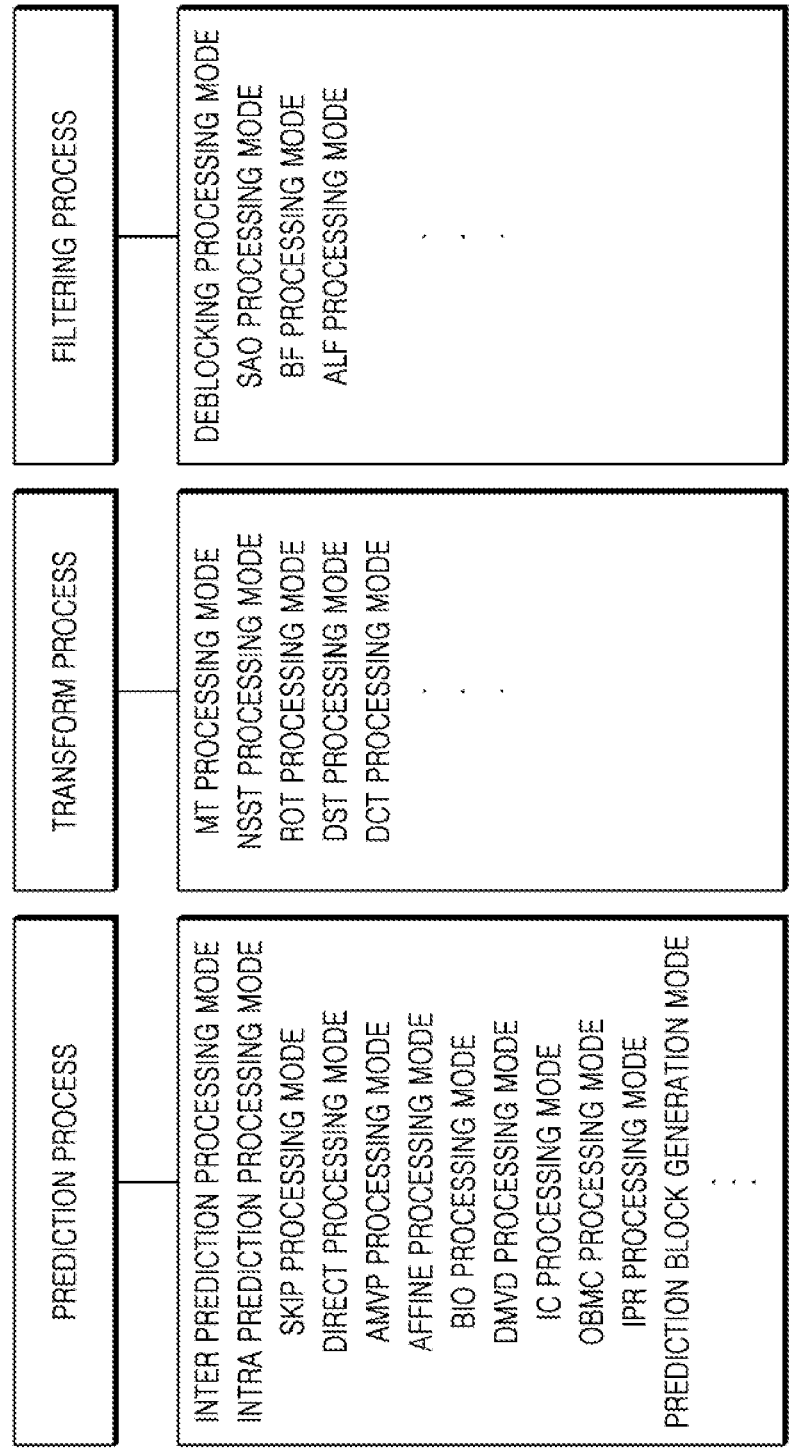
FIG. 29 illustrates processing modes included in each of a prediction process, a transform process, and a filtering process.

FIG. 29 illustrates processing modes included in each of the prediction process, the transform process, and the filtering process.

In an embodiment, the prediction process may include at least one of an inter prediction processing mode, an intra prediction processing mode, a skip processing mode, a direct processing mode, an adaptive motion vector prediction (AMVP) processing mode, an affine processing mode, a bi-directional optical flow (BIO) processing mode, a decoder-side motion vector derivation (DMVD) processing mode, an illumination compensation (IC) processing mode, an overlapped block motion compensation (OBMC) processing mode, an inter prediction refinement (IPR) processing mode, and a prediction block generation mode.

In an embodiment, the transform process may include at least one of a multiple transform (MT) processing mode, a non-separable secondary transform (NSST) processing mode, a rotational transform (ROT) processing mode, a discrete sine transform (DST) processing mode, and a discrete cosine transform (DCT) processing mode.

In an embodiment, the filtering process may include at least one of a deblocking processing mode, a sample adaptive offset (SAO) processing mode, a bilateral filter (BF) processing mode, and an adaptive loop filter (ALF) processing mode.

First, the processing modes included in the prediction process, the transform process, and the filtering process will now be briefly described. For clear descriptions of embodiments of the disclosure, explanations for algorithms of the processing modes below are omitted.

The inter prediction processing mode refers to a processing method using similarity between a current image and another image. A reference block that is similar to a current block of the current image is detected from a reference image decoded prior to the current image, and a prediction block is determined from the current block. Also, a distance on coordinates between the current block and the prediction block may be represented as a motion vector, and a difference between the current block and the prediction block may be represented as residual data. Therefore, by performing inter prediction on the current block, instead of directly outputting image information of the current block, an index indicating a reference image, the motion vector, and the residual data are output, such that encoding and decoding efficiency may be improved.

The intra prediction processing mode refers to a processing method using spatial similarity within one image. A prediction block similar to a current block may be generated from an adjacent pixel value of the current block, and a difference between pixel values of the current block and the prediction block may be represented as residual data. Instead of directly outputting image information of the current block, information about a prediction block generation mode and the residual data are output, such that encoding and decoding efficiency may be improved.

The skip processing mode searches for a reference block in a reference image by using motion information of an adjacent block as motion information of a current block. A prediction block determined from the reference block is determined as the current block.

The direct processing mode, as an example of the inter prediction processing mode, searches for a reference block in a reference image by using motion information of an adjacent block as motion information of a current block, and determines a prediction block from the reference block. Then, the current block is reconstructed as a combination of residual data with the prediction block. The direct processing mode may be referred to as a merge processing mode.

The AMVP processing mode, as an example of the inter prediction processing mode, determines a motion vector of a current block by combining a difference motion vector to a motion vector of an adjacent block, and searches for a reference block corresponding to the motion vector in a reference image specified based on a reference image list and a reference image index. Then, the current block is reconstructed as a combination of a prediction block with residual data.

The affine processing mode refers to processing of transforming or inverse-transforming a motion vector of a block, which indicates a translation motion, to a motion vector indicating a rotation motion, zoom-in, or zoom-out.

The BIO processing mode refers to processing for sample-wise motion vector enhancement performed on block-wise motion compensation for bi-directional prediction.

The DMVD processing mode refers to a scheme, performed by a decoder side, of inducing a motion vector, and induces a motion vector of a current block through template matching or bilateral matching.

The IC processing mode refers to a scheme for increasing prediction efficiency by compensating illumination of a current block and/or a reference block in a reference image when the current block is decoded through the inter prediction processing mode.

The OBMC processing mode refers to a scheme for performing the motion compensation by weight-summing reconstructed pixels of a current block with reconstructed pixels at a current position due to motion of adjacent blocks.

The IPR processing mode refers to a scheme for changing pixel values of prediction block determined from a reference image of a current block by using a linear model between a reconstructed block and the prediction block.

The prediction block generation mode refers to a scheme for generating a prediction block of a current block in the intra prediction processing mode. For example, the prediction block generation mode may include a plurality of different prediction block generation modes. In the HEVC, as the prediction block generation mode, 35 modes including Intra_Planar mode, Intra_DC mode, Intral_Angular mode, and the like are provided.

The MT processing mode refers to a scheme for, by sequentially using a plurality of transform kernels, transforming residual data in a spatial domain to residual data in a frequency domain, or inverse-transforming residual data in a frequency domain to residual data in a spatial domain.

The NSST processing mode refers to a transform scheme that is performed between core transform and quantization or between inverse-quantization and inverse core transform, and may be applied to only some parts of a current block.

The ROT processing mode refers to a scheme for partially exchanging at least one value between rows or between columns of a frequency coefficient matrix. The partial exchange between the rows or the partial exchange between the columns does not mean that values of a particular row or column are unconditionally exchanged by 1:1 but may mean that values between two rows or values between two columns are partially exchanged by using a particular function such as the trigonomerical function.

The DST processing mode refers to a scheme for, by using a DST transform kernel, transforming residual data in a spatial domain to residual data in a frequency domain, or inverse-transforming residual data in a frequency domain to residual data in a spatial domain.

The DCT processing mode refers to a scheme for, by using a DCT transform kernel, transforming residual data in a spatial domain to residual data in a frequency domain, or inverse-transforming residual data in a frequency domain to residual data in a spatial domain.

The deblocking processing mode refers to a scheme for reducing block artifact occurring at a boundary between blocks.

The SAO processing mode refers to a scheme for minimizing an error between a reconstructed image and an original image by adding an offset to a reconstructed sample.

The BF processing mode refers to a scheme for replacing pixel values of a reconstructed block with a weighted average between pixel values of a current block and pixel values of an adjacent block.

The ALF processing mode refers to a scheme for changing pixel values by using a filer selected from among a plurality of filters, the changing being performed on each of a plurality of pixel groups included in a reconstructed current block.

In an embodiment, an order of determining whether to apply the processing modes illustrated in FIG. 29 may be predetermined. Also, when it is determined to apply one of the processing modes according to predetermined syntax, determination whether to apply other processing modes may not be performed based on a result of the determination. In an embodiment, after whether to apply the skip processing mode is determined in a prediction process, whether to apply the inter prediction processing mode, the direct processing mode, and the AMVP processing mode may be sequentially determined. When whether to apply the skip processing mode is determined, whether to apply the inter prediction processing mode may be determined, and when it is determined to apply the skip processing mode, whether to apply the inter prediction processing mode, the direct processing mode, and the AMVP processing mode may not be determined. That is, obtainment of information about the inter prediction processing mode, the direct processing mode, and the AMVP processing mode may be skipped.

In an embodiment, when the processing mode applicable to a current block is specified based on an MVR of the current block, the image decoding apparatus 2500 may decode the current block by using the specified processing block.

Referring to FIG. 25, the image decoding apparatus 2500 may include a bitstream obtainer 2510 and a decoder 2530.

The image decoding apparatus 2500 may be included in the image decoding apparatus 100. For example, the bitstream obtainer 2510 may be included in the bitstream obtainer 110 of the image decoding apparatus 100 illustrated in FIG. 1, and the decoder 2530 may be included in the decoder 120 of the image decoding apparatus 100.

The bitstream obtainer 2510 obtains a bitstream with respect to an encoded image. The bitstream may include information about encoded image data and an encoding mode.

The decoder 2530 decodes an image, based on the information obtained from the bitstream. In an embodiment, the decoder 2530 may output a reconstructed image by performing a prediction process, a transform process, and a filtering process on a block that is a target to be decoded.

A type of the block may be a square shape or a rectangular shape, or may be an arbitrary geometrical shape. A block according to an embodiment is not limited to a data unit of a preset size, and may include a largest coding unit, a coding unit, a prediction unit, and a transform unit from among block units according to a tree structure.

In an embodiment, the decoder 2530 may determine an applicable processing mode for a current block, based on an MVR corresponding to the current block. The applicable processing mode refers to a processing mode that is applicable to the current block. The applicable processing mode may be actually applied to the current block, or may not be applied according to the information included in the bitstream. An inapplicable processing mode to be described below refers to a processing mode that has no probability to be applied to the current block.

The MVR of the current block may refer to precision of a pixel position indicated by a motion vector of the current block from among pixels included in a reference image (or an interpolated reference image). The MVR of the current block may be selected from among at least one candidate MVR. The at least one candidate MVR may include, for example, at least one of an MVR of a ⅛-pixel unit, an MVR of a ¼-pixel unit, an MVR of a ½-pixel unit, an MVR of a 1-pixel unit, an MVR of a 2-pixel unit, an MVR of a 4-pixel unit, and an MVR of an 8 pixel unit, but is not limited thereto. In another embodiment, the candidate MVR may include only one MVR.

FIG. 30 illustrates positions of pixels that may be indicated by motion vectors according to an MVR of a ¼-pixel unit, an MVR of a ½-pixel unit, an MVR of a 1-pixel unit, and an MVR of a 2-pixel unit, when a minimum MVR selectable with respect to the current block is the MVR of the ¼-pixel unit.

(a), (b), (c), and (d) of FIG. 30 respectively illustrate coordinates (marked by black squares) of pixels that may be indicated by motion vectors of the MVR of the ¼-pixel unit, the MVR of the ½-pixel unit, the MVR of the 1-pixel unit, and the MVR of the 2-pixel unit based on coordinates (0, 0).

When the minimum MVR is the MVR of the ¼-pixel unit, the coordinates of the pixel that may be indicated by the motion vector of the MVR of the ¼-pixel unit become (a/4, b/4) (a and b are integers), the coordinates of the pixel that may be indicated by the motion vector of the MVR of the ½-pixel unit become (2c/4, 2d/4) (c and d are integers), the coordinates of the pixel that may be indicated by the motion vector of the MVR of the 1-pixel unit become (4e/4, 4f/4) (e and f are integers), and the coordinates of the pixel that may be indicated by the motion vector of the MVR of the 2-pixel unit become (8g/4, 8h/4) (g and h are integers). That is, when the minimum MVR has a $2^m$ (m is an integer) pixel unit, coordinates of a pixel that may be indicated by an MVR of a $2^n$ (n is an integer) pixel unit become ($i*2^{n-m}/2^{-m}$, $j*2^{n-m}/2^{-m}$) (i and j are integers). Although the motion vector is determined according to a specific MVR, the motion vector is represented by coordinates in an image interpolated according to the ¼-pixel unit corresponding to a minimum MVR.

In an embodiment, because the image encoding apparatus 2700 determines the motion vector in the image interpolated according to the minimum MVR, in order to represent the motion vector (and a prediction motion vector) by using an integer, a reciprocal of a pixel unit value of the minimum MVR, for example, $2^{-m}$ when the minimum MVR has a $2^m$ (m is an integer) pixel unit may be multiplied to the motion vector (and the prediction motion vector). The motion vector of the integer unit multiplied by $2^{-m}$ may be used in the image encoding apparatus 2700 and the image decoding apparatus 2500.

When the motion vector of the MVR of the ½-pixel unit starting from the coordinates (0, 0) indicates coordinates (2/4, 6/4) and the minimum MVR has the ¼-pixel unit, the motion vector encoding apparatus 2700 and the image decoding apparatus 2500 may determine (2, 6), which is obtained by multiplying the (2/4, 6/4) by an integer 4, as a motion vector.

In an embodiment, the bitstream obtainer 2510 may obtain information about the MVR of the current block from the bitstream, in a block unit, a slice unit, or a picture unit. The decoder 2530 may determine the MVR of the current block from the information about the MVR included in the bitstream. Alternatively, the decoder 2530 may directly determine the MVR of the current block according to a preset criterion, without obtaining the information about the MVR.

In an embodiment, the bitstream obtainer 2510 may obtain the information about the MVR in every inter-predicted coding unit. FIG. 31 illustrates syntax for obtaining information about an MVR from a bitstream.

Referring to FIG. 31, when a slice including a current coding unit in phrase a is not a slice I, cu_skip_flag is extracted in phrase b. cu_skip_flag indicates whether a skip mode is to be applied to the current coding unit. When it is checked, in phrase c, that the skip mode is to be applied, the current coding unit is processed in the skip mode. When it is checked that the skip mode is not to be applied in phrase d, pred_mode_flag is extracted in phrase e. pred_mode_flag indicates whether the current coding unit is intra predicted or inter predicted. When the current coding unit is not intra predicted, that is, is inter predicted in phrase f, pred_mvr_idx is extracted in phrase g. pred_mvr_idx is an index indicating an MVR of the current coding unit, and an MVR corresponding to each index is as shown in Table 2.

TABLE 2

| MVR Index | 0 | 1 | 2 | 3 | 4 |
|---|---|---|---|---|---|
| Resolution (R) in pel | ¼ | ½ | 1 | 2 | 4 |

In an embodiment, when the MVR of the current block is determined, the decoder 2530 determines a processing mode corresponding to the MVR of the current block, the processing mode being from among a plurality of processing modes included in at least one of a prediction process, a transform process, and a filtering process. The processing mode corresponding to the MVR of the current block may be one or more in number.

In an embodiment, the decoder 2530 may determine at least one applicable processing mode based on the MVR of the current block. For example, based on the MVR of the current block, the affine processing mode of the prediction process may be determined as an applicable processing mode, or the affine processing mode of the prediction process and the MT processing mode of transform process may be determined as the applicable processing modes.

In an embodiment, the decoder 2530 may determine at least one inapplicable processing mode, based on the MVR of the current block.

In an embodiment, the decoder 2530 may determine at least one applicable processing mode and at least one inapplicable processing mode, based on the MVR of the current block.

In an embodiment, when the MVR of the current block corresponds to a preset MVR, the decoder 2530 may determine at least one applicable processing mode and/or at least one inapplicable processing mode.

For example, when a preset motion vector is a ¼-pixel unit and a motion vector of the current block is a ¼-pixel unit, the decoder 2530 may determine the affine processing mode as the applicable processing mode for the current block. Alternatively, when the motion vector of the current block is the ¼-pixel unit, the skip processing mode and the direct processing mode may be determined as the inapplicable processing modes for the current block. Alternatively, when the motion vector of the current block is the ¼-pixel unit, the BIO processing mode may be determined as the applicable processing mode for the current block, and the IC processing mode may be determined as the inapplicable processing mode for the current block.

FIGS. 32 to 34 illustrate examples of an applicable processing mode and/or an inapplicable processing mode which is predetermined for an MVR.

Referring to FIG. 32, when an MVR of a current block is a ¼-pixel unit, the affine processing mode is determined to be applicable to the current block, and when the MVR of the current block is a ½-pixel unit, a 1-pixel unit, or a 2-pixel unit, the DMVD processing mode is determined to be applicable to the current block.

Referring to FIG. 33, when the MVR of the current block is the ¼-pixel unit, the DST processing mode is determined to be inapplicable to the current block, and when the MVR of the current block is a ½-pixel unit, a 1-pixel unit, or a 2-pixel unit, the ROT processing mode is determined to be inapplicable to the current block.

Also, referring to FIG. 34, when the MVR of the current block is the ¼-pixel unit, the affine processing mode and the IC processing mode are determined to be applicable to the current block, and the BF processing mode is determined to be inapplicable. When the MVR of the current block is the ½-pixel unit, the 1-pixel unit, or the 2-pixel unit, the ROT processing mode is determined to be applicable to the current block, and the OBMC processing mode and the SAO processing mode are determined to be inapplicable.

In an embodiment, the decoder 2530 may determine at least one applicable processing mode for a current block, based on a motion vector of the current block, and may obtain information about the applicable processing mode from a bitstream. The information about the applicable processing mode may include information about whether to apply the applicable processing mode and information about at least one from among particular settings related to the processing mode.

The decoder 2530 may obtain the information about the applicable processing mode from the bitstream, and may decode the current block, according to the applicable processing mode. In an embodiment, the decoder 2530 may determine whether to apply the applicable processing mode to the current block, based on the information obtained from the bitstream, and may decode the current block through the applicable processing mode, based on a result of the determination.

In an embodiment, the decoding of the current block according to the applicable processing mode does not mean that only the applicable processing mode is applied to the current block. In an embodiment, the decoder 2530 may process the current block according to a processing mode for which whether to apply should be determined prior to the applicable processing mode, according to a predetermined order, i.e., predetermined syntax, and then may apply the applicable processing mode to the current block. Alternatively, after the current block is processed according to the applicable processing mode, the current block may be decoded based on another processing mode for which whether to apply is determined according to predetermined syntax.

For example, when an applicable processing mode corresponding to the MVR is the affine processing mode, the decoder 2530 may perform a prediction process on the current block, based on the affine processing mode, and then may decode the current block by applying, to the prediction-processed current block, a processing mode included in transform process and a processing mode included in filtering process.

For example, when an applicable processing mode corresponding to the MVR is the SAO processing mode, the decoder 2530 may decode the current block by applying the SAO processing mode to the current block after applying a processing mode of the prediction process and a processing mode of transform process to the current block.

FIGS. 35 to 37 illustrate a part of syntax, according to an embodiment. Referring to FIG. 35, a current block is inter predicted in phrase A, and when a current slice is P slice, whether an index of an MVR corresponds to 0 (i.e., ¼-pixel unit) is determined in phrase B. When the index of the MVR is 0, the direct processing mode is determined as an applicable processing mode for the current block. cu_direct indicating whether to apply the direct processing mode is extracted in phrase C, and the direct processing mode may be applied to the current block, based on the extracted information.

When the current block is inter predicted in phrase A of FIG. 35, whether a current slice is B slice is determined in phrase D of FIG. 36. When the current slice is B slice, whether an index of an MVR corresponds to 0 (i.e., ¼-pixel unit) is determined in phrase E. When the index of the MVR is 0, the direct processing mode is determined as an applicable processing mode for the current block. cu_direct indicating whether to apply the direct processing mode is extracted in phrase F, and the direct processing mode may be applied to the current block, based on the extracted information.

Referring to FIGS. 35 and 36, when the MVR of the current block corresponds ¼-pixel unit, the direct processing mode is determined to be an applicable processing mode, and the direct processing mode is applied to the current block based on information indicating whether to apply, the information being obtained from a bitstream.

Referring to FIG. 37, whether the MVR index of the current block corresponds to 0 (i.e., ¼-pixel unit) or 3 (i.e., 2-pixel unit) is determined in phrase G, and thus ipr_flag is extracted in phrase H. ipr_flag indicates whether to apply the IPR processing mode to the current block. That is, when the MVR index of the current block corresponds to ¼-pixel unit or 2-pixel unit, the IPR processing mode is determined to be an applicable processing mode, and the IPR processing mode is applied to the current block based on information indicating whether to apply, the information being obtained from a bitstream.

Although not illustrated, when the MVR index of the current block corresponds to 0 (i.e., ¼-pixel unit), mtr_idx may be extracted. mtr_idx indicates whether to apply the MT processing mode to the current block. That is, when the MVR index of the current block corresponds to ¼-pixel unit, the MT processing mode is determined to be an applicable processing mode, and the MT processing mode is applied to the current block based on information indicating whether to apply, the information being obtained from a bitstream.

For example, when the MVR index of the current block corresponds to 0 (i.e., ¼-pixel unit), information indicating whether to apply the BIO processing mode to the current block may be extracted. That is, when the MVR index of the current block corresponds to ¼-pixel unit, the BIO processing mode is determined to be an applicable processing mode, and the BIO processing mode is applied to the current block based on information indicating whether to apply, the information being obtained from a bitstream.

In an embodiment, the decoder 2530 may determine an inapplicable processing mode for the current block, based on the MVR of the current block, and may skip obtainment of information from a bitstream, the information being related to the determined inapplicable processing mode. In this regard, to skip obtainment of the information means that information related to a particular processing mode is not obtained from the bitstream. When obtainment of the information related to the inapplicable processing mode is skipped, information about another processing mode may be obtained based on syntax.

In an embodiment, when one of processing modes is determined as an applicable processing mode in a preset MVR, and the MVR of the current block is different from the preset MVR, the decoder 2530 may determine the one processing mode to be an inapplicable processing mode for the current block.

In an embodiment, when one of processing modes is determined as an inapplicable processing mode in a preset MVR, and the MVR of the current block is equal to the preset MVR, the decoder 2530 may determine the one processing mode to be an inapplicable processing mode for the current block.

For example, when an applicable processing mode corresponding to the MVR of ¼-pixel unit is the affine processing mode, and the MVR of the current block is not ¼-pixel unit, the decoder 2530 may determine the affine processing mode to be an inapplicable processing mode and may skip obtainment of information from a bitstream, the information being related to the affine processing mode.

For example, when an inapplicable processing mode corresponding to the MVR of ¼-pixel unit is the affine processing mode, and the MVR of the current block is ¼-pixel unit, the decoder 2530 may skip obtainment of information from a bitstream, the information being related to the affine processing mode.

In an embodiment, the decoder 2530 may determine an applicable processing mode and an inapplicable processing mode for the current block, based on the MVR of the current block. Then, the decoder 2530 may obtain, from a bitstream, information about the applicable processing mode, and may skip obtainment of information related to the inapplicable processing mode. The decoder 2530 obtains, from the bitstream, the information about the applicable processing mode, and skips obtainment of the information related to the inapplicable processing mode, in other words, the decoder 2530 may determine, based on the MVR of the current block, whether to obtain information related to at least one processing mode from among the plurality of processing modes from the bitstream.

That is, when it is predetermined that a particular processing mode is applicable to ¼-pixel unit, the decoder 2530 may determine, based on a result of comparison between the MVR of the current block and an MVR of ¼-pixel unit, whether to obtain information related to the particular processing mode from a bitstream. When the MVR of the current block is ¼-pixel unit, the decoder 2530 may determine to obtain the information related to the particular processing mode from the bitstream, and when the MVR of the current block is not ¼-pixel unit, the decoder 2530 may determine not to obtain the information related to the particular processing mode from the bitstream.

In an embodiment, when an applicable processing mode is determined based on the MVR of the current block, and it is confirmed to apply the applicable processing mode, the decoder 2530 may check a processing mode that cannot be redundantly applied with the applicable processing mode, and may skip obtainment of information related to the checked processing mode. When only one processing mode can be applied from among multiple processing modes based on predetermined syntax, the multiple processing modes may be referred to as redundant processing modes.

For example, in a case where the MT processing mode, the NSST processing mode, the ROT processing mode, the DST processing mode, and the DCT processing mode correspond to the redundant processing modes, when an applicable processing mode of the current block is the MT processing mode, and it is determined to apply the MT processing mode for the current block, obtainment of information related to the NSST processing mode, the ROT processing mode, the DST processing mode, and the DCT processing mode that cannot be redundantly applied may be skipped.

Also, in an embodiment, before the decoder 2530 applies, to the current block, an applicable processing mode determined based on the MVR of the current block, the decoder 2530 may skip obtainment of information from a bitstream, the information being related to a processing mode for which whether to apply should be determined first according to predetermined syntax. In this case, the applicable processing mode and the processing mode for which whether to apply should be determined first according to predetermined syntax may be included in a same process from among a prediction process, a transform process, and a filtering process.

In detail, in a case where whether to apply 'q' processing mode has to be priorly determined in order to apply 'p' processing mode to the current block according to syntax, when the 'p' processing mode is determined to be an applicable processing mode, the decoder 2530 may skip obtainment of information related to the 'q' processing mode and thus may not determine whether to apply the 'q' processing mode.

For example, when an applicable processing mode for the current block is the AMVP processing mode, before the decoder 2530 applies the AMVP processing mode to the current block according to the syntax, the decoder 2530 may skip obtainment of information related to the skip processing mode and the direct processing mode for which whether to apply should be determined first.

In an embodiment, when the decoder 2530 determines an applicable processing mode based on the MVR of the current block and it is confirmed not to apply the applicable processing mode based on information obtained from a bitstream, the decoder 2530 may apply another processing mode to the current block, the another processing mode being included in a same process (i.e., a prediction process, a transform process, or a filtering process) to which the applicable processing mode belongs.

Also, in an embodiment, when an inapplicable processing mode is determined based on the MVR of the current block, the decoder 2530 may apply another processing mode to the current block, the another processing mode being included in a same process to which the inapplicable processing mode belongs.

In an embodiment, the decoder 2530 may determine an applicable processing mode for the current block based on the MVR of the current block, and may determine particular settings related to the applicable processing mode. The particular settings may refer to options to be considered when processing the current block according to a processing mode. One processing mode may have multiple options, and the decoder 2530 may check the applicable processing mode block based on the MVR of the current block, and options related to the applicable processing mode.

For example, particular settings of the AMVP processing mode may include information about whether to perform uni-directional prediction and whether to perform bi-directional prediction. Also, particular settings of the affine processing mode may include an affine type, e.g., information about whether it is a rotation type or a zoom type. Alternatively, particular settings of the DCT processing mode may include a type of a kernel, e.g., information about whether it is a DCT-II kernel or a DCT-VIII kernel.

As described above, the MVR of the current block may be determined with respect to a slice or a picture which includes the current block. The MVR determined with respect to the slice or the picture may be an MVR of each of blocks included in the slice or the picture.

In an embodiment, in a case where a current slice is a predictive (P)-slice or a bi-predictive (B)-slice, and a current picture is a predictive (P)-picture or a bi-predictive (B)-picture, when the MVR of the current block corresponds to a preset MVR, the decoder 2530 may apply the inter prediction processing mode to all blocks included in the current slice or the current picture. That is, the decoder 2530 may process all blocks included in the current slice or the current picture by using an inter prediction scheme that is a prediction scheme for which temporal redundancy is considered. In general, a P-slice, a B-slice, a P-picture, and a B-picture may include all of an inter-predicted block and an intra-predicted block, but, when an MVR determined with respect to a picture or a slice corresponds to the preset MVR, the decoder 2530 may determine that all blocks included in the slice or the picture have been inter-predicted.

In an embodiment, when the MVR of the current block is determined with respect to a slice or a picture which includes the current block, the decoder 2530 may process blocks that are encoded using the intra prediction processing mode in the slice or the picture by using the prediction block generation mode corresponding to the MVR of the current block.

As described above, the prediction block generation mode indicates a scheme used to generate the prediction block in the intra prediction processing mode. In an embodiment, the decoder 2530 may determine the prediction block generation mode corresponding to the MVR of the current block from among a plurality of prediction block generation modes for generating a prediction block according to intra prediction. Then, the decoder 2530 may generate, by using one prediction block generation mode corresponding to the MVR of the current block, a prediction block with respect to a block encoded using the intra prediction processing mode from among blocks included in a current slice or a current picture.

As described above, an applicable processing mode and/or an inapplicable processing mode for the current block may be determined based on the MVR of the current block. In an embodiment, the decoder 2530 may determine the MVR of the current block based on a type of a processing mode applied to the current block. When a processing mode applied to the current block is an applicable processing mode that is mapped to a preset MVR, The decoder 2530 may determine the preset MVR as the MVR of the current block. In other words, when the affine processing mode is applied to the current block and is mapped to ¼-pixel unit resolution as an applicable processing mode, the decoder 2530 may determine the MVR of the current block to be the ¼-pixel unit.

In descriptions with reference to FIG. 32, when the affine processing mode is applied to the current block, the decoder 2530 may determine the MVR of the current block to be the ¼-pixel unit, and when the DMVD processing mode is applied to the current block, the decoder 2530 may determine the MVR of the current block to be one of ½-pixel unit, 1-pixel unit, and 2-pixel unit.

Figure 26:
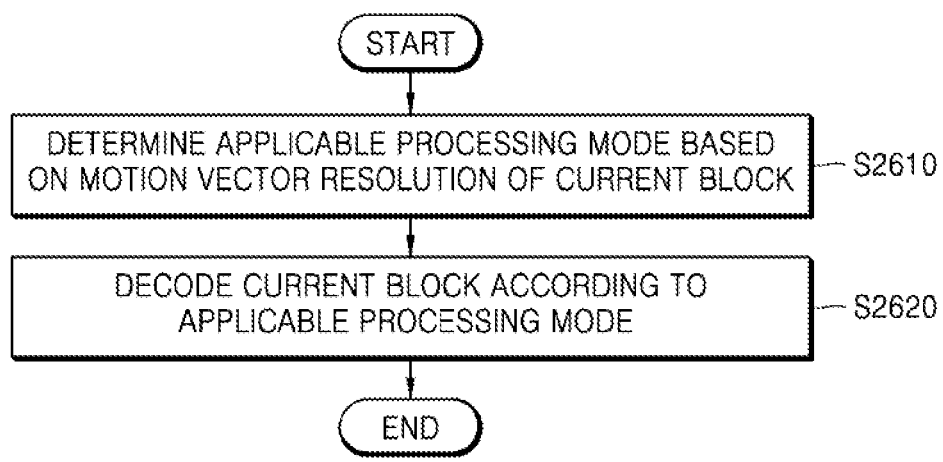
FIG. 26 is a flowchart for describing an image decoding method, according to an embodiment.

FIG. 26 is a flowchart for describing an image decoding method, according to an embodiment.

In S2610, the image decoding apparatus 2500 determines an applicable processing mode for a current block, based on an MVR of the current block.

As described above, the image decoding apparatus 2500 may obtain, from a bitstream, information indicating the MVR of the current block, and may determine the MVR of the current block, based on the obtained information. In an embodiment, the image decoding apparatus 2500 may directly determine the MVR of the current block.

Also, in an embodiment, the image decoding apparatus 2500 may determine an inapplicable processing mode for the current block, based on the MVR of the current block.

In S2620, the image decoding apparatus 2500 may obtain, from the bitstream, information about the applicable processing mode, and may decode the current block according to the applicable processing mode based on the information.

The image decoding apparatus 2500 may skip obtainment of information from the bitstream, the information being about the inapplicable processing mode for the current block.

The image decoding apparatus 2500 may determine whether to apply the applicable processing mode to the current block based on the information obtained from the bitstream, and when it is confirmed to apply the applicable processing mode, the image decoding apparatus 2500 may decode the current block according to the applicable processing mode.

In an embodiment, when it is confirmed not to apply the applicable processing mode, the image decoding apparatus 2500 may decode the current block according to another processing mode.

In an embodiment, the image decoding apparatus 2500 may decode the current block according to another processing mode, without applying the inapplicable processing mode.

Figure 27:
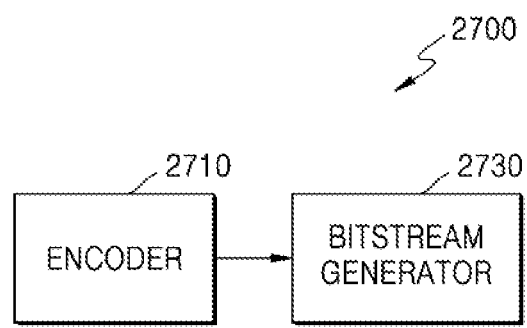
FIG. 27 is a block diagram illustrating a configuration of the image encoding apparatus, according to an embodiment.

FIG. 27 is a block diagram illustrating a configuration of the image encoding apparatus 2700, according to an embodiment.

Referring to FIG. 27, the image encoding apparatus 2700 according to an embodiment may include an encoder 2710 and a bitstream generator 2730. The image encoding apparatus 2700 may be included in the image encoding apparatus 200 described above. For example, the encoder 2710 of the image encoding apparatus 2700 may be included in the encoder 220 of the image encoding apparatus 200, and the bitstream generator 2730 of the image encoding apparatus 2700 may be included in the bitstream generator 210 of the image encoding apparatus 200.

The image encoding apparatus 2700 may encode an original image by performing a prediction process, a transform process, and a filtering process on the original image, and may generate a bitstream including data related to an image.

The encoder 2710 may determine an MVR corresponding to a current block. The MVR of the current block may be selected from among at least one candidate MVR. The at least one candidate MVR may include, for example, at least one of an MVR of a ⅛-pixel unit, an MVR of a ¼-pixel unit, an MVR of a ½-pixel unit, an MVR of a 1-pixel unit, an MVR of a 2-pixel unit, an MVR of a 4-pixel unit, and an MVR of an 8 pixel unit, but is not limited thereto.

In an embodiment, the encoder 2710 may select one candidate MVR from among the at least one candidate MVR, as the MVR of the current block, and may determine a motion vector of the current block, according to the selected MVR.

To determine the motion vector of the current block, the encoder 2710 may interpolate a reference image according to a minimum MVR from among the at least one candidate MVR.

In an embodiment, when a candidate MVR (i.e., the minimum MVR) of a smallest pixel unit from among the at least one candidate MVR has a 1/n-pixel unit (where the n is a natural number), the encoder 2710 may generate, to estimate motion, a sub-pel pixel of a 1/n-pixel unit from an integer pixel of the reference image, and may determine the motion vector of the current block which indicates a sub-pel pixel of a maximum 1/n-pixel unit.

According to a characteristic of a current image, determining of a motion vector according to an MVR of a small pixel unit may be inefficient, compared to determining of a motion vector according to an MVR of a large pixel unit. When the motion vector is determined according to the MVR of the small pixel unit, a greater amount of bits may be required to represent a size of the motion vector (or a difference motion vector), compared to determining of a motion vector according to an MVR of a large pixel unit, and this may be inefficient in terms of a bitrate. Therefore, for example, an MVR may be adaptively determined according to a resolution of an image, such that a bitrate may be decreased and simultaneously deterioration in a quality of a reconstructed image may be minimized.

In an embodiment, the encoder 2710 may adaptively determine the MVR of the current block, and may determine the motion vector in a pixel unit of the determined MVR. For example, when a pixel unit of the MVR of the current block is ½, the encoder 2710 may determine a motion vector indicating a pixel of a ½-pixel unit in the reference image interpolated according to the minimum MVR.

For example, when the at least one candidate MVR includes an MVR of a ¼-pixel unit, an MVR of a ½-pixel unit, and an MVR of a 1-pixel unit, the encoder 2710 may determine a motion vector of the current block in a ¼-pixel unit in a reference image interpolated according to the MVR of the ¼-pixel unit which is a minimum MVR, may determine a motion vector of the current block in a ½-pixel unit in the reference image interpolated according to the MVR of the ¼-pixel unit, and may determine a motion vector of the current block in a 1-pixel unit in the reference image interpolated according to the MVR of the ¼-pixel unit. Then, the encoder 2710 may determine a candidate MVR selected based on cost, as the MVR of the current block. In calculation of the cost, rate-distortion cost may be used.

In an embodiment, the encoder 2710 may determine an MVR according to each picture, each slice, or each block, based on a preset criterion.

In an embodiment, when the MVR of the current block is determined, the encoder 2710 may determine at least one processing mode corresponding to the MVR of the current block, the processing mode being from among a plurality of processing modes included in at least one of a prediction process, a transform process, and a filtering process. The processing mode corresponding to the MVR of the current block may be one or more in number.

In an embodiment, the encoder 2710 may determine at least one applicable processing mode based on the MVR of the current block.

In an embodiment, the encoder 2710 may determine at least one inapplicable processing mode, based on the MVR of the current block.

In an embodiment, the encoder 2710 may determine at least one applicable processing mode and at least one inapplicable processing mode, based on the MVR of the current block.

In an embodiment, when the MVR of the current block corresponds to a preset MVR, the encoder 2710 may determine at least one applicable processing mode and/or at least one inapplicable processing mode.

In an embodiment, when the affine processing mode is mapped to the applicable processing mode with respect to the MVR of the ¼-pixel unit, and the MVR of the current block is a ¼-pixel unit, the encoder 2710 may determine the affine processing mode as the applicable processing mode.

Also, in an embodiment, when the affine processing mode is mapped to the applicable processing mode with respect to the MVR of the ¼-pixel unit, and the MVR of the current block is different from a ¼-pixel unit, the encoder 2710 may determine the affine processing mode as the inapplicable processing mode.

Also, in an embodiment, when the affine processing mode is mapped to the inapplicable processing mode with respect to the MVR of the ½-pixel unit, and the MVR of the current block is a ½-pixel unit, the encoder 2710 may determine the affine processing mode as the inapplicable processing mode.

In an embodiment, the encoder 2710 may encode the current block according to the applicable processing mode for the current block. In an embodiment, the encoder 2710 may not apply, to the current block, the inapplicable processing mode for the current block.

In an embodiment, the encoder 2710 may determine whether to apply the applicable processing mode to the current block, and based on a result of the determination, the encoder 2710 may encode the current block according to the applicable processing mode. For example, when the applicable processing mode is the affine processing mode, whether to apply the affine processing mode to the current block may be determined. When it is determined to apply the affine processing mode, the affine processing mode may be applied to the current block.

In an embodiment, the encoding of the current block according to the applicable processing mode does not mean that only the applicable processing mode is applied to the current block. In an embodiment, the encoder 2710 may process the current block according to a processing mode for which whether to apply should be determined prior to applying the applicable processing mode according to a predetermined order, i.e., predetermined syntax, and then may apply the applicable processing mode to the current block. Alternatively, after the current block is processed based on the applicable processing mode, the current block may be encoded based on another processing mode for which whether to apply is determined according to predetermined syntax.

In an embodiment, when the inapplicable processing mode for the current block is determined, the encoder 2710 may encode the current block according to a processing mode other than the inapplicable processing mode.

Also, in an embodiment, when it is determined not to apply an applicable processing mode determined based on the MVR of the current block, the encoder 2710 may encode the current block according to a processing mode other than the applicable processing mode.

In an embodiment, the bitstream generator 2730 may generate a bitstream including information related to a processing mode applied to the current block. In an embodiment, the bitstream generator 2730 may add information about the MVR of the current block to the bitstream.

In an embodiment, when an applicable processing mode determined based on the MVR of the current block is applied to the current block the bitstream generator 2730 may generate a bitstream including information about the applicable processing mode.

In an embodiment, information about an inapplicable processing mode determined based on the MVR of the current block may not be included in the bitstream.

In an embodiment, when an applicable processing mode is determined based on the MVR of the current block, and it is confirmed to apply the applicable processing mode, the encoder 2710 may check a processing mode that cannot be redundantly applied with the applicable processing mode. The bitstream generated by the bitstream generator 2730 may not include information about the processing mode that cannot be redundantly applied with the applicable processing mode. When only one processing mode can be applied from among multiple processing modes based on predetermined syntax, the multiple processing modes may be referred to as redundant processing modes.

Also, in an embodiment, before the encoder 2710 applies, to the current block, an applicable processing mode determined based on the MVR of the current block, the encoder 2710 may determine, as an inapplicable processing mode, a processing mode for which whether to apply should be determined first according to predetermined syntax. In this case, the applicable processing mode and the processing mode for which whether to apply should be determined first according to predetermined syntax may be included in a same process from among a prediction process, a transform process, and a filtering process.

In detail, in a case where whether to apply one processing mode has to be priorly determined in order to apply the other processing mode to the current block according to syntax, when the other processing mode is determined to be an applicable processing mode, the encoder 2710 may determine the one processing mode to be an inapplicable processing mode. Information about a processing mode determined to be inapplicable processing mode may not be included in the bitstream.

In an embodiment, when an applicable processing mode determined based on the MVR of the current block is not applied to the current block, information about the applicable processing mode may not be included in the bitstream.

In an embodiment, the encoder 2710 may determine an applicable processing mode for the current block based on the MVR of the current block, and may determine particular settings related to the applicable processing mode. The particular settings may refer to options to be considered when processing the current block according to a processing mode.

As described above, the MVR of the current block may be determined with respect to a slice or a picture which includes the current block. The MVR determined with respect to the slice or the picture may be an MVR of each of blocks included in the slice or the picture.

In an embodiment, in a case where a current slice is a predictive (P)-slice or a bi-predictive (B)-slice, and a current picture is a predictive (P)-picture or a bi-predictive (B)-picture, when the MVR of the current block corresponds to a preset MVR, the encoder 2710 may apply the inter prediction processing mode to all blocks included in the current slice or the current picture.

Also, in an embodiment, when the MVR of the current block is determined with respect to the current slice or the current picture which includes the current block, the encoder 2710 may generate a prediction blocks of blocks included in the current slice or the current picture to which the intra prediction processing mode is to be applied according to the prediction block generation mode corresponding to the MVR of the current block.

As described above, an applicable processing mode and/or an inapplicable processing mode for the current block may be determined based on the MVR of the current block. In an embodiment, the encoder 2710 may determine the MVR of the current block, based on a type of a processing mode to be applied to the current block. When a processing mode applied to the current block corresponds to an applicable processing mode that is mapped to a preset MVR, the encoder 2710 may determine the preset MVR as the MVR of the current block. In other words, when the affine processing mode is applied to the current block and is mapped to ¼-pixel unit resolution as an applicable processing mode, the encoder 2710 may determine the MVR of the current block to be the ¼-pixel unit.

In descriptions with reference to FIG. 32, when the affine processing mode is determined to be applied to the current block, the encoder 2710 may determine the MVR of the current block to be the ¼-pixel unit, and when the DMVD processing mode is determined to be applied to the current block, the encoder 2710 may determine the MVR of the current block to be one of ½-pixel unit, 1-pixel unit, and 2-pixel unit.

Figure 28:
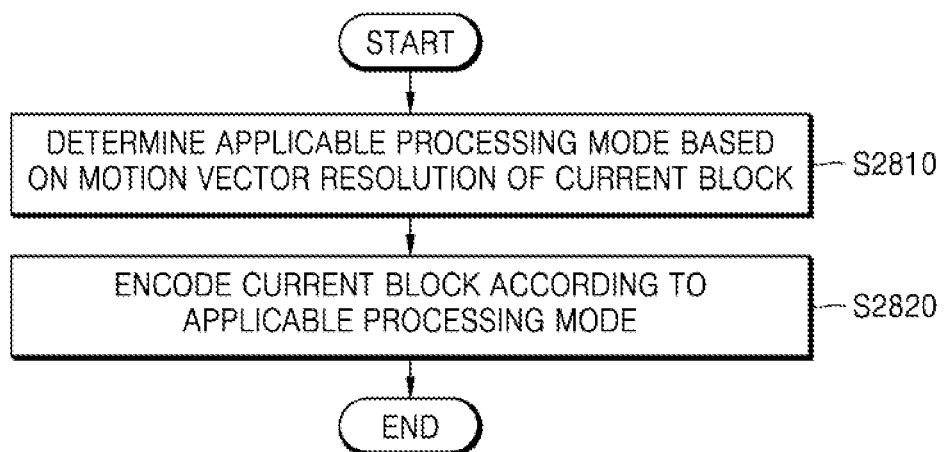
FIG. 28 is a flowchart for describing an image encoding method, according to an embodiment.

FIG. 28 is a flowchart for describing an image encoding method, according to an embodiment.

In S2810, the image encoding apparatus 2700 determines an applicable processing mode, based on an MVR of the current block.

The image encoding apparatus 2700 may determine one candidate MVR from among at least one candidate MVR as the MVR of the current block. In an embodiment, the image encoding apparatus 2700 may determine an MVR according to each picture, each slice, or each block. An MVR determined with respect to a picture, a slice, or a largest coding unit may be an MVR of blocks included therein.

Also, in an embodiment, the image encoding apparatus 2700 may determine an inapplicable processing mode for the current block, based on the MVR of the current block.

In S2820, the image encoding apparatus 2700 may encode the current block, according to the applicable processing mode.

The image encoding apparatus 2700 may not apply, to the current block, the inapplicable processing mode determined with respect to the current block. In an embodiment, the image encoding apparatus 2700 may encode the current block according to another processing mode instead of the inapplicable processing mode.

The image encoding apparatus 2700 may determine whether to apply the applicable processing mode for the current block, and when it is determined to apply, the image encoding apparatus 2700 may encode the current block according to the applicable processing mode.

In an embodiment, when it is determined not to apply the applicable processing mode, the image encoding apparatus 2700 may encode the current block according to another processing mode.

In an embodiment, the image encoding apparatus 2700 may generate a bitstream including information indicating the MVR of the current block and information related to a processing mode applied to the current block.

The generated bitstream may not include information about the inapplicable processing mode, and information about a processing mode that is determined to be the inapplicable processing mode because the applicable processing mode is applied to the current block.

The embodiments may be implemented as a computer-executable program, and the program may be stored in a medium.

The medium may continuously store the computer-executable program, or may temporarily store the computer-executable program to execute or download the computer-executable program. Also, the medium may be any of various recording means or storage means including a single hardware or a combination of a plurality of hardware, and may be distributed in a network without being limited to a medium directly connected to a computer system. The medium may be configured to store program instructions, and examples of the medium may include a magnetic medium such as a hard disk, a floppy disk, or a magnetic tape, an optical recording medium such as a compact disc read-only memory (CD-ROM) or a digital versatile disc (DVD), a magneto-optical medium such as a floptical disk, a ROM, a random-access memory (RAM), and a flash memory. Also, other examples of the medium may include a recording medium and a storage medium managed by an application store that distributes applications or a site or a server that supplies or distributes various other software.

While the disclosure has been particularly shown and described with reference to embodiments thereof, it will be understood by one of ordinary skill in the art that various changes in form and details may be made therein without departing from the spirit and scope of the disclosure as defined by the appended claims.

The invention claimed is:

1. An image decoding method comprising:
  obtaining, from a bitstream, first information indicating a motion vector resolution of a current unit among a plurality of motion vector resolutions including a first motion vector resolution and a second motion vector resolution;
  obtaining, from the bitstream, second information indicating whether a merge mode is applied to the current unit or not when the first information indicates the first motion vector resolution; and
  decoding the current unit based on the merge mode when the second information indicates that the merge mode is applied to the current unit,
  wherein when the first information indicates the second motion vector resolution, the second information is not obtained from the bitstream,
  wherein a picture is split into at least one largest coding unit, and
  wherein a largest coding unit among the at least one largest coding unit is split into at least one coding unit comprising the current unit.

2. An image decoding apparatus comprising:
  an obtainer configured to obtain, from a bitstream, first information indicating a motion vector resolution of a current unit among a plurality of motion vector resolutions including a first motion vector resolution and a second motion vector resolution, and obtain, from the bitstream, second information indicating whether a merge mode is applied to the current unit or not when the first information indicates the first motion vector resolution; and
  a decoder configured to decode the current unit based on the merge mode when the second information indicates that the merge mode is applied to the current unit, wherein when the first information indicates the second motion vector resolution, the second information is not obtained from the bitstream, wherein a picture is split into at least one largest coding unit, and wherein a largest coding unit among the at least one largest coding unit is split into at least one coding unit comprising the current unit.

3. An image encoding method comprising:

determining a motion vector resolution of a current unit among a plurality of motion vector resolutions including a first motion vector resolution and a second motion vector resolution;

determining whether a merge mode is applied to the current unit or not when the first motion vector resolution is determined as the motion vector resolution of the current unit;

encoding the current unit based on the merge mode when it is determined that the merge mode is applied to the current unit; and generating a bitstream comprising first information indicating the motion vector resolution of the current unit among the plurality of motion vector resolutions, and second information indicating whether the merge mode is applied to the current unit or not, wherein when the second motion vector resolution is determined as the motion vector resolution of the current unit, the second information is not comprised in the bitstream, wherein a picture is split into at least one largest coding unit, and wherein a largest coding unit among the at least one largest coding unit is split into at least one coding unit comprising the current unit.

4. A non-transitory computer-readable medium for recording a bitstream, the bitstream comprising:

first information indicating a motion vector resolution of a current unit among a plurality of motion vector resolutions including a first motion vector resolution and a second motion vector resolution; and second information indicating whether a merge mode is applied to the current unit or not, wherein the second information is comprised in the bitstream when the first information is generated to indicate the first motion vector resolution, and the second information is not comprised in the bitstream when the first information is generated to indicate the second motion vector resolution, wherein when the second information is generated to indicate that the merge mode is applied to the current unit, the current unit is encoded based on the merge mode, wherein a picture is split into at least one largest coding unit, and wherein a largest coding unit among the at least one largest coding unit is split into at least one coding unit comprising the current unit.

* * * * *